(12) United States Patent
Guthmiller

(10) Patent No.: US 11,631,969 B2
(45) Date of Patent: *Apr. 18, 2023

(54) SYSTEMS AND METHODS FOR INSTALLING FLUSH MOUNTED ELECTRICAL DEVICES

(71) Applicant: Marty Guthmiller, Cave Creek, AZ (US)

(72) Inventor: Marty Guthmiller, Cave Creek, AZ (US)

( * ) Notice: Subject to any disclaimer, the term of this patent is extended or adjusted under 35 U.S.C. 154(b) by 77 days.

This patent is subject to a terminal disclaimer.

(21) Appl. No.: 17/371,764

(22) Filed: Jul. 9, 2021

(65) Prior Publication Data

US 2022/0006276 A1 Jan. 6, 2022

Related U.S. Application Data

(63) Continuation of application No. 16/848,408, filed on Apr. 14, 2020, now Pat. No. 11,183,825.

(60) Provisional application No. 62/833,954, filed on Apr. 15, 2019.

(51) Int. Cl.
*H02G 3/08* (2006.01)
*H02G 3/12* (2006.01)
*H02G 1/00* (2006.01)
*H02G 3/14* (2006.01)

(52) U.S. Cl.
CPC .............. *H02G 3/12* (2013.01); *H02G 1/00* (2013.01); *H02G 3/083* (2013.01); *H02G 3/14* (2013.01)

(58) Field of Classification Search
CPC .......... H02G 3/08; H02G 3/081; H02G 3/121; H02G 3/126; H02G 3/14; H02G 3/12; H02G 1/00; H02G 3/083; H02G 3/10; H01H 9/02; H01H 13/04; H01H 13/06
USPC ................. 174/50, 53, 57, 58, 480, 481, 66; 220/3.2–3.9, 4.02, 241, 242; 248/906, 248/343; 33/528, DIG. 10
See application file for complete search history.

(56) References Cited

U.S. PATENT DOCUMENTS

| | | |
|---|---|---|
| 3,386,071 A | 5/1968 | Jimmie |
| 3,580,987 A | 5/1971 | Priaroggia |
| 4,890,418 A | 1/1990 | Sachs |
| 4,927,039 A | 5/1990 | McNab |

(Continued)

OTHER PUBLICATIONS

"Zip Box Blue Switch and Outlet Boxes," Catalog, Carlon, Jun. 2006, Last Accessed Mar. 5, 2019, Available at http://www.carlonsales.com/techinfo/brochures/electrical/Zip%20Boxes_2B1.pdf.

(Continued)

*Primary Examiner* — Angel R Estrada
(74) *Attorney, Agent, or Firm* — The Law Offices of Lisa & Lesko, LLC; Justin J. Lesko, Esq.

(57) ABSTRACT

Systems and methods for mounting electrical devices such that they appear "flush" with a finished wall. The systems include specialized back boxes, mud rings, faceplates, and other tools that are installed and used during the mounting process. The mounting process includes a specific series of steps that take place during construction and wall finishing, including that mud or other finishing material is used to both "hide" the mounting system and lock it into place The systems and methods allow for full usage of existing electrical devices such as electric outlets, light switches, and USB connectors, with an improved visual appearance over existing electrical plates that sit on top of the wall.

16 Claims, 57 Drawing Sheets

(56) References Cited

U.S. PATENT DOCUMENTS

| | | | |
|---|---|---|---|
| 5,073,681 | A | 12/1991 | Hubben |
| D329,422 | S | 9/1992 | Fujiyoshi |
| D343,825 | S | 2/1994 | Enderby |
| 5,363,269 | A | 11/1994 | McDonald |
| 5,741,158 | A | 4/1998 | Reed |
| 5,833,110 | A | 11/1998 | Chandler et al. |
| 6,106,328 | A | 8/2000 | O'Neal |
| 6,215,066 | B1 | 4/2001 | Kelso et al. |
| 6,229,087 | B1 | 5/2001 | Archer |
| 6,410,851 | B1 | 6/2002 | Lamar |
| D462,664 | S | 9/2002 | Roesch |
| 6,450,232 | B1 | 9/2002 | Smythe, Jr. |
| D467,229 | S | 12/2002 | Heggem |
| D478,553 | S | 8/2003 | Heggem |
| D482,661 | S | 11/2003 | Shotey |
| 6,649,835 | B2 | 11/2003 | Gilleran |
| 6,654,471 | B1 | 11/2003 | Varga |
| 6,674,003 | B1 | 1/2004 | Torres |
| 6,695,181 | B1 | 2/2004 | Kreitzer et al. |
| 6,906,260 | B2 | 6/2005 | Grendahl |
| 6,909,050 | B1 | 6/2005 | Bradford |
| 6,914,187 | B2 | 7/2005 | Hull |
| D513,495 | S | 1/2006 | Hull |
| D519,930 | S | 5/2006 | Hull |
| 7,087,837 | B1 | 8/2006 | Gretz |
| 7,098,399 | B1 | 8/2006 | Gretz et al. |
| 7,109,419 | B1 | 9/2006 | Gretz |
| 7,119,278 | B1 | 10/2006 | Shotey |
| 7,166,801 | B1 | 1/2007 | Gretz |
| D539,751 | S | 4/2007 | Kiely |
| 7,319,192 | B1 | 1/2008 | Gretz |
| 7,353,961 | B2 | 4/2008 | Hull |
| 7,468,487 | B1 | 12/2008 | Murphy |
| 7,479,598 | B1 | 1/2009 | Shotey |
| 7,579,549 | B2 | 8/2009 | Jolly |
| 7,595,446 | B2 | 9/2009 | Turcovsky |
| 7,622,675 | B2 | 11/2009 | Sutter |
| 7,674,974 | B1 | 3/2010 | Shotey et al. |
| 7,718,893 | B2 | 5/2010 | Purves |
| 7,732,715 | B2 | 6/2010 | Paolucci |
| 7,789,257 | B2 | 9/2010 | Davis |
| 7,956,295 | B2 | 6/2011 | Arbel |
| 7,989,699 | B1 | 8/2011 | Shotey |
| 8,013,243 | B2 | 9/2011 | Korcz et al. |
| 8,076,577 | B2 | 12/2011 | Mango, Jr. et al. |
| 8,124,872 | B2 | 2/2012 | Vigorito et al. |
| 8,196,364 | B2 | 6/2012 | Moscovitch |
| 8,242,364 | B1 | 8/2012 | Shotey |
| 8,269,102 | B1 | 9/2012 | Baldwin |
| 8,344,249 | B1 | 1/2013 | Baldwin |
| D679,256 | S | 4/2013 | Ericksen |
| D684,935 | S | 6/2013 | DeCosta |
| 8,633,384 | B1 | 1/2014 | Shotey |
| 8,723,037 | B1 | 5/2014 | Matsumoto |
| 8,789,256 | B2 | 7/2014 | Temblador |
| 8,835,763 | B1 | 9/2014 | Hammond |
| 8,893,910 | B2 | 11/2014 | Batchelor |
| 8,933,331 | B1 | 1/2015 | Gretz |
| 9,024,186 | B1 | 5/2015 | Gonzalez |
| 9,039,831 | B2 | 5/2015 | Trudeau |
| 9,069,028 | B2 | 6/2015 | Ebner et al. |
| 9,101,051 | B1 | 8/2015 | Ferrara et al. |
| 9,148,004 | B1 | 9/2015 | Solomon |
| D774,467 | S | 12/2016 | Maccarone |
| 9,526,154 | B2 | 12/2016 | Thompson |
| 9,608,420 | B1 | 3/2017 | Ferrara |
| 9,777,478 | B1 | 10/2017 | Hulka et al. |
| 9,819,167 | B2 | 11/2017 | Kummer |
| D811,348 | S | 2/2018 | Cueller |
| D838,250 | S | 1/2019 | Smith |
| D886,746 | S | 6/2020 | Anadasu |
| 10,855,066 | B2 | 12/2020 | Elliott |
| D918,844 | S | 5/2021 | Wang |
| 11,183,825 | B2 * | 11/2021 | Guthmiller ............... H02G 3/12 |
| 2009/0249705 | A1 | 10/2009 | Struthers et al. |
| 2010/0186986 | A1 | 7/2010 | Kimbrell |
| 2011/0314759 | A1 | 12/2011 | McCullough |
| 2014/0224792 | A1 | 8/2014 | Beneke |
| 2015/0091553 | A1 | 4/2015 | Wong |
| 2016/0099530 | A1 | 4/2016 | Valenti et al. |
| 2017/0110862 | A1 | 4/2017 | Kirkland |
| 2017/0331265 | A1 | 11/2017 | Evilziser |
| 2018/0076616 | A1 | 3/2018 | Thrush et al. |
| 2020/0220341 | A1 | 7/2020 | Hughey |
| 2020/0328583 | A1 | 10/2020 | Guthmiller |

OTHER PUBLICATIONS

"Raco Steel Boxes, Covers and Accessories," Catalog, Hubbell, 2014, [A6], [A53-A54], Last Accessed Mar. 5, 2019, Available at https://hubbellcdn.com/ohwassets/HCI/RACO/Catalog/steelboxescoversaccessories.pdf.

"Switch & Outlet Boxes—Technical Data," Catalog, Cooper Industries (EATON), 2015. Last Accessed Mar. 5, 2019, Available at http://www.cooperindustries.com/content/dam/public/crousehinds/commercial-products/catalog-pdfs/cp-catalog-outlet-box-section.pdf.

"Steel City Metallic Boxes and Covers," Catalog, Thomas & Betts, 2013, Last Accessed Mar. 5, 2019, Available at http://www.lawoolley.com/pdf/steel_city_boxes.pdf.

"Catalogue, Section B—Decora Devices," Catalog, Leviton, Date Unknown, [12-19], Last Accessed Mar. 9, 2019, Available at https://stevenengineering.com/tech_support/PDFs/74L101B.pdf.

"Industrial Specification Grade 15 Amp and 20 Amp Duplex Receptacles," Catalog, Leviton, 1995, Last Accessed Mar. 5, 2019, Available at http://stevenengineering.com/Tech_Support/PDFs/74INDREC.pdf.

"Commercial grade straight blade duplex receptacles," Catalog, Cooper Industries, Feb. 2018, Last Accessed Mar. 6, 2019, Available at http://www.cooperindustries.com/content/dam/public/wiringdevices/products/documents/spec_sheets2/commerical_grade_receptacles_spec_sheet.pdf.

"Arrow Hart hospital grade self-test GFCI receptacles," Catalog, Cooper Industries, Apr. 2018 Last Accessed Mar. 6, 2019, Available at http://www.cooperindustries.com/content/dam/public/wiringdevices/products/documents/spec_sheets2/hospltal_grade_gfci_specsheet.pdf.

"Section X," Catalog, Hubbell, Date Unknown, Last Accessed Mar. 6, 2019, Available at http://ecatalog.hubbell-wiring.com/press/catalog/x.pdf.

"Datacom Accessories Catalog," Catalog, Structured Cable Products, Date Unknown, Last Accessed Mar. 9, 2019, Available at https://www.scpcat5e.com/catalog/scp-datacom-accessories.pdf.

"RJ45 Connectors," Catalog, Polamco, 2010, Uast Accessed Mar. 6, 2019, Available at http://www.farnell.com/datasheets/1581551.pdf.

"Rugged Digital Networks Solutions," Catalog, Mouser Electronics, Inc., Oct. 2018, Last Accessed Mar. 6, 2019, Available at https://www.mouser.com/datasheet/2/18/Catalogue%20RJ%20Field-769265.pdf.

"EZ-RJ45 Connector," Catalog, Leviton, 2003, Last Accessed Mar. 6, 2019, Available at https://www.accu-tech.com/hs-fs/hub/54495/file-17725291-pdf/docs/specs/47613.ezc.pdf.

"High Voltage Wire and Cable General Specifications," Data Sheet, RI, Date Unknown, Last Accessed Mar. 6, 2019, Available at http://www.comcraft.co.jp/products/teledynereynolds/data/multi-cables.pdf.

"Building Wire," Catalog, General Cable, Oct. 2012, Last Accessed Mar. 6, 2019, Available at http://www.aainy.com/pdf/building_wire.pdf.

"USG Sheetrock Brand Gypsum Panels," Submittal Sheet, USG, Jun. 2017, Last Accessed Mar. 5, 2019, Available at https://www.usg.com/content/dam/USG_Marketing_Communicatons/united_states/product_promotional_materials/finished_assets/sheetrock-gypsum-panels-regular-firecode-cores-submittal.WB1473.pdf.

"Durasan Prefinished Gypsum Board," Catalog, Gold Bond, Jul. 2018, Last Accessed Mar. 5, 2019, Available at https://nationalgypsum.com/File/09%2072%2000-34.pdf.

(56) References Cited

OTHER PUBLICATIONS

"USG Sheetrock Brand Installation and Finishing Guide," Manual, USG, Sep. 2015, Last Accessed Mar. 5, 2019, Available at https://www.usg.com/content/dam/USG_Marketing_Communications/united_states/product_promotional_materials/finished_assets/sheetrock-gypsum-panels-installation-guide-en-J371.pdf.

"Gypsum Board Systems Manual," Manual, CertainTeed, Jun. 2013, Last Accessed Mar. 5, 2019, Available at https://www.certainteed.com/resources/CT068C%20System%20Manual%202013-6%20-pdf.

"DensShield Tile Backer Technical Guide," Manual, Georgia-Pacific, Feb. 2018, Last Accessed Mar. 5, 2019, Available at https://cache5.buildgp.com/wp-content/uploads/2018/11/DensShield-Tile-Backer-Technical-Guide.pdf.

"Dricore Smartwall Detailed Installation," Manual, Dricore, Date Unknown, Last Accessed Mar. 5, 2019, Available at http//www.dricore.com/nw/PDF/Detailed_Installation_Guide_web-2.pdf?_ga=2.2754935.698343861.1551842844-1360570901.1551842844.

Taylor, Glenda, "How to: Mud Drywall," Article, BobVila, Date Unknown, Last Accessed Mar. 8, 2019, Available at https://www.bobvila.com/articles/how-to-mud-drywall/.

"Hot to Hand Drywall and Mud" Article, diy Network, Date Unknown, Last Accessed Mar. 8, 2019, Available at https://www.diynetwork.com/how-to/rooms-and-spaces/walls-and-ceilings/how-to-hang-drywall-and-mud.

"How to Hang Drywall" Article, Lowe's, Date Unknown, Uast accessed Mar. 8, 2019, Available at https://www.lowes.com/projects/build-and-remodel/how-to-hang-drywall/project.

"Proform Brand All Purpose Joint Compound," Catalog, National Gypsum, Feb. 2019, Last Accessed Mar. 5, 2019, Available at https://www.nationalgypsum.com/File/09%2029%2000-43.pdf.

"USG Sheetrock Brand All Purpose Joint Compound," Submittal Sheet, USG, Oct. 2016, Last Accessed Mar. 5, 2019, Available at http://pdf.lowes.com/operatingguides/081099203602_oper.pdf.

"DAP Phenopatch Premium Uightweight Joint Compound with Drydex Dry Time Indicator Technology," Bulletin, Phenopatch, Nov. 2013, Last Accessed Mar. 5, 2019, Available at http://www.phenopatch.com/docs/tdb/9.pdf.

"Drywall Screw, Bugle Head, Cross Recessed Drive, Pierce Point, Coarse Thread, Yellow Zinc," Catalog, Fastenal, Oct. 2018, Fast Accessed Mar. 6, 2019, Available at https://www.fastenal.com/content/product_specifications/DRWL.BHPH.PP.COR.YZ.pdf.

"Fasteners," Catalog, PrimeSource Building Products, Inc., Oct. 2010 Fast Accessed Mar. 6, 2019, Available at https://www.jwlumber.com/wp-content/uploads/2015/07/GRFCAT_fastener_catalogrgma.pdf.

"Wallplate Buying Guide," Catalog, Leviton, 2015, Last Accessed Mar. 8, 2019, Available at https://images.homedepot-static.com/catalog/pdfImages/56/566b87e5-ea5a-4976-a9d2-9f699b7d8680.pdf.

"2016 Arrow Hart Buyers Guide, Section K," Catalog, Eaton, 2016, Last Accessed Mar. 8, 2019, Available at http://www.cooperindustries.com/content/dam/public/wiringdevices/BuyersGuides/AHBG/K/AHBG-K-Sec.pdf.

"Installation Guide," Manual, TRUFIG, Dec. 2016, [5-7], Last Accessed Mar. 8, 2019, Available at https://static1.squarespace.com/static/56746411c647ad126efd0b08/t/5841f4d09f7456bcf344653b/1480717524900/TRUFIG+Install+Guide_12-02-16.pdf.

TRUFIG Sales Brochure, TRUFIG, 2013, Last Accessed Mar. 8, 2019, Available at https://static1.squarespace.com/static/56746411c647ad126efd0b08/t/57b1fdd9f5e231d16e9f2a4f/1471282658946/Trufig_Brochure.pdf.

"Retail Price List," Catalog, TRUFIG, Oct. 2016, Last Accessed Mar. 8, 2019, Available at https://static1.squarespace.com/static/56746411c647ad126efd0b08/t/57f5357b2e69cfcc6c9816b3/1475687807191/TRUFIG+Retail+Price+List_10_4_16.pdf.

Non-Final Office Action in U.S. Appl. No. 16/848,408, (dated May 11, 2021).

Response to Non-Final Office Action in U.S. Appl. No. 16/848,408 (dated Mar. 10, 2021).

Notice of Allowance in U.S. Appl. No. 16/848,408, (dated Jun. 24, 2021).

Notice of Allowance in U.S. Appl. No. 29/687,661, (dated Aug. 4, 2021).

Notice of Allowance in U.S. Appl. No. 29/687,661, (dated Sep. 13, 2021).

Notice of Allowance in U.S. Appl. No. 29/687,665, (dated Sep. 2, 2021).

\* cited by examiner

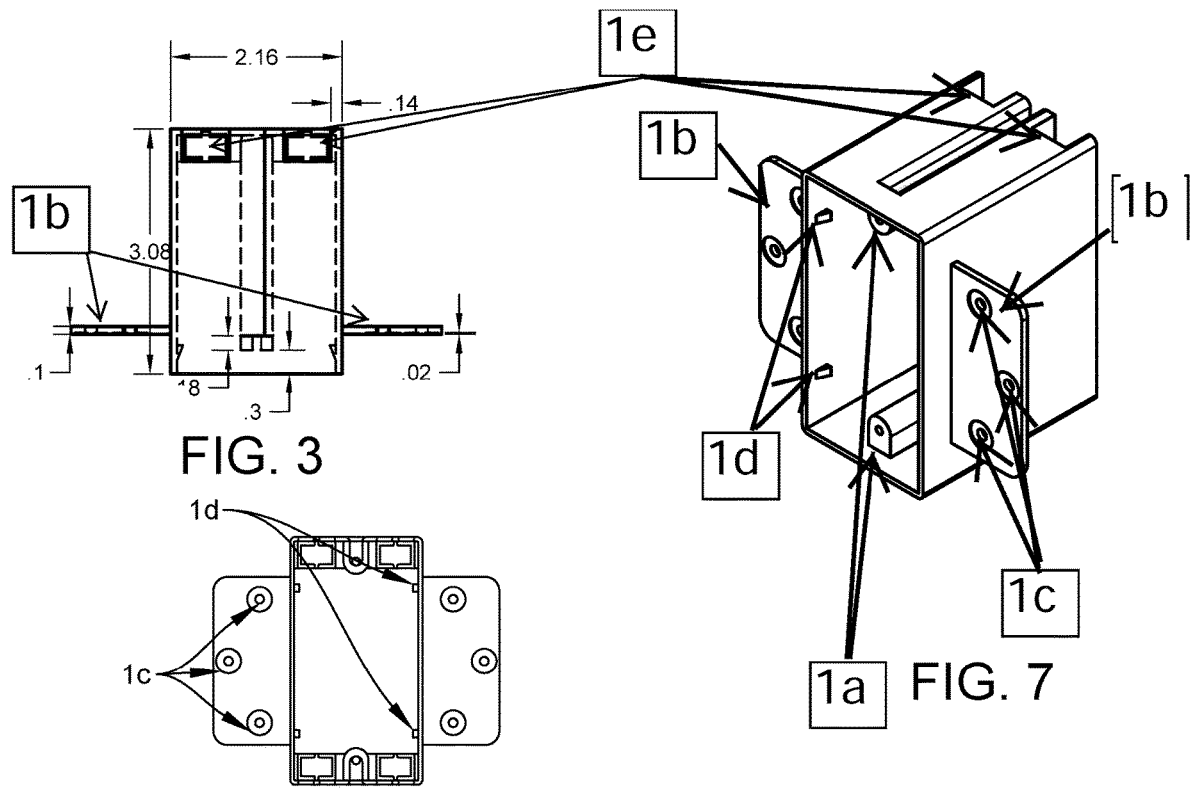
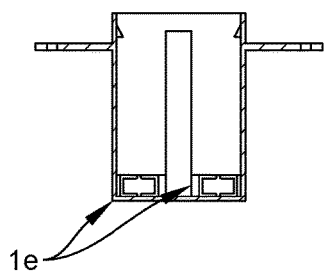
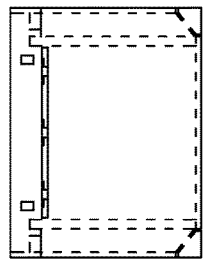
FIG. 3
FIG. 4
FIG. 5
FIG. 6
FIG. 7

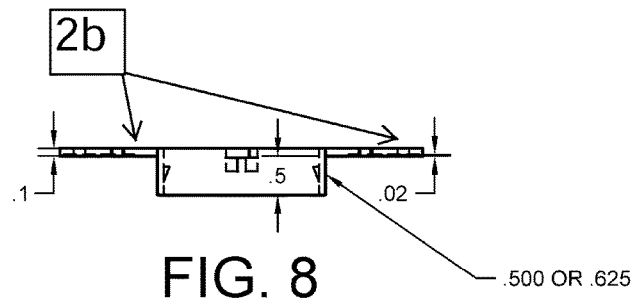
FIG. 8
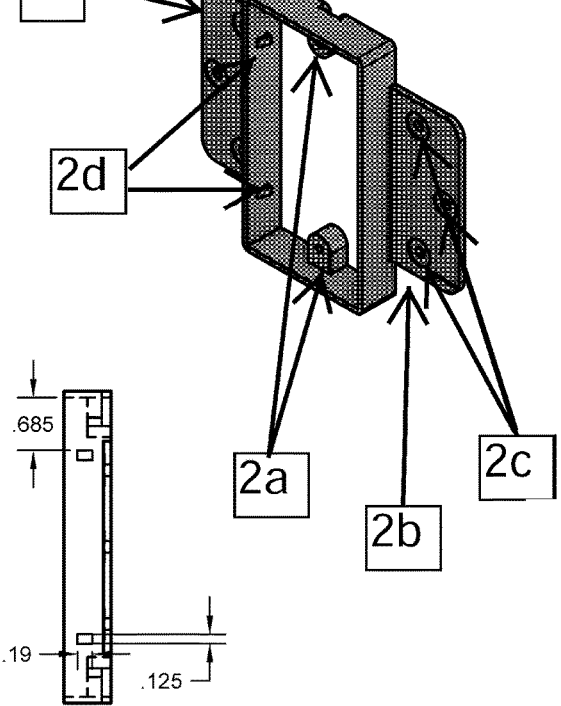
FIG. 11
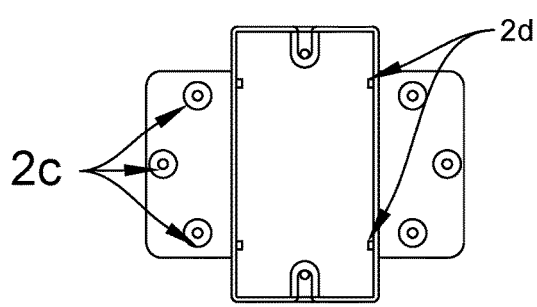
FIG. 9
FIG. 12
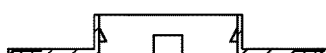
FIG. 10

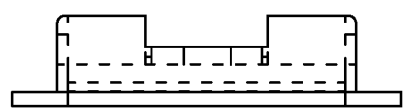
FIG. 13
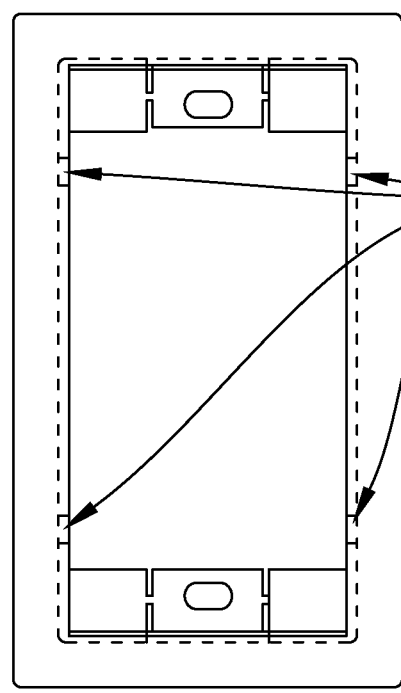
FIG. 14
FIG. 15
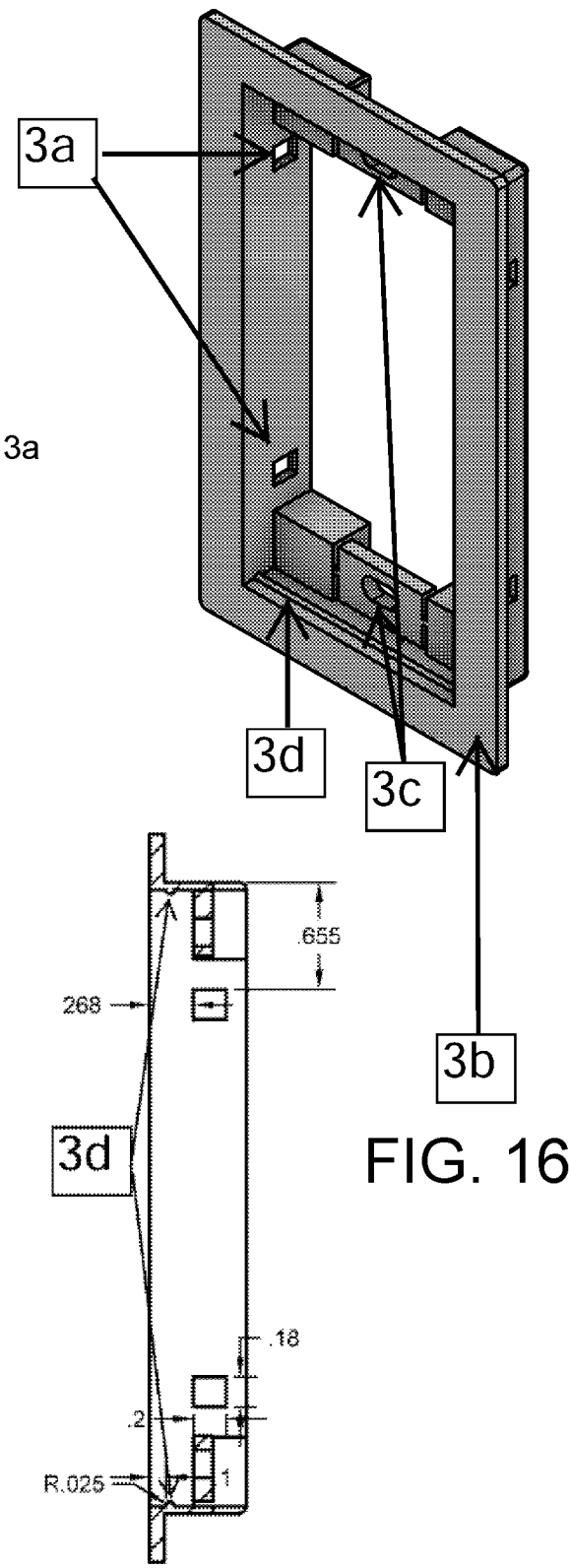
FIG. 16
FIG. 17

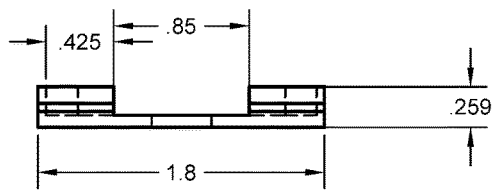
FIG. 41
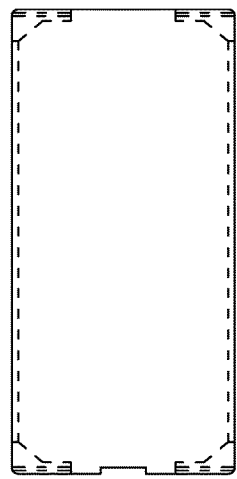
FIG. 42
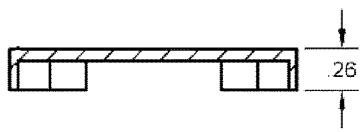
FIG. 43
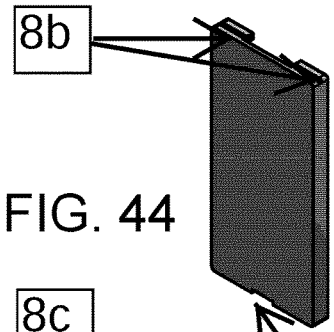
FIG. 44
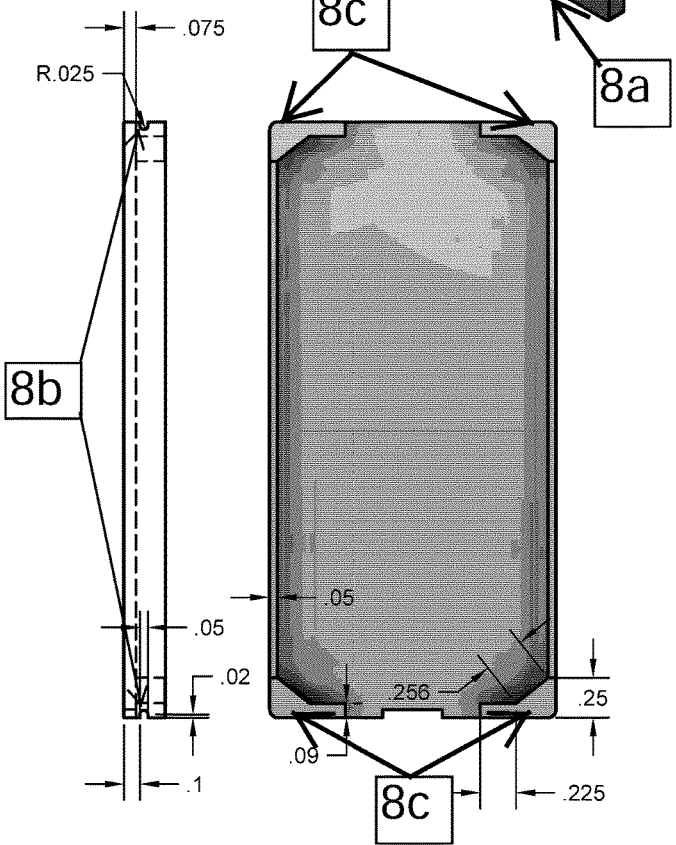
FIG. 45
FIG. 46

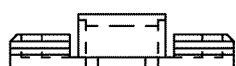
FIG. 47
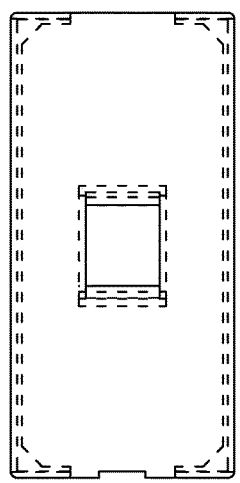
FIG. 48
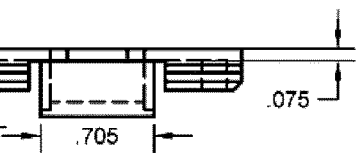
FIG. 49
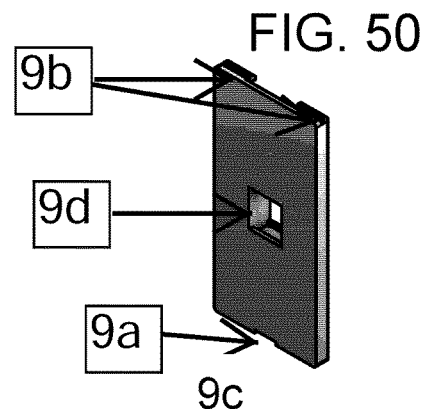
FIG. 50
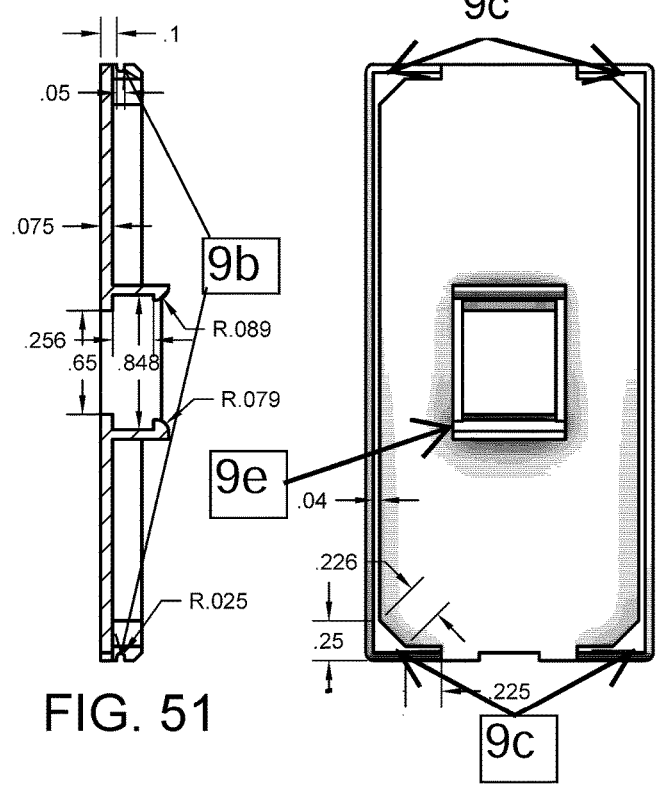
FIG. 51
FIG. 52

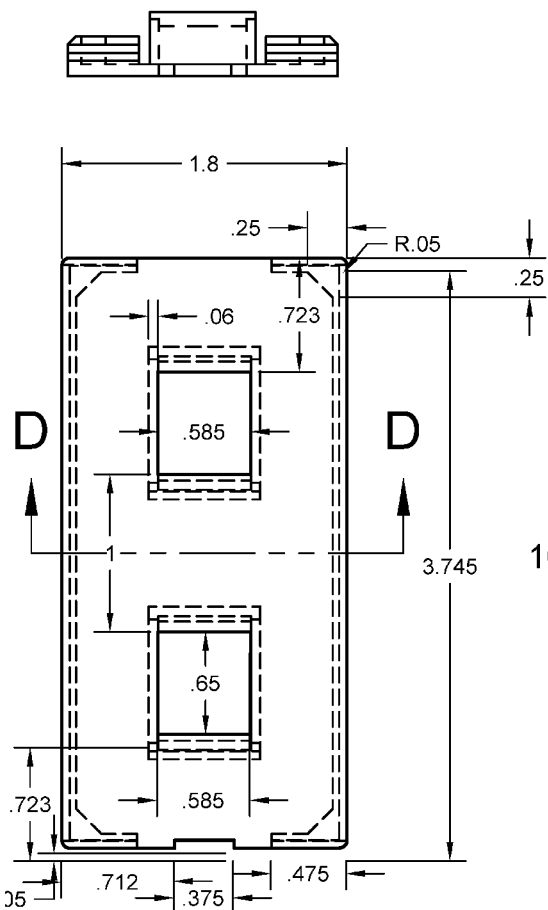
FIG. 53
FIG. 54
FIG. 55
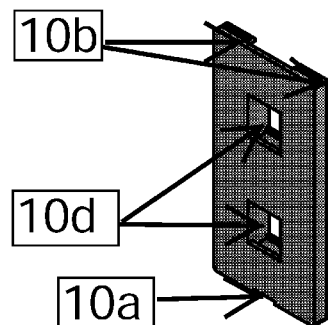
FIG. 56
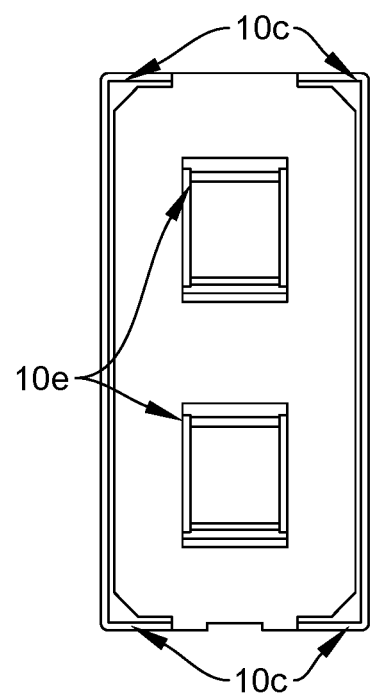
FIG. 57     FIG. 58

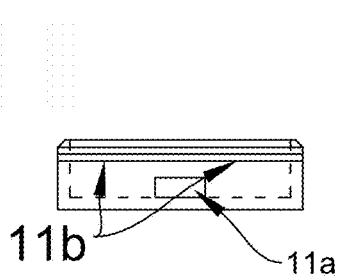
FIG. 59
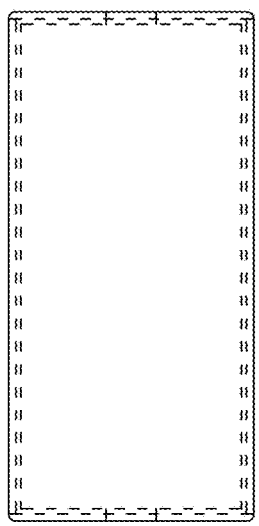
FIG. 60
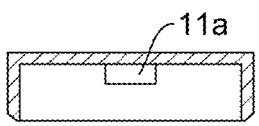
FIG. 61
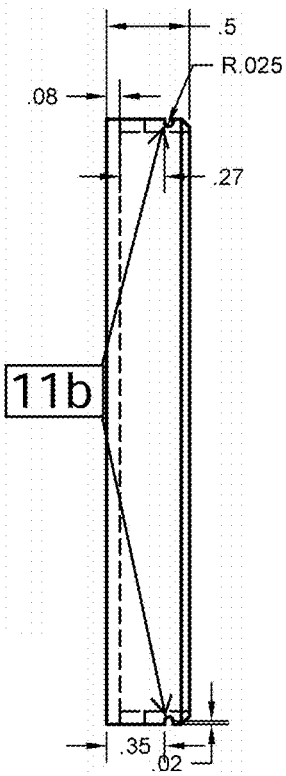
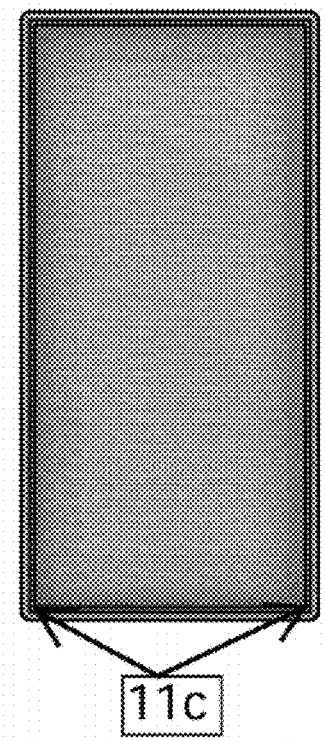
FIG. 62
FIG. 63
FIG. 64

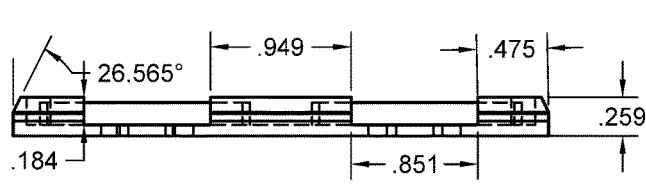
FIG. 92
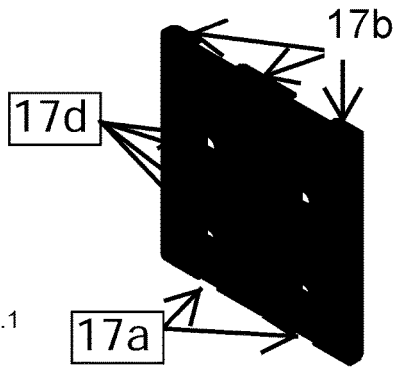
FIG. 95
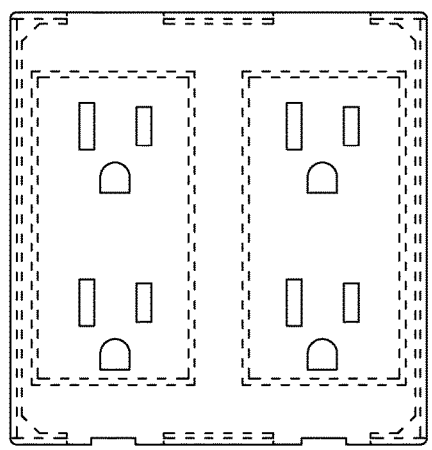
FIG. 93
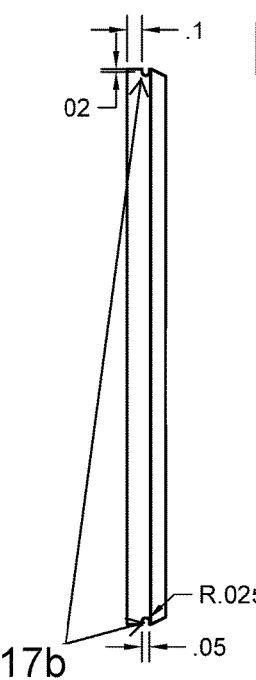
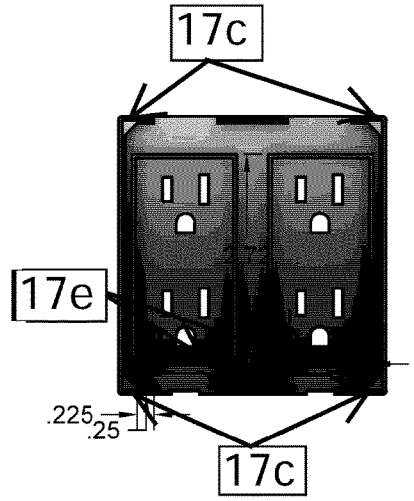
FIG. 96
FIG. 97
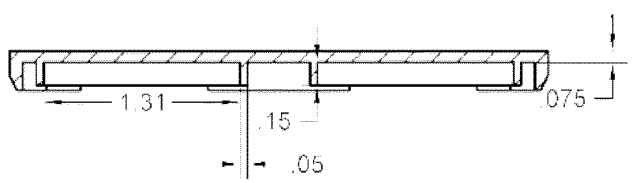
FIG. 94

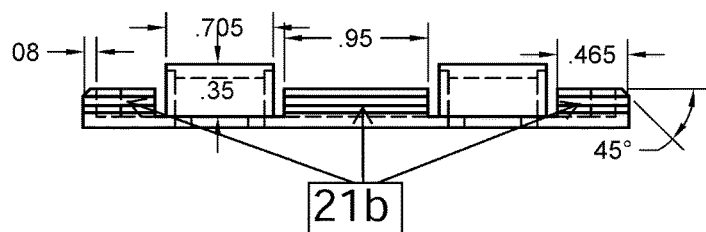
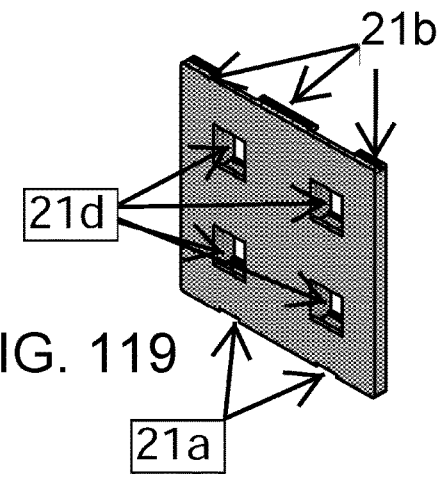
FIG. 116
FIG. 119
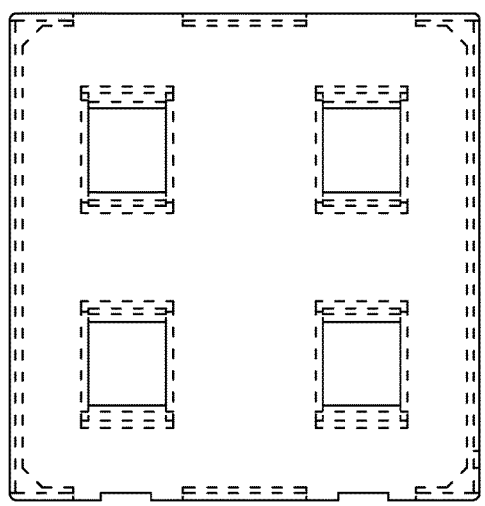
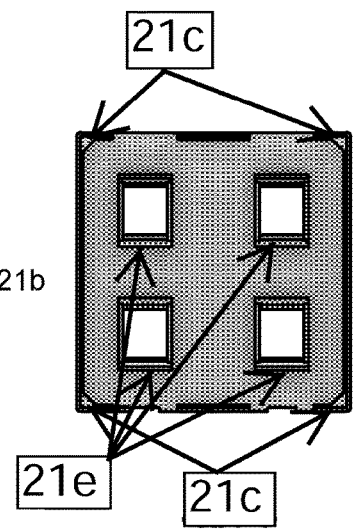
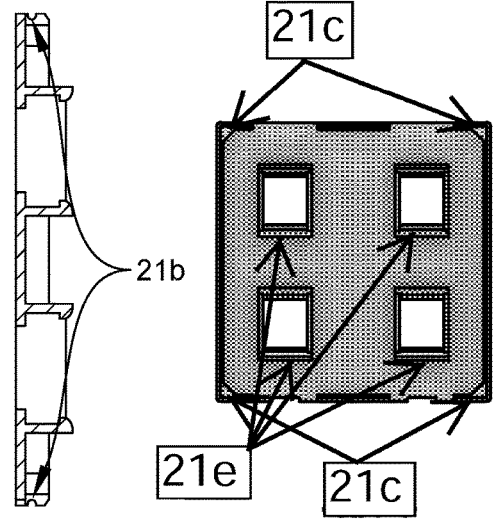
FIG. 117     FIG. 120     FIG. 121
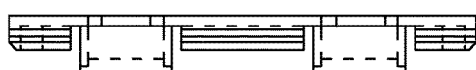
FIG. 118

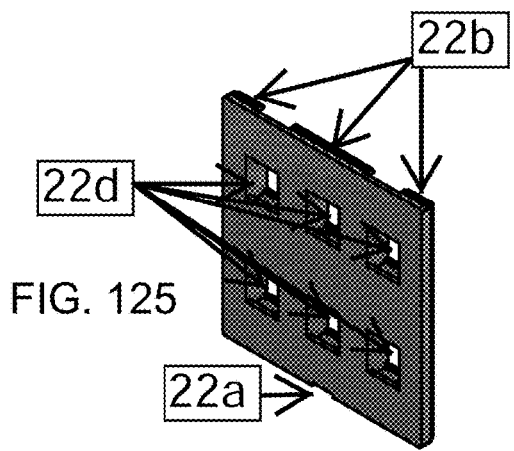
FIG. 125
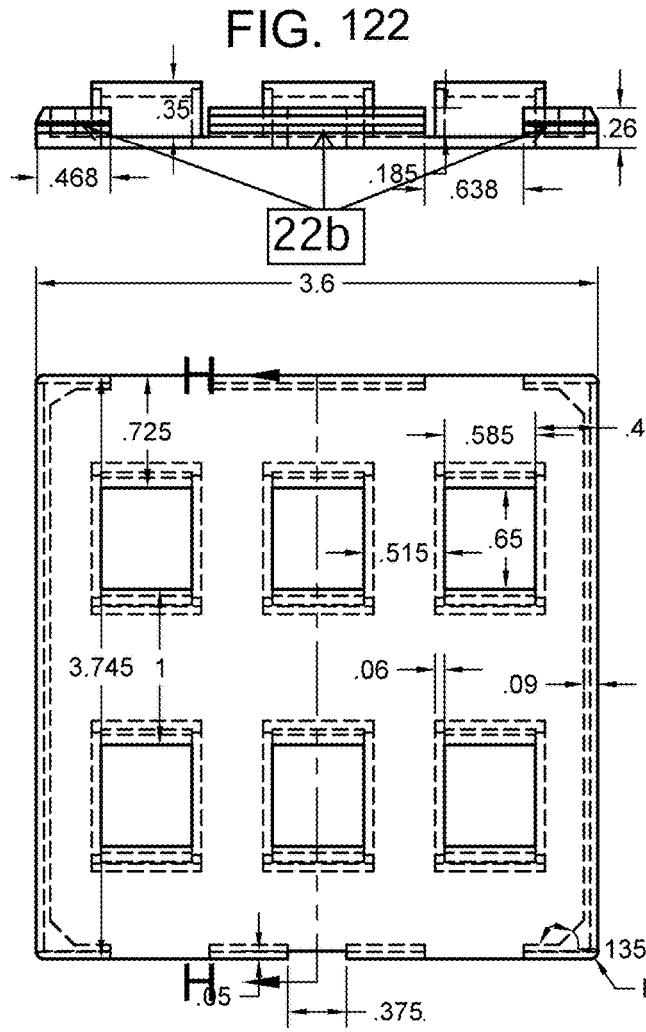
FIG. 122
FIG. 126
FIG. 123
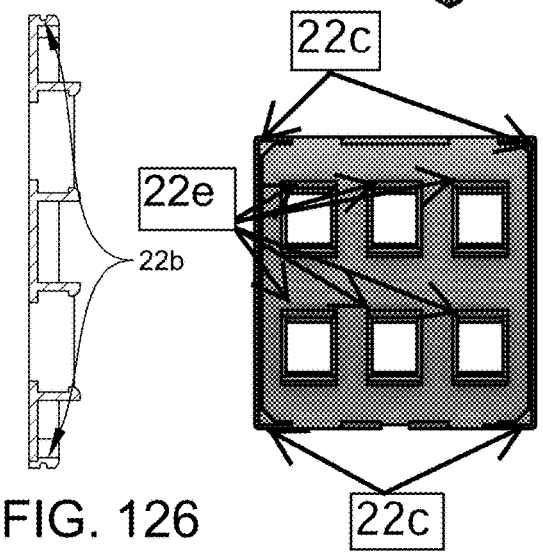
FIG. 127
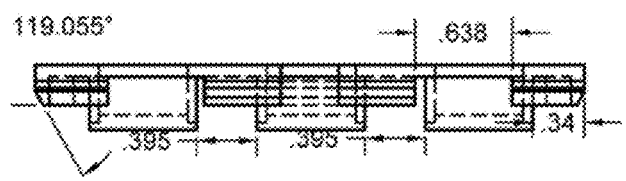
FIG. 124

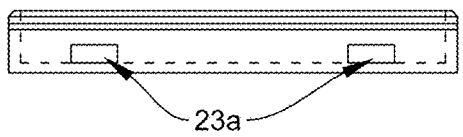
FIG. 128
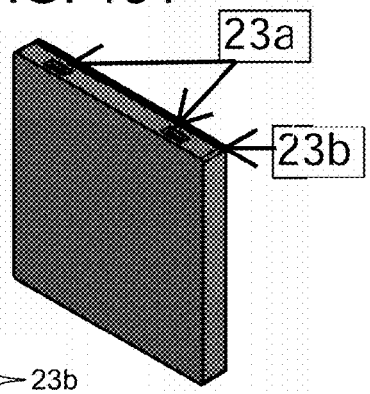
FIG. 131
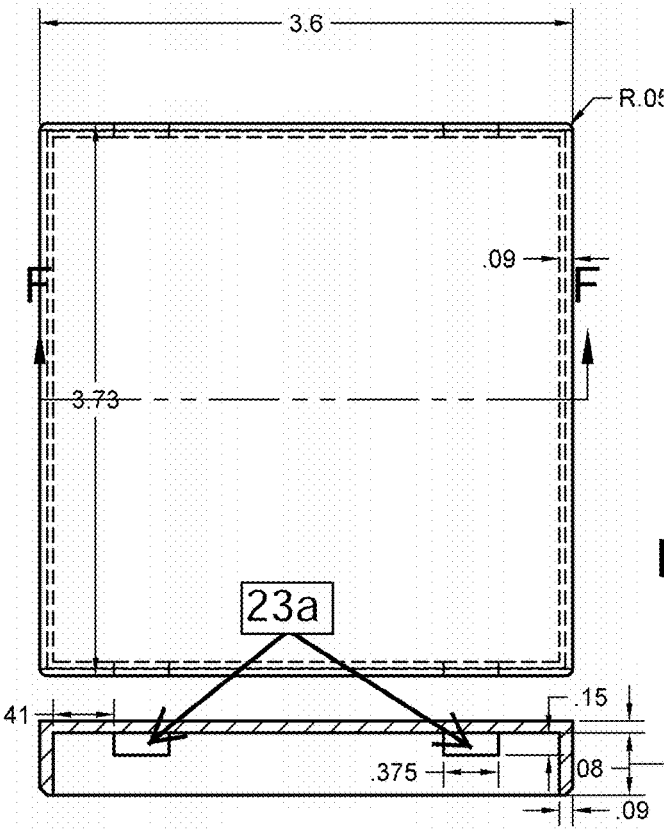
FIG. 129
FIG. 130
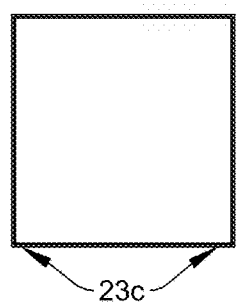
FIG. 132
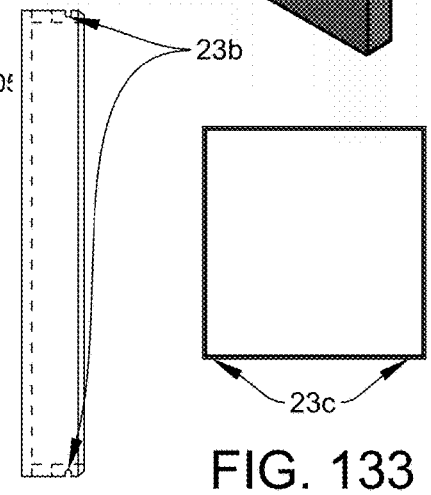
FIG. 133

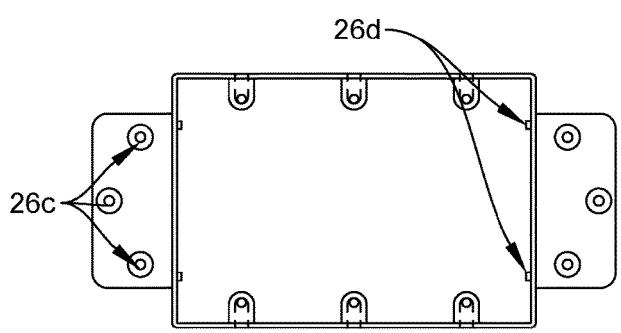
FIG. 146
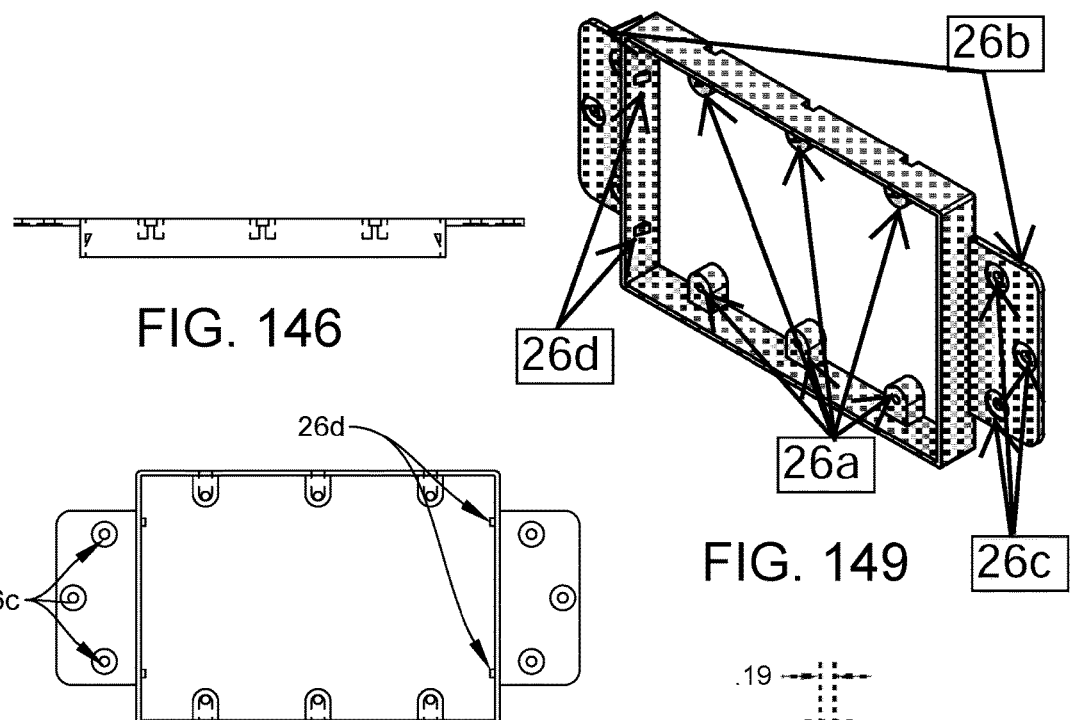
FIG. 149
FIG. 147
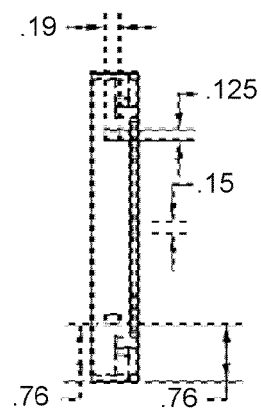
FIG. 150
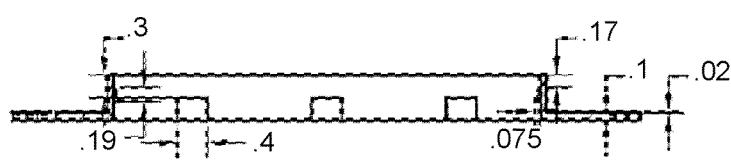
FIG. 148

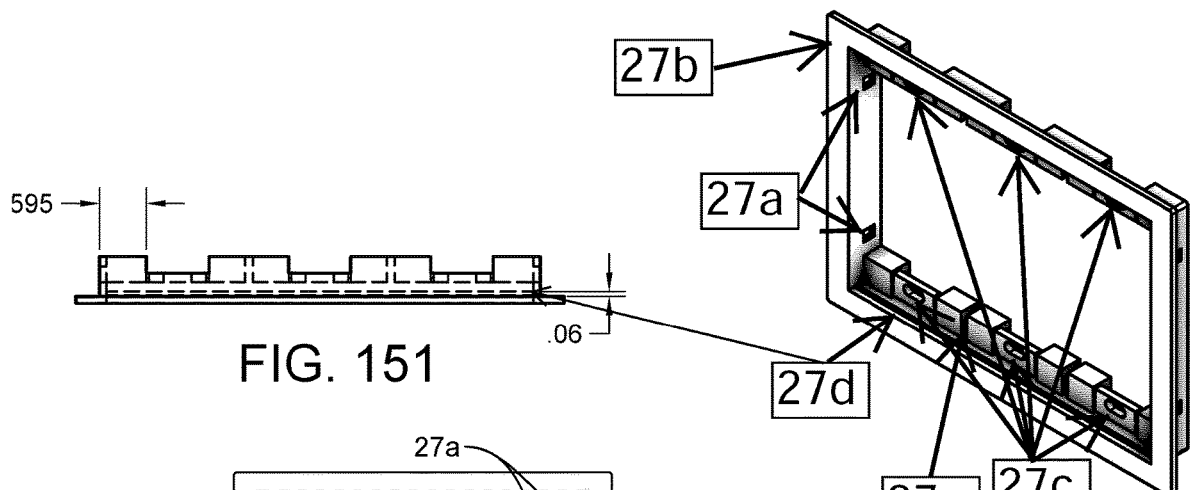
FIG. 154
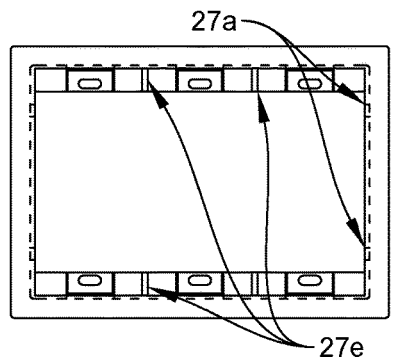
FIG. 151
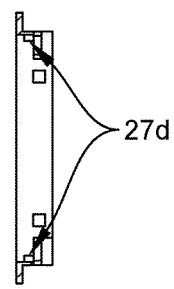
FIG. 155
FIG. 152
FIG. 153

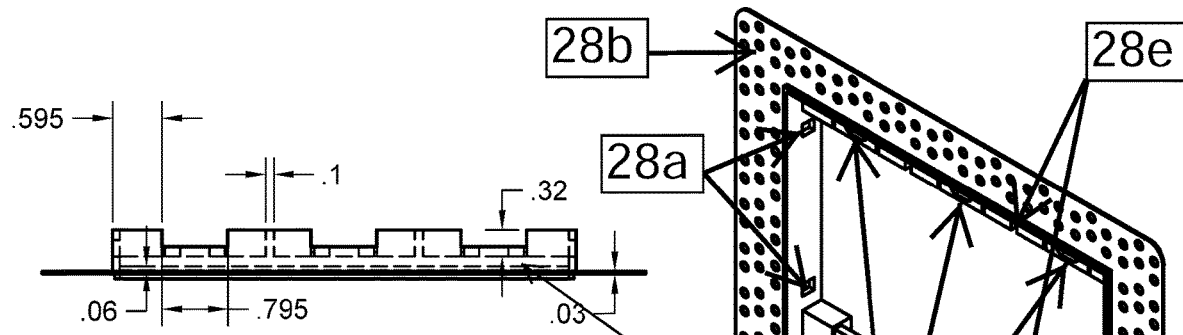
FIG. 156
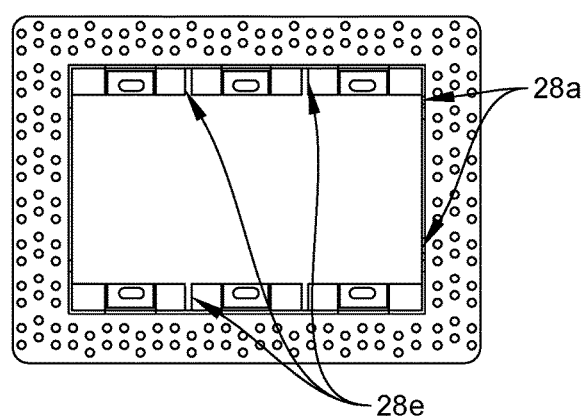
FIG. 157
FIG. 159
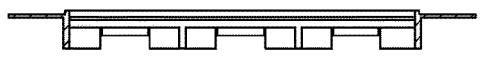
FIG. 158
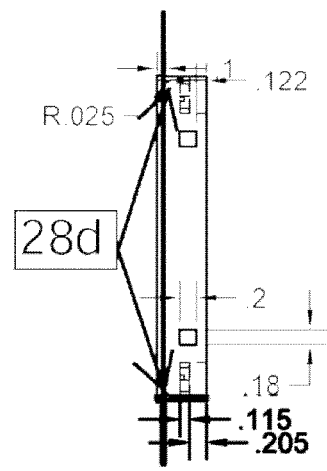
FIG. 160

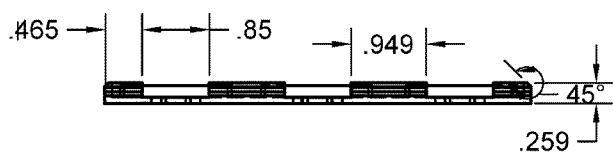
FIG. 161
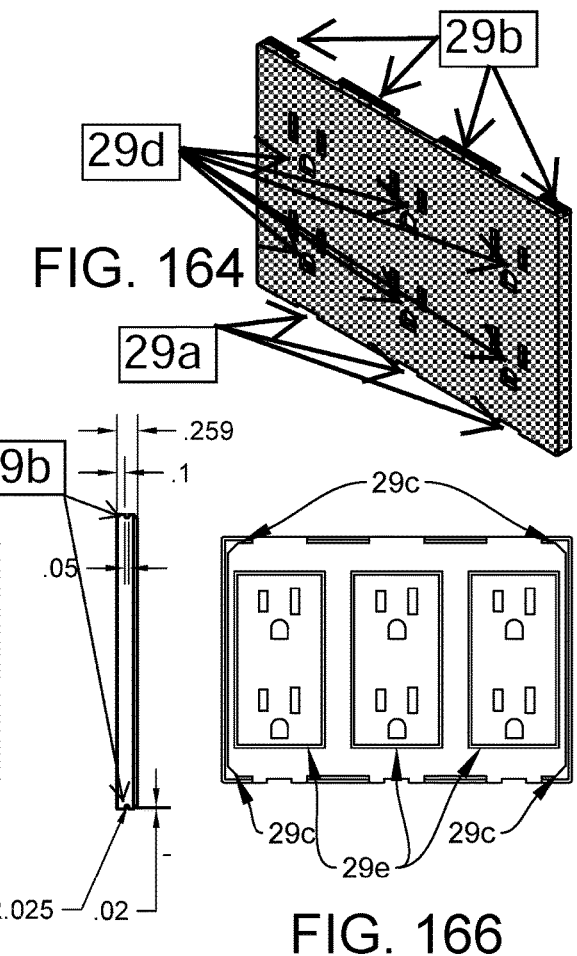
FIG. 164
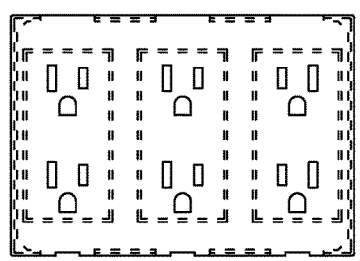
FIG. 162
FIG. 165
FIG. 166
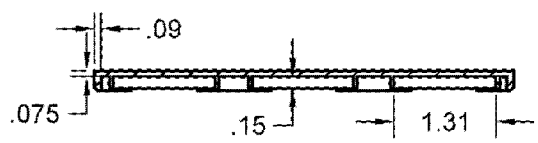
FIG. 163

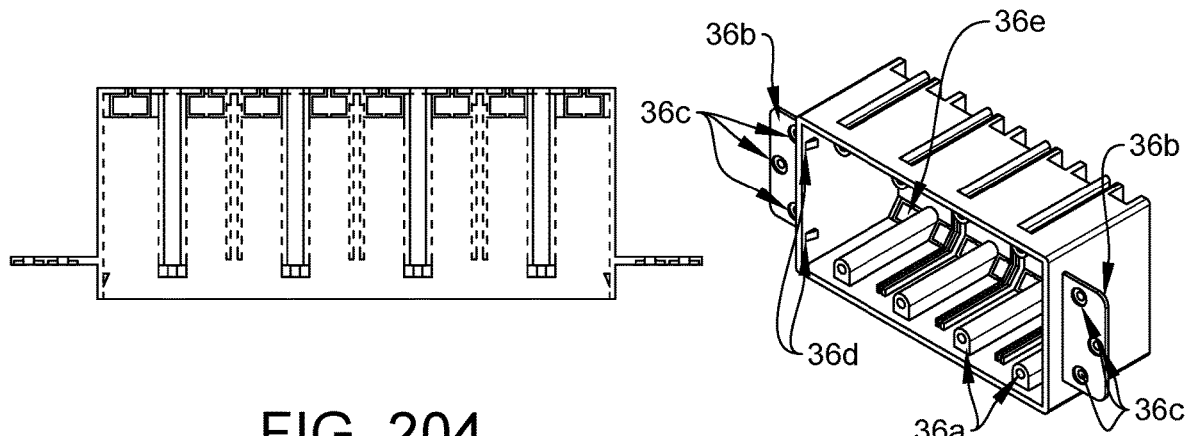
FIG. 204
FIG. 207
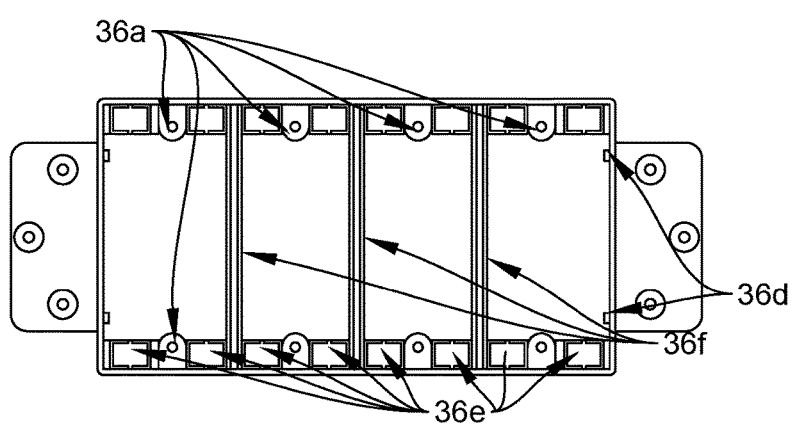
FIG. 205
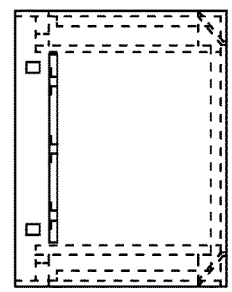
FIG. 208
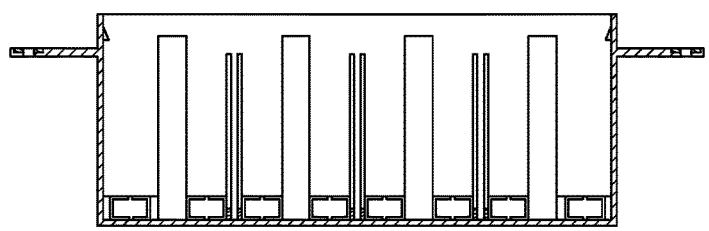
FIG. 206

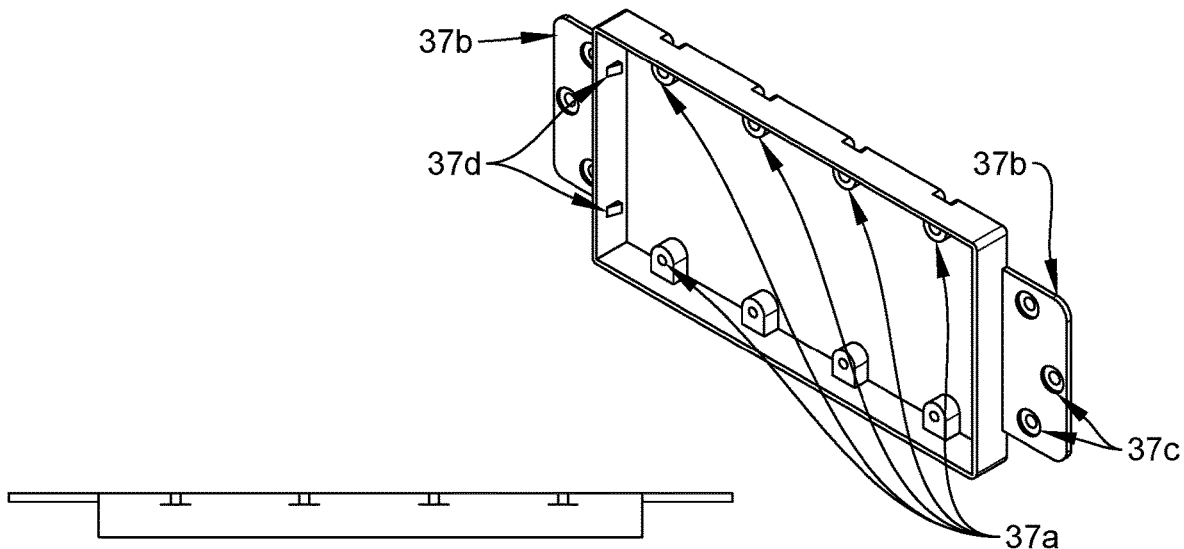
FIG. 212
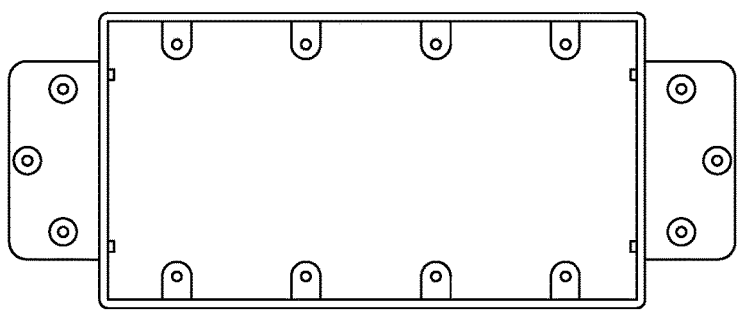
FIG. 209
FIG. 210
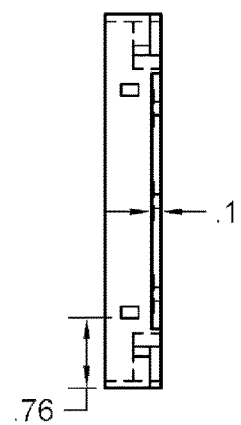
FIG. 213
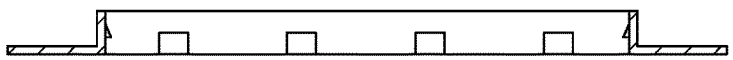
FIG. 211

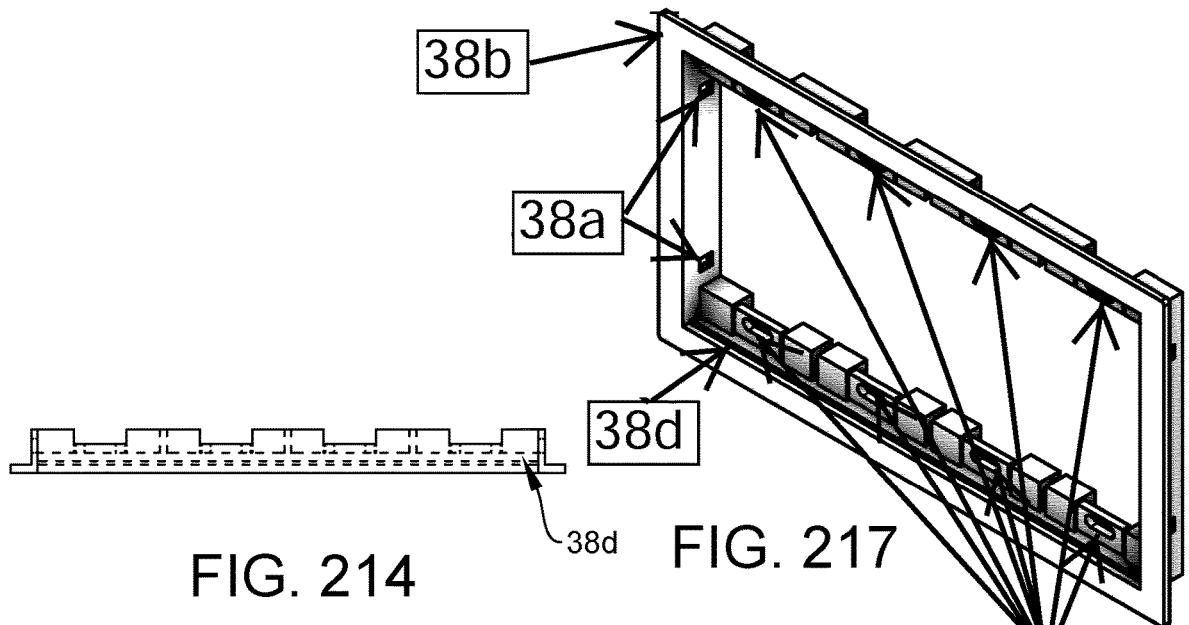
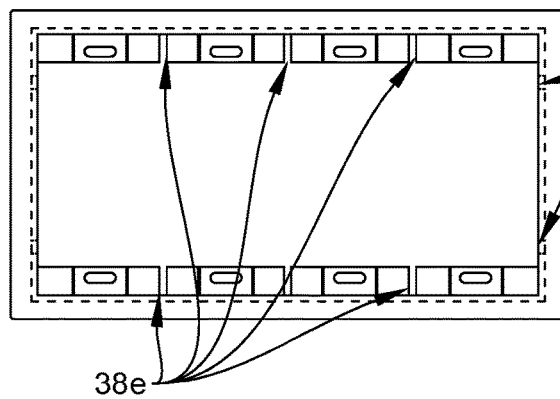
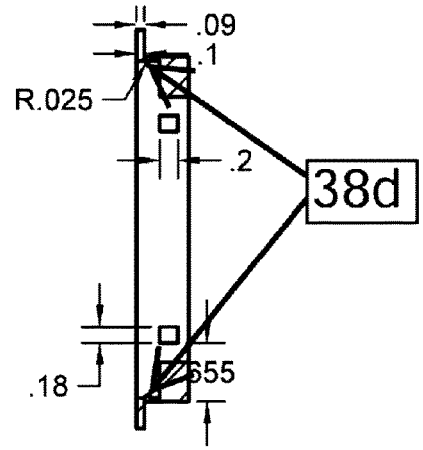
FIG. 214
FIG. 217
FIG. 215
FIG. 218
FIG. 216

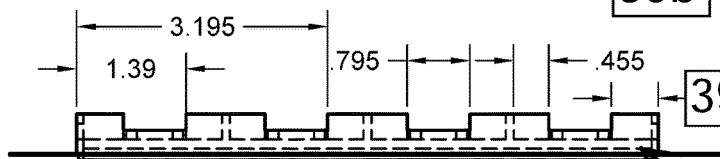
FIG. 219
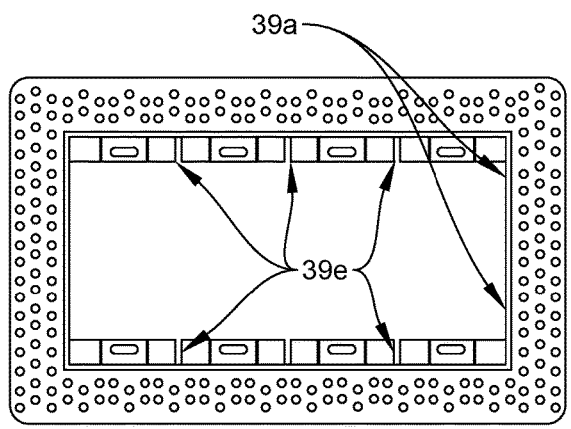
FIG. 220
FIG. 221
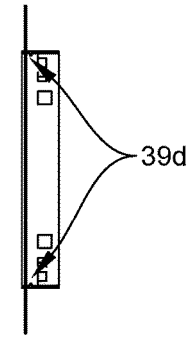
FIG. 222
FIG. 223

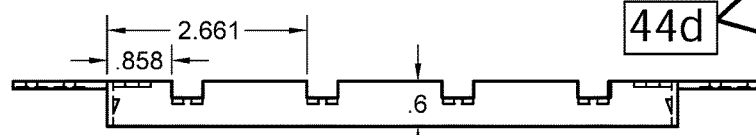
FIG. 248
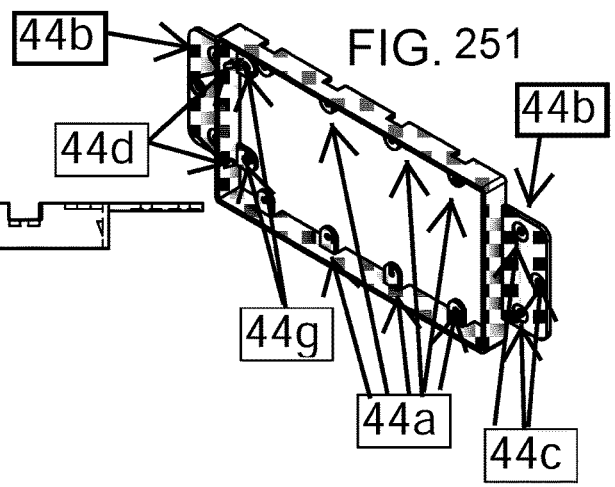
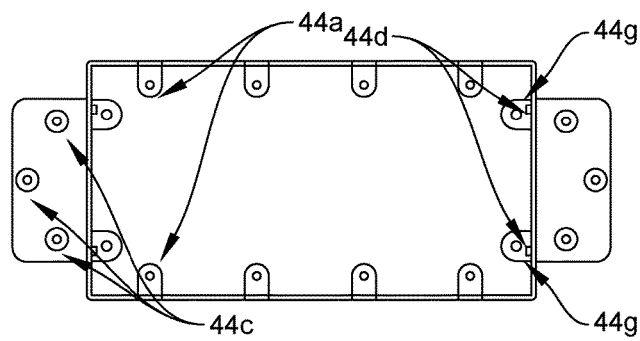
FIG. 249
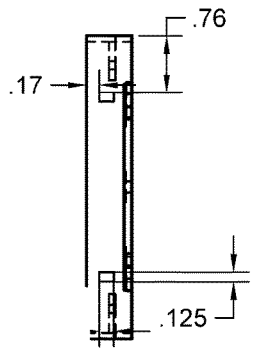
FIG. 252
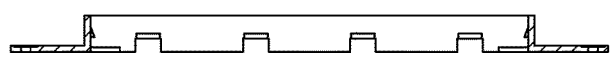
FIG. 250

45

.05

47

49

49a

FIG. 276
FIG. 275
FIG. 273
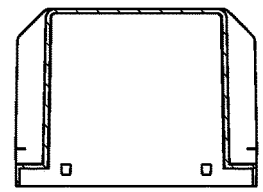
FIG. 277
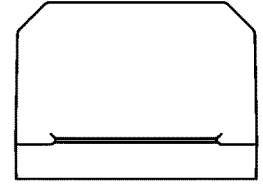
SECTION A-A
SCALE 1:2
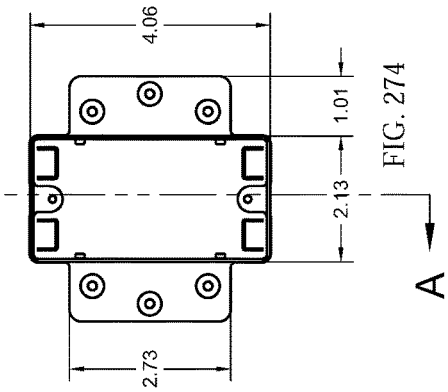
FIG. 274

SECTION A-A
SCALE 1:2

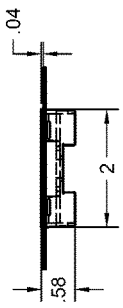
FIG. 286
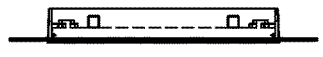
FIG. 287
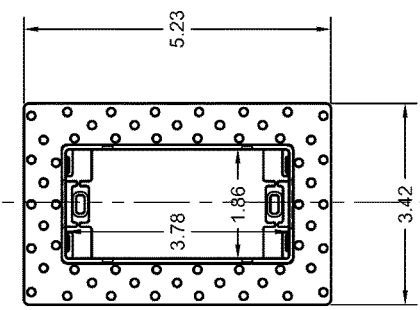
FIG. 285
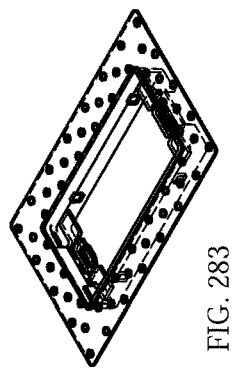
FIG. 283
FIG. 284

SECTION A-A
SCALE 1:2

| PROJECT | | | |
|---|---|---|---|
| Flush Mount | | | REV X4-2 |
| TITLE TRIM_RING_X4-2 | | | |
| SIZE B | CODE | DWG NO | |
| | SCALE 1:2 | WEIGHT | SHEET 1/1 |
| APPROVED | | | |
| CHECKED | Jeff Davison | | |
| DRAWN | 3/31/2020 | | |

SYSTEMS AND METHODS FOR INSTALLING FLUSH MOUNTED ELECTRICAL DEVICES

CROSS REFERENCE TO RELATED APPLICATIONS

This application is a continuation of application Ser. No. 16/848,408, Filed Apr. 14, 2020, which is a continuation of Provisional Application No. 62/833,954, Filed Apr. 15, 2019, both of which are herein incorporated by reference.

BACKGROUND

1. Field of the Invention

For years, homes and business have made use of electrical devices that are mounted to interior walls. For example, virtually all modern homes and businesses use light switches, electrical outlets, TV jacks, computer jacks, security cameras, motion detectors and many other wall mounted devices. Typically, such devices connect to power, data or communication sources in a box (such a switch, outlet, cable or other common box) mounted to studs behind the wall. Usually, the wall includes unsightly openings to access the box and its associated contents and electrical wiring. A corresponding cover plate (such as a switch, outlet, cable or other plate) covers the unsightly opening in the drywall or plaster. Typically, the cover plate is slightly larger than the access opening to the box, and is placed over the wall opening and simply screwed down tightly to the box. The cover plates serve the function of hiding the access opening, but are entirely visible. The cover plates on the walls are generally made of plastic and comprise a standard color determined by the manufacturer, such basic ivory, gray, black, or white.

Most interior designers, home builders, and home owners would prefer not to see these intrusive, plastic cover plates. By eliminating the standard surface-mounted cover plate, and providing systems and methods for recessing the faceplate into the wall and blending it with the wall, the present inventions drastically improve the visual appearance of wall-mounted electrical devices.

The systems and methods described herein take advantage of some existing processes for drywall installation. Specifically, as described in detail in the DETAILED DESCRIPTION, improved electrical boxes, mud rings, and faceplates are installed during specific stages of the construction and finishing of a wall that result in attractive "flush mounted" electrical devices, such as switches, outlets, telephone jacks, cable jacks, computer jacks, security cameras, motion detectors and many other wall-mounted devices.

2. Description of Related Materials

To reduce the complexity and length of the Detailed Specification, and to help establish the state of the art in certain areas of technology, Applicant(s) herein expressly incorporate(s) by reference all the following materials identified in the numbered paragraphs 1-12 below.

1. The following documents include examples of non-metal and metal boxes, brackets, and related materials: Carlon, "Zip Box Blue Switch and Outlet Boxes," (June 2006), available at http://www.carlonsales.com/techinfo/brochures/electrical/Zip%20Boxes_2B1.pdf, last accessed Mar. 5, 2019; Hubbell "Raco Steel Boxes, Covers and Accessories," (2014), available at http://hubbellcdn.com/ohwassets/HCI/RACO/Catalog/steelboxescoversaccessories.pdf, last accessed Mar. 5, 2019; Cooper Industries (EATON), "Switch & Outlet Boxes—Technical Data," (2015), available at http://www.cooperindustries.com/content/dam/public/crousehinds/commercial-products/catalog-pdfs/cp-catalos-outlet-box.section.pdf, last accessed Mar. 5, 2019; Thomas&Betts, "Steel City Metallic Boxes and Covers" (2003), available at http://www.lawoolley.com/pdf/steel_city_boxes.pdf, last accessed Mar. 5, 2019; U.S. Pat. No. 6,229,087 to Archer, titled "Gangable Electrical Box," (Issued May 8, 2001), assigned to Thomas & Betts International, Inc.; U.S. Pat. No. 8,124,872 to Vigorito et al., titled "Elastomeric Portable Electric Outlet Box," (Issued Feb. 28, 2012), assigned to Hubbell Inc.; U.S. Pat. No. 9,148,004 to Solomon, titled "Electrical Box Marking System," (Issued Sep. 29, 2015).

2. The following documents include examples of electrical outlets and light switches: Leviton, "Catalogue, Section B—Decora Devices," (undated), available at https://stevenengineering.com/tech_support/PDFs/74L10B.pdf, last accessed Mar. 9, 2019; Leviton, "Industrial Specification Grade 15 Amp and 20 Amp Duplex Receptacles," (1995), available at https://stevenengineering.com/Tech_Support/PDFs/74INDREC.pdf, last accessed Mar. 5, 2019; Cooper Industries, "Commercial grade straight blade duplex receptacles," (February 2018), available at http://www.cooperindustries.com/content/dam/public/wiringdevices/products/documents/spec_sheets2/commercial_grade_receptacles_spec_sheet.pdf, last accessed Mar. 6, 2019; Cooper Industries, "Arrow Hart hospital grade self-test GFCI receptacles," (April 2018), available at http://www.cooperindustries.com/content/dam/public/wiringdevices/products/documents/spec_sheets2/hospital_grade_gfci_specsheet.pdf, last accessed Mar. 6, 2019; Hubbell, "Section X," available at http://ecatalog.hubbell-wiring.com/press/catalog/w.pdf, last accessed Mar. 6, 2019; U.S. Pat. No. 5,363,269 to McDonald, titled "GFCI receptacle," (Issued Dec. Nov. 8, 1994), assigned to Hubbell Inc.; U.S. Pat. No. 9,526,154 to Thompson, titled "Light Switch," (Issued Dec. 20, 2016), assigned to EchoStar Technologies International Corp.

3. The following documents include examples of RJ, USB, and other low voltage connectors and keystone jacks: Structured Cable Products, "Datacom Accessories Catalog," (undated), available at https://www.scpcat5e.com/catalog/scp-datacom-accessories.pdf, last accessed Mar. 9, 2019; Polamco, "RJ45 Connectors" (2010) available at http://www.farnell.com/datasheets/1581551.pdf, last accessed Mar. 6, 2019; Mouser Electronics, Inc., "Rugged Digital Networks Solutions," (October 2018), available at https://www.mouser.com/datasheet/2/18/Catalogue%20RJ%20Field-769256.pdf, last accessed Mar. 6, 2019; Leviton, "EZ-RJ45 Connector," (2003) available at https://www.accu-tech.com/hs-fs/hub/54495/file-17725291-pdf/docs/specs/47613-ezc.pdf, last accessed Mar. 6, 2019; U.S. Pub. No. 2016/0099530 to Valenti et al., titled "Rj45 jacks and breakaway rj45 cable assemblies using same," (Published Apr. 7, 2016), assigned to Panduit Corp.; U.S. Pat. No. 6,106,328 to O'Neal, titled "Cable assembly for use with RJ45 jacks," (Issued Aug. 22, 2000).

4. The following documents include examples of building electrical cable/wire: RI, "High Voltage Wire and Cable General Specifications," available at http://www/comcraft.co.jp/products/teledynereynolds/data/multi-cables.pdf, last accessed Mar. 6, 2019; General Cable, "Building Wire," (October 2012), available at http://www.aainy.com/pdf/building_wire.pdf, last accessed Mar. 6, 2019; U.S. Pat. No.

6,909,050 to Bradford, titled "Electrical cable," (Issued Jun. 21, 2005), assigned to Plantronics Inc.; U.S. Pat. No. 3,580,987 to Priaroggia, titled "Electrical cable," (Issued May 25, 1971), assigned to Pirelli SpA A Co of Italy Soc, Pirelli SpA; U.S. Pub. No. 2018/0076616 to Thrush et al., titled "Power cable assembly having a circuit protection device," (Published Mar. 15, 2018), assigned to TE Connectivity Corp.

5. The following documents include examples of drywall and other wall materials: USG, "USG Sheetrock Brand Gypsum Panels," (June 2017), available at https://www.usg.com/content/dam/USG_Marketing_Communications/united_states/product_pro motional_material/finished_assets/sheetrock-gypsum-regular-firecode-cores-submittal-Wb1473.pdf, last accessed Mar. 5, 2019; Gold Bond, "Durasan Prefinished Gypsum Board," (July 2018), available at https://nationalgypsum.com/File/09%2072%2000-34.pdf, last accessed Mar. 5, 2019; U.S. Pat. No. 8,196,364 to Moscovitch, titled "Drywall apparatus and method," (Issued Jun. 12, 2012); U.S. Pat. No. 9,777,478 to Hulka et al., titled "Drywall sheet end joint," (Issued Oct. 3, 2017), assigned to USG Interiors LLC; U.S. Pub. No. 2011/0314759 to McCullough, titled "Drywall Product," (Published Dec. 29, 2011).

6. The following documents include descriptions of drywall, tile, and other wall finishing processes and tools: USG, "USG Sheetrock Brand Installation and Finishing Guide," (September 2015), available at https://www.usg.com/content/dam/USG_Marketing_Communications/united_states/product_pro motional_material/finished_assets/sheetrock-gypsum-panels-installation-guide-en-J371.pdf, last accessed Mar. 5, 2019; CertainTeed, "Gypsum Board Systems Manual," (June 2013), available at https://www.certainteed.com/resources/CT068C%20System%20Manual%202013-6%20-.pdf, last accessed Mar. 5, 2019; Georgia-Pacific, "DensShield Tile Backer Technical Guide," (February 2018) available at https://cache5.buildgp.com/wp-content/uploads/2018/11/DensShield-Tile-Backer-Technical-Guide.pdf, last accessed Mar. 5, 2019; Dricore, "Dricore Smartwall Detailed Installation," available at http://www/dricore.com/nw/PDF/Detailed_Installation_Guide_web-2.pdf?_ga=2.2754935.698343861.1551842844-1360570901.1551842844, last accessed Mar. 5, 2019; Taylor, Glenda, "How to: Mud Drywall," (undated), available at https:www.bobvila.com/articles/how-to-mud-drywall/, last accessed Mar. 8, 2019; diy Network, "Hot to Hand Drywall and Mud, (undated), available at https://diynetwork.com/how-to/rooms-and-spaces/walls-and-ceilings/how-to-hang-drywall-and-mud, last accessed Mar. 8, 2019; Lowe's, "How to Hang Drywall," (undated), available at https://www.lowes.com/projects/build-and-remodel/how-to-hang-drywall/project, last accessed Mar. 8, 2019; U.S. Pat. No. 6,450,232 to Smythe, Jr., titled "Drywall finishing roller and edge finisher," (Issued Sep. 17, 2002); U.S. Pat. No. 6,695,181 to Kreitzer et al., titled "Mud gun and hopper assembly," (Issued Feb. 24, 2004); U.S. Pat. No. 9,069,028 to Ebner et al., titled "Magnetic stud fastener finder," (Issued Jun. 30, 2015); U.S. Pub. No. 2015/0091553 to Wong, titled "Method and apparatus for a stud finder," (Published Apr. 2, 2015).

7. The following documents include examples of mud, joint compound, and other wall finishing compounds: National Gypsum, "Proform Brand All Purpose Joint Compound," (February 2019), available at https://www.nationalgypsum.com/File/09%2029%2000-43.pdf, last accessed Mar. 5, 2019; USG, "USG Sheetrock Brand All Purpose Joint Compound," (October 2016), available at http://pdf.lowes.com/operatingguides/081099203602_oper.pdf, last accessed Mar. 5, 2019; Phenopatch, "DAP Phenopatch Premium Lightweight Joint Compound with Drydex Dry Time Indicator Technology," (November 2013) available at http://www.phenopatch.com/docs/tdb/9.pdf, last accessed Mar. 5, 2019; U.S. Pat. No. 9,039,831 to Trudeau, titled "Non-aqueous rapid setting drywall compound and method of use," (Issued May 26, 2015).

8. The following documents include examples of drywall screws and other fasteners: Fastenal, "Drywall Screw, Bugle Head, Cross Recessed Drive, Pierce Point, Coarse Thread, Yellow Zinc," (October 2018), https://www.fastenal.com/content/product_specifications/DRWL.BHPH.PP.COR.Y-Z.pdf, last accessed Mar. 6, 2019; PrimeSource Building Products, Inc., "Fasteners," (October 2010), available at http://www.jwlumber.com/wp-content/uploads/2015/07/GRFCAT_fastener_catalogrgma.pdf, last accessed Mar. 6, 2019.

9. The following documents describe typical faceplates for covering wall-mounted electrical devices: Leviton, "Wallplate Buying Guide," (Copyright 2015), available at https://images.homedepot-static.com/catalog/pdfImages/56/566b87e5-ea5a-4976-a9d2-9fb99b7d8680.pdf, last accessed Mar. 8, 2019; Eaton "2016 Arrow Hart Buyers Guide, Section K (2016) available at http://www.cooperindustries.com/content/dam/public/wiringdevices/BuyersGuides/AHBG/K/AHBG-K-Sec.pdf, last accessed Mar. 8, 2019; U.S. Pub. No. 2017/0331265 to Evilziser, titled "Electrical Outlet Cover," (Published Nov. 16, 2017); U.S. Pub. No. 2017/0110862 to Kirkland, titled "Electrical Face Plates with Magnets and Associated Methods," (Published Apr. 20, 2017); U.S. Pat. No. 6,215,066 to Kelso et al., titled "Outlet Covering Plate," (Issued Apr. 10, 2001).

10. The following documents describe the TRUFIG system: TRUFIG, "Installation Guide," (Dec. 2, 2016), available at https://static1.squarespace.com/static/56746411c647ad126efd0b08/t/5841f4d09f7456bcf344653b/14807175244900/TRUFIG+Install+Guide_12-02-16.pdf, last accessed Mar. 8, 2019; TRUFIG Sales Brochure, Copyright 2013, available at https://static1.squarespace.com/static/56746411c647ad126efd0b08/t/57b1fdd9f5e231d16e9f2a4f/14712826594/Trufig_Brochure.pdf, last accessed Mar. 8, 2019; TRUFIG, "Retail Price List," (Oct. 4, 2016), available at https://static1.squarespace.com/static/56746411c647ad126efd0b08/t/57f5357b2e69cfcc6c9816b3/14756807191/TRUFIG+Retail+Price+List_10_4_16.pdf, last accessed Mar. 8, 2019; U.S. Pub. No. 2009/0249705 to Struthers et al., titled "Mounting Receivers with Spackling Rim Gradient," (Published Oct. 8, 2009), assigned to TRUFIG.

11. U.S. Pat. No. 4,890,418 to Sachs, titled "Access Panel Assembly with Door and Multi-Functional Frame," (Issued Jan. 2, 1990), describes a flush-mounted panel assembly.

12. U.S. Pat. No. 7,166,801 to Gretz, titled "Electrical Box Assembly for Recessing an Electrical Device," (Issued Jan. 23, 2007), assigned to Arlington Industries Inc., describes a recessed electrical box assembly.

The above materials provide detailed descriptions of current wall construction and electrical equipment mounting processes, and a brief summary is provided below.

Usually, during construction or remodeling, before the walls are finished, electrical boxes and other equipment that will be accessed through the finished wall are mounted to the studs or other supporting structures in the framing of the wall. Existing electrical mounting systems typically include some form of a box for housing the electrical equipment. Most states and municipalities have specific building codes that apply to these boxes, including requirements relating to their placement, the materials from which they are constructed, and in some cases, specific design or mounting requirements. For example, in certain applications, building codes require for the boxes to include a back side, so that the unit includes five sides of a "box" (with only the front of the unit being open) to house electrical equipment behind the outward facing faceplate of the wall. In other applications (such as for low voltage equipment), building codes do not require a back side for the electrical box. The interior walls typically are not finished until after the various electrical boxes are mounted at appropriate locations and connected with the appropriate wiring necessary to power or communicate with the corresponding electrical equipment.

The process of installing a finished wall with drywall includes multiple steps. First, standard pieces of drywall are fitted into place, cut to size, and cut with access holes that fit over the electrical outlets and other devices that will ultimately be exposed and then covered on the finished wall. Several pieces of drywall are used together to form a finished wall, and the pieces of drywall are screwed or nailed into the wall studs and also held together by joints or seams between the pieces of drywall.

After the drywall pieces are installed, the wall is finished through the "mudding" process. During mudding, several layers of mud (which comes in various forms depending on the application) are applied to the drywall to seal and smooth the joints between pieces of drywall, fill in crevices, hide the screws/nails, and generally to give the wall a "finished" look. Typically, two to three preliminary layers of mud are applied to the drywall before a final "finish" layer of mud is applied. Often the finish layer of mud is a different material from the initial layers, and it can be a smooth or a rough finish depending on preference. Each layer of mud is allowed to dry before the next layer of mud is applied. Some forms of quick drying or "hot" mud dry within 20 minutes of application, and some forms of mud dry within five minutes or less. Other forms of mud can take 24 to 48 hours to dry. Finally, the wall is painted only after the last or finish coat of mud has completely dried.

Usually, the electrical outlets and other electrical equipment remains exposed through the access openings in the wall during the mudding, painting and finishing processes. At the end of the finishing process, plates are placed on top of the access openings in the finished wall and then screwed into the electrical boxes to cover and hide the electrical wiring and related equipment behind the drywall. The plates cover the unsightly access openings while still providing access to power, communication sources, switches, etc. in the box and equipment behind the wall.

Standard plates that are mounted according to the above methods are very visible and tend to "stand out" from the remainder of the wall. Even if they are painted or otherwise matched to the color of the wall, they sit on top of the wall and include visible screws.

Recognizing this issue, at least one company has attempted to develop electrical equipment mounting and cover plate systems that result in a more "flush" look between a wall or interior surface and the various electrical boxes or equipment installed in the walls. One example of such a system is the "TRUFIG" mounting system, which is described and disclosed in several corresponding references identified above. As discussed below, the TRUFIG system suffers from several major shortcomings.

One flaw with the TRUFIG system is that it is mounted though a difficult process involving expensive materials. The TRUFIG system includes a large and expensive gypsum "mounting platform" that is screwed into the studs of the wall, fitted with the drywall, and mudded at the same time drywall is mudded. See TRUFIG Installation Guide at Page 4. The mounting platform includes a preinstalled box, mud dam, "panel bracket," and other components for mounting the electrical outlet or other electrical equipment and attaching a face plate.

The TRUFIG mounting platform is sized to fit onto the studs of a standard 16" O.C. stud-bay. However, when spacing between studs is shorter, the mounting platform must be cut to size with a knife, circular saw, blade, or table saw before it is mounted to the studs. See Installation Guide at Page 4. Alternatively, the existing studs must be modified or relocated, which is often impractical.

After the mounting platform is cut to size, it is leveled and screwed into the studs with at least three screws on each side to secure the platform into place. Pieces of drywall are carefully cut and then fitted around the platform after it is mounted to the studs. The mounting platform essentially "replaces" the drywall in the area it is mounted drywall is fitted to surround it. Then, during mudding, both the drywall and the mounting platform are mudded. See TRUFIG Installation Guide at Pages 5-6. Patch clips can also be screwed into the mounting platform to support the surrounding drywall.

Because the mounting platform acts as a replacement for the drywall, it must also be carefully aligned with the drywall prior to mudding. For example, the TRUFIG Installation Guide states "Prior to proceeding to applying mud to the panel ensure that: 1) the platform is level, 2) the depth of the mud dam is equal to any surrounding corner bead, and 3) the panel bracket is not recessed in relationship to any surrounding drywall." TRUFIG Installation Guide at Page 5. The above process is complex, labor intensive and time consuming.

An additional problem with the TRUFIG system is that its mounting platform requires extra mesh tape during drywall mudding. More specifically, the TRUFIG mounting platform has a "panel bracket" that holds the back box into place. This panel bracket is intended to be mudded over during mudding. However, this bracket does not include any pores or holes to assist with mud adhesion to the bracket. Thus in order to properly mud over the panel bracket, the installer of TRUFIG must tape over the panel bracket and surrounding areas of the mounting platform prior to mudding. See TRUFIG Installation Guide at page 5. Again, this process is time consuming and labor intensive, and adds further cost to the process.

Another problem with TRUFIG is that the electrical outlet or other device installed in the box behind the wall cannot be wired and installed until after drywall installation and mudding is completed. See TRUFIG Installation Guide at page 7. More specifically, after mudding is completed, the electrical device is attached to a "sub plate" and wired. The sub plate is then screwed into the box of the mounting platform. The sub plate includes a recess for housing neodymium magnets. The magnets are used to magnetically secure the fascia plate that covers the electrical device.

With the TRUFIG system, the steps of mounting and wiring the electrical equipment and sub plate cannot be completed before mudding unless the installer is willing to expose the installed electrical equipment and subplate to the mud and/or dust during mudding and sanding process. More specifically, to protect the inside area of the TRUFIG panel bracket during mudding, a "sanding shield" is taped to the opening of the mud dam surface. See TRUFIG Installation Guide at page 5. The sanding shield is designed to fit in place of the sub plate, and it will not fit over an installed sub plate and electrical device. In other words, the sub plate and device must be installed after the sanding shield is removed. TRUFIG provides no mechanism for protecting an already installed subplate and electrical device during mudding.

Yet another problem with the TRUFIG sub plate is that the screws locking it into place must be adjusted to properly align the fascia plate to be "flush" with the wall. See TRUFIG Installation Guide at page 7. The sub plate is screwed to the wall, and to determine that the depth of the plate is correct, a separate "Fascia Adjustment Tool" is used to demonstrate visually to the installer what the depth of the fascia will be relative to the finished wall. In the alternative, the installer can insert the fascia plate, check the depth, pull off the fascia plate, adjust the screws, reattach the fascia plate, and continue repeating this process of manually checking and adjusting the screws until the depth of the fascia plate is correct. In either case, the sub plate screws must be adjusted until the fascia plate is properly aligned with the wall. This process adds still further time and labor to complete the installation.

In addition, the TRUFIG system is very expensive compared to standard wall mounted electrical systems (with retail prices starting at $135 for the mounting platform alone, and additional costs for the fascia plates and other tools). See TRUFIG Retail Price List, Oct. 4, 2016. TRUFIG's use of neodymium magnets to attach the fascia plates is certainly one of the main factors driving up the cost of the product.

Unlike the TRUFIG system, the systems and methods described herein provide an affordable, easy to use, and effective system for mounting electrical devices flush with the wall.

For example, the inventions variously described herein do not require a large mounting platform that is cut to size. Instead, an electrician can simply screw the back box ear into a stud and then install the wiring (and optionally the electrical equipment itself) before drywall is hung. Furthermore, with the novel systems and methods described herein, when hanging drywall, the drywall contractor simply cuts a hole in the piece of drywall that will fit around the back box drywall contractors are familiar with cutting holes for electrical equipment, and its already part of the typical drywall hanging process. Thus, the back box is installed and the dry wall is hung around it in a way that is not too far afield from existing processes in the industry (in contrast with the specialized "mounting platform" of the TRUFIG system). However, as result of the important improvements described herein, the completed systems and assembly methods provide for a flush, finished appearance to the installed electrical equipment and plates.

The systems and methods described herein also greatly improve the installation process by including various forms of specialized mud rings for the access openings in walls. The mud rings of the system described herein include built-in holes/pours that are appropriately sized to allow the mud to pass through and adhere to the drywall behind the mud ring. In accordance with inventions described herein, a mud ring is placed over the access hole in the dry wall and snapped into place with the box behind the wall, and then the mud ring is mudded over at the same time the drywall itself is mudded. With the inventive systems and methods, no separate steps or mesh taping is required. There is also no need to adjust any mounting platform to match the depth of the drywall the mud ring easily snaps into place on top of standard drywall.

In addition, with the present inventions, an electrician can fully complete the electrical installation work and mount the electrical device before any drywall fitting or painting takes place. For example, the electrician can mount the back box to the studs, insert the wiring, and then wire the electrical device and mount it to the back box. At this point, the electrician is finished with his portion of the installation work before drywall installation begins. The drywall contractor can then fit the drywall over the installed box, insert the mud ring, and insert the mud plug to protect all of the installed electrical items during mudding. The drywall contractor can then complete mudding without further manipulation of any of the electrical equipment, which is safely protected behind the mud plug.

In contrast, and as summarized above and described in TRUFIG's materials, the electrical equipment is mounted in the TRUFIG system with the sub plate. TRUFIG taping the sanding shield over the box to protect it during mudding, and then to removing it to install the sub plate and electrical equipment after mudding. If the sub plate and electrical equipment is installed before, it cannot be covered by the sanding shield, and it will be exposed to and possibly damaged by the mud.

Applicant(s) believe(s) that the material incorporated by reference above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), Applicant(s) will amend the specification to expressly recite the essential material that is incorporated by reference as allowed by the applicable rules.

SUMMARY OF THE INVENTION

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographer, to use only the plain and ordinary meaning of terms in the specification and claims unless he or she clearly states otherwise and also expressly sets forth the "special" definition of that term and explains how it differs from the plain and ordinary meaning. Absent such clear statements of intent to apply a "special" definition to a term, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of 35 U.S.C. § 112(f). Moreover, even if the provisions of 35 U.S.C. § 112(f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The aspects, features, and advantages will be apparent to those artisans of ordinary skill in the art from the DETAILED DESCRIPTION and DRAWINGS, and from the CLAIMS. However, without attempting to characterize or limit the scope of inventions as they are described and claimed, some of the advantages of the various inventions are summarized below.

It is an object of the invention to mount electrical and other devices flush with a finished wall.

It is another (and optionally independent) object of the invention to provide a flush-mounting system for electrical and other devices and installation methods that are easier than existing methods that attempt to achieve a flush-mounted look.

It is another (and optionally independent) object of the invention to provide a flush-mounting system for electrical and other devices and installation methods that take advantage of existing steps in the wall-finishing process.

It is another (and optionally independent) object of the invention to provide a flush-mounting system for electrical and other devices that is affordable.

It is another (and optionally independent) object of the invention to provide a flush-mounting system for electrical and other devices that can be paired with existing metal junction boxes.

It is another (and optionally independent) object of the invention to provide a flush-mounting system that enables electrical devices to be installed within a back box before drywall installation.

It is another (and optionally independent) object of the invention to provide paint plugs, mud plugs, and other tools or covers to protect electrical junctions during mudding and painting.

It is another (and optionally independent) object of the invention to provide a mud ring to be blended with and adhered to drywall during the mudding process.

It is another (and optionally independent) object of the invention to provide systems and methods for mounting electrical junctions behind a hard surface (such as wood or tile).

It is another (and optionally independent) object of the invention to provide systems and methods for mounting low voltage and high voltage equipment within the same electrical junction box.

It is another (and optionally independent) object of the invention for faceplates to be sturdy, flush, and easy to install/remove.

It is another (and optionally independent) object to provide efficient flush mounting systems that are made of plastic and can be cost-effectively manufactured with computerized three-dimensional printing systems.

It is another (and optionally independent) object to provide flush mounting systems that can be easily adapted for a wide range of electrical devices, such as computers, cameras, switches, outlets and other components that typically connect to electrical, communication and component boxes mounted behind walls.

It is another (and optionally independent) object to provide flush mounting systems and methods that provide an attractive flush finish and can be installed and finished with minimal additional labor and materials as compared to previously existing systems.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures. The dimensions in the figures are merely exemplary and not intended to limit the scope of the invention, and dimensions can be adjusted for various applications.

FIG. 3 depicts a top view of the Single Gang Back Box 1.

FIG. 4 depicts a front view of the Single Gang Back Box 1.

FIG. 5 depicts a cross-sectional view of the Single Gang Back Box 1.

FIG. 6 depicts a right side view of the Single Gang Back Box 1.

FIG. 7 depicts an isometric view of the Single Gang Back Box 1.

FIG. 8 depicts a top view of the Single Gang Half Box 2.

FIG. 9 depicts a front view of the Single Gang Half Box 2.

FIG. 10 depicts a cross-sectional view of the Single Gang Half Box 2.

FIG. 11 depicts an isometric view of the Single Gang Half Box 2.

FIG. 12 depicts a right side view of the Single Gang Half Box 2.

FIG. 13 depicts a top view of the Single Gang Trim Ring 3.

FIG. 14 depicts a front view of the Single Gang Trim Ring 3.

FIG. 15 depicts a cross-sectional view of the Single Gang Trim Ring 3.

FIG. 16 depicts an isometric view of the Single Gang Trim Ring 3.

FIG. 17 depicts a right side view of the Single Gang Trim Ring 3.

FIG. 41 depicts a top view of the Single Gang Blank Faceplate 8.

FIG. 42 depicts a front view of the Single Gang Blank Faceplate 8.

FIG. 43 depicts a cross-sectional view of the Single Gang Blank Faceplate 8.

FIG. 44 depicts an isometric view of the Single Gang Blank Faceplate 8.

FIG. 45 depicts a right side view of the Single Gang Blank Faceplate 8.

FIG. 46 depicts a back view of the Single Gang Blank Faceplate 8

FIG. 47 depicts a top view of the Single Gang One Connector Faceplate 9.

FIG. 48 depicts a front view of the Single Gang One Connector Faceplate 9.

FIG. 49 depicts a cross-sectional view of the Single Gang One Connector Faceplate 9.

FIG. 50 depicts an isometric view of the Single Gang One Connector Faceplate 9.

FIG. 51 depicts a right side view of the Single Gang One Connector Faceplate 9.

FIG. 52 depicts a back view of the Single Gang One Connector Faceplate 9.

FIG. 53 depicts a top view of the Single Gang Two Connector Faceplate 10.

FIG. 54 depicts a front view of the Single Gang Two Connector Faceplate 10.

FIG. 55 depicts a cross-sectional view of the Single Gang Two Connector Faceplate 10.

FIG. 56 depicts an isometric view of the Single Gang Two Connector Faceplate 10.

FIG. 57 depicts a right side view of the Single Gang Two Connector Faceplate 10.

FIG. 58 depicts a back view of the Single Gang Two Connector Faceplate 10.

FIG. 59 depicts a top view of the Single Gang Mud Plug 11.

FIG. 60 depicts a front view of the Single Gang Mud Plug 11.

FIG. 61 depicts a cross-sectional view of the Single Gang Mud Plug 11.

FIG. 62 depicts an isometric view of the Single Gang Mud Plug 11.

FIG. 63 depicts a right side view of the Single Gang Mud Plug 11.

FIG. 64 depicts a back view of the Single Gang Mud Plug 11.

FIG. 92 depicts a top view of the Double Gang Electrical Outlet Faceplate 17.

FIG. 93 depicts a front view of the Double Gang Electrical Outlet Faceplate 17.

FIG. 94 depicts a cross-sectional view of the Double Gang Electrical Outlet Faceplate 17.

FIG. 95 depicts an isometric view of the Double Gang Electrical Outlet Faceplate 17.

FIG. 96 depicts a right side view of the Double Gang Electrical Outlet Faceplate 17.

FIG. 97 depicts a back view of the Double Gang Electrical Outlet Faceplate 17.

FIG. 116 depicts a top view of the Double Gang Four Connector Faceplate 21.

FIG. 117 depicts a front view of the Double Gang Four Connector Faceplate 21.

FIG. 118 depicts a cross-sectional view of the Double Gang Four Connector Faceplate 21.

FIG. 119 depicts an isometric view of the Double Gang Four Connector Faceplate 21.

FIG. 120 depicts a right side view of the Double Gang Four Connector Faceplate 21.

FIG. 121 depicts a back view of the Double Gang Four Connector Faceplate 21

FIG. 122 depicts a top view of the Double Gang Double Gang Six Connector Faceplate 22.

FIG. 123 depicts a front view of the Double Gang Double Gang Six Connector Faceplate 22.

FIG. 124 depicts a cross-sectional view of the Double Gang Double Gang Six Connector Faceplate 22.

FIG. 125 depicts an isometric view of the Double Gang Double Gang Six Connector Faceplate 22.

FIG. 126 depicts a right side view of the Double Gang Double Gang Six Connector Faceplate 22.

FIG. 127 depicts a back view of the Double Gang Double Gang Six Connector Faceplate 22.

FIG. 128 depicts a top view of the Double Gang Mud Plug 23.

FIG. 129 depicts a front view of the Double Gang Mud Plug 23.

FIG. 130 depicts a cross-sectional view of the Double Gang Mud Plug 23.

FIG. 131 depicts an isometric view of the Double Gang Mud Plug 23.

FIG. 132 depicts a right side view of the Double Gang Mud Plug 23.

FIG. 133 depicts a back view of the Double Gang Mud Plug 23.

Figure 134:
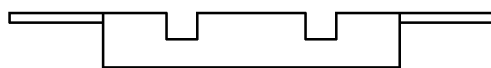

FIG. 134 depicts a top view of the Double Gang Metal Adapter 24.

Figure 135:
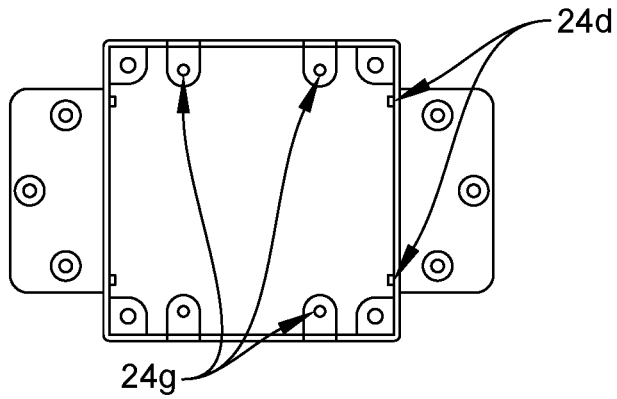

FIG. 135 depicts a front view of the Double Gang Metal Adapter 24.

Figure 136:
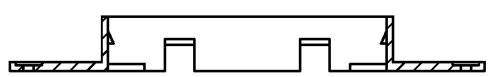

FIG. 136 depicts a cross-sectional view of the Double Gang Metal Adapter 24.

Figure 137:
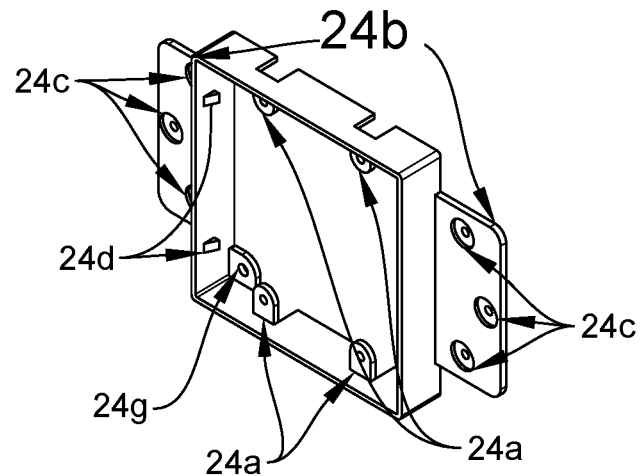

FIG. 137 depicts an isometric view of the Double Gang Metal Adapter 24.

Figure 138:
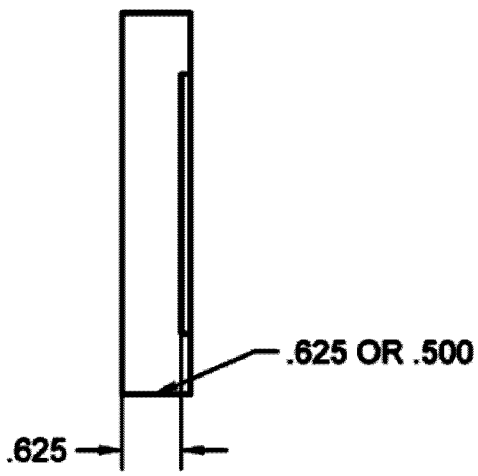

FIG. 138 depicts a right side view of the Double Gang Metal Adapter 24.

Figure 139:
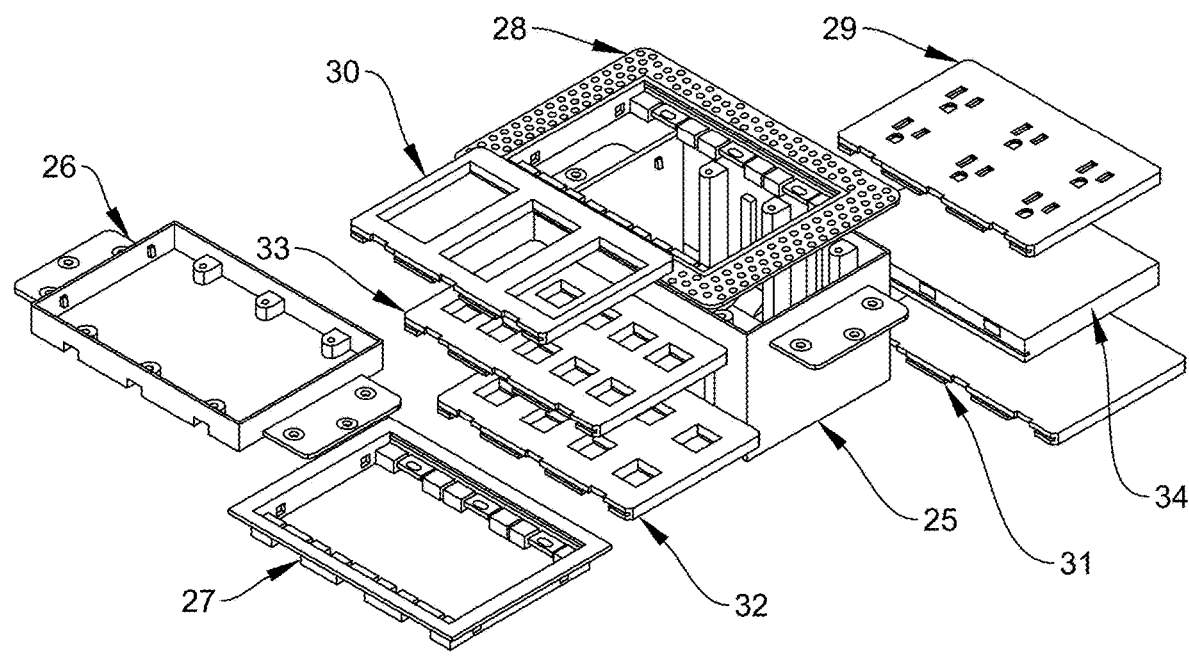

FIG. 139 depicts a Triple Gang Back Box 25, Triple Gang Half Box 26, Triple Gang Trim Ring 27, Triple Gang Mud Ring 28, Triple Gang Electrical Outlet Faceplate 29, Triple Gang Light Switch Faceplate 30, Triple Gang Blank Faceplate 31, Triple Gang Eight Connector Faceplate 32, Triple Gang Ten Connector Faceplate 33, and Triple Gang Mud Plug 34.

Figure 140:
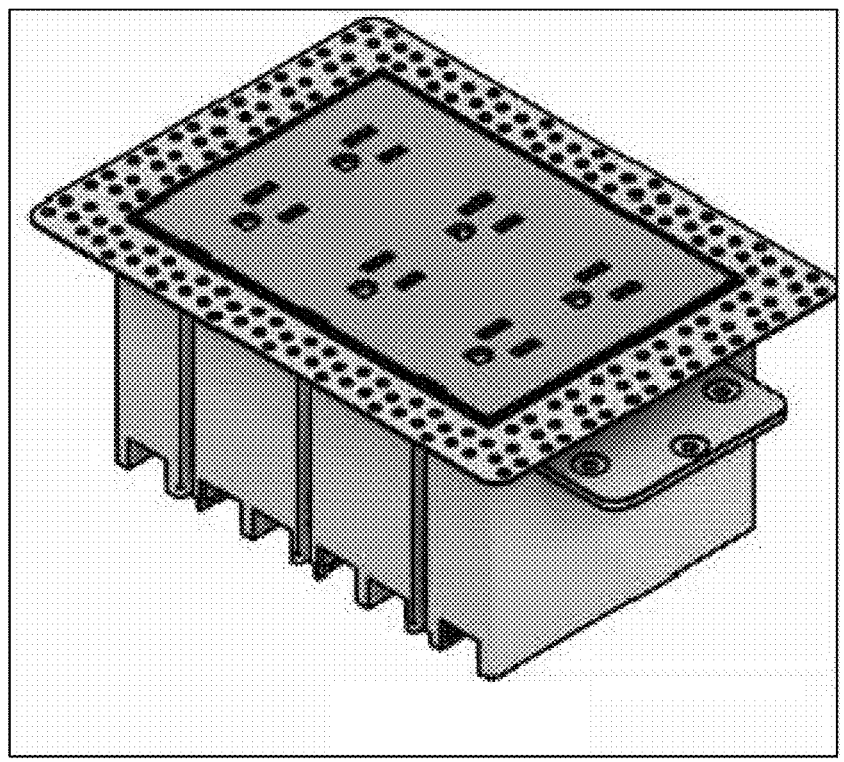

FIG. 140 depicts an isometric assembly view of the assembled Triple Gang Back Box, Triple Gang Mud Ring, and Triple Gang Electrical Outlet Faceplate.

Figure 141:
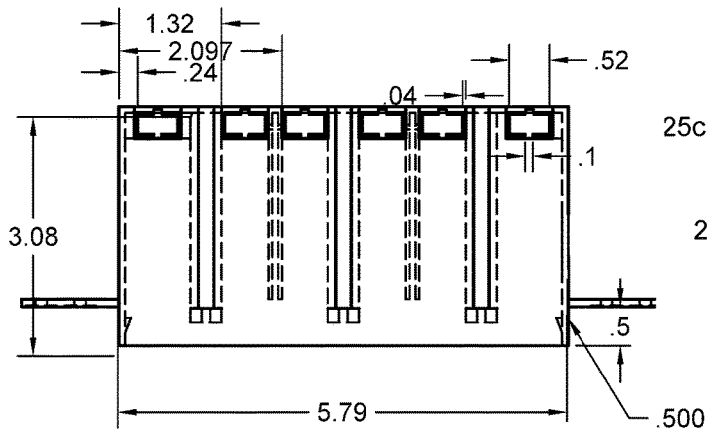

FIG. 141 depicts a top view of the Triple Gang Back Box 25.

Figure 142:
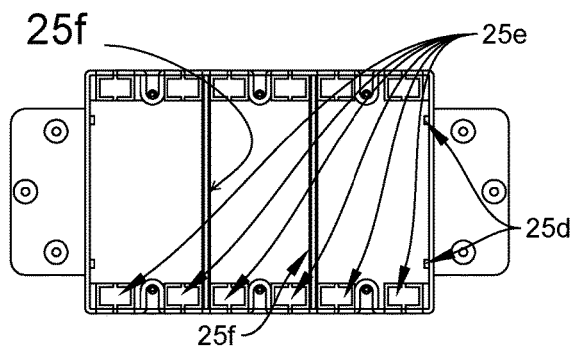

FIG. 142 depicts a front view of the Triple Gang Back Box 25.

Figure 143:
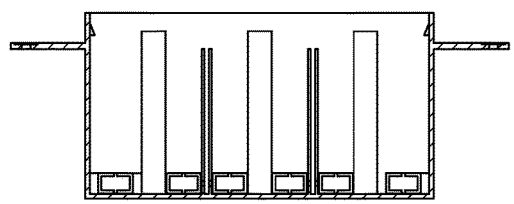

FIG. 143 depicts a cross-sectional view of the Triple Gang Back Box 25.

Figure 144:
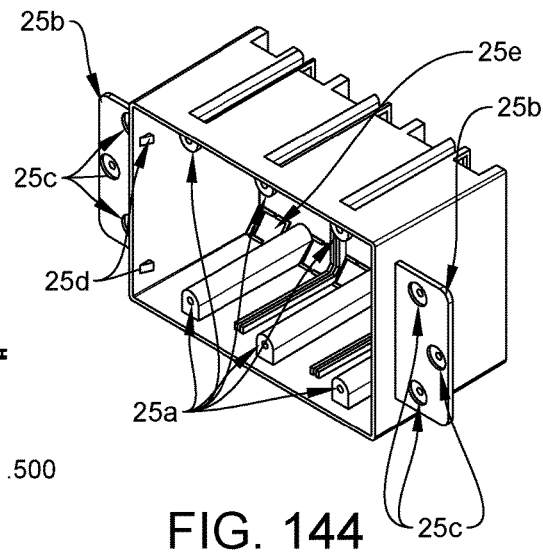

FIG. 144 depicts an isometric view of the Triple Gang Back Box 25.

Figure 145:
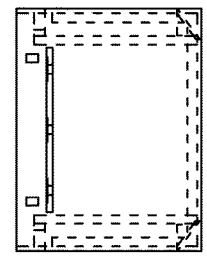

FIG. 145 depicts a right side view of the Triple Gang Back Box 25.

FIG. 146 depicts a top view of the Triple Gang Half Box 26.

FIG. 147 depicts a front view of the Triple Gang Half Box 26.

FIG. 148 depicts a cross-sectional view of the Triple Gang Half Box 26.

FIG. 149 depicts an isometric view of the Triple Gang Half Box 26.

FIG. 150 depicts a right side view of the Triple Gang Half Box 26.

FIG. 151 depicts a top view of the Triple Gang Trim Ring 27.

FIG. 152 depicts a front view of the Triple Gang Trim Ring 27.

FIG. 153 depicts a cross-sectional view of the Triple Gang Trim Ring 27.

FIG. 154 depicts an isometric view of the Triple Gang Trim Ring 27.

FIG. 155 depicts a right side view of the Triple Gang Trim Ring 27.

FIG. 156 depicts a top view of the Triple Gang Mud Ring 28.

FIG. 157 depicts a front view of the Triple Gang Mud Ring 28.

FIG. 158 depicts a cross-sectional view of the Triple Gang Mud Ring 28.

FIG. 159 depicts an isometric view of the Triple Gang Mud Ring 28.

FIG. 160 depicts a right side view of the Triple Gang Mud Ring 28.

FIG. 161 depicts a top view of the Triple Gang Electrical Outlet Faceplate 29.

FIG. 162 depicts a front view of the Triple Gang Electrical Outlet Faceplate 29.

FIG. 163 depicts a cross-sectional view of the Triple Gang Electrical Outlet Faceplate 29.

FIG. 164 depicts an isometric view of the Triple Gang Electrical Outlet Faceplate 29.

FIG. 165 depicts a right side view of the Triple Gang Electrical Outlet Faceplate 29.

FIG. 166 depicts a back view of the Triple Gang Electrical Outlet Faceplate 29.

Figure 167:
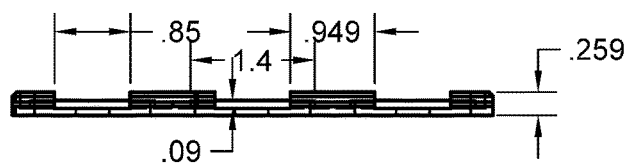

FIG. 167 depicts a top view of the Triple Gang Light Switch Faceplate 30.

Figure 168:
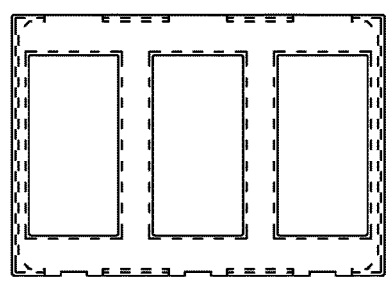

FIG. 168 depicts a front view of the Triple Gang Light Switch Faceplate 30.

Figure 169:
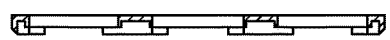

FIG. 169 depicts a cross-sectional view of the Triple Gang Light Switch Faceplate 30.

Figure 170:
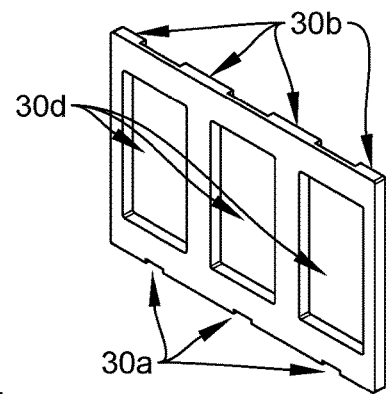

FIG. 170 depicts an isometric view of the Triple Gang Light Switch Faceplate 30.

Figures 171, 172:
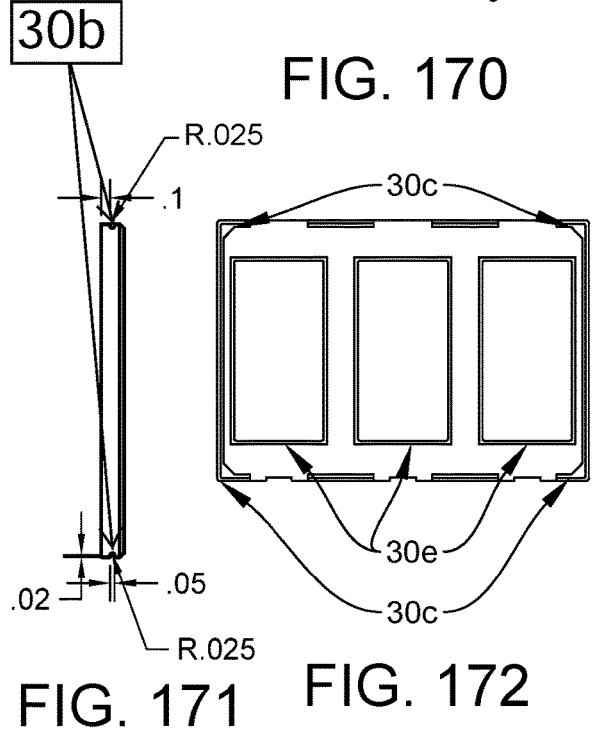

FIG. 171 depicts a right side view of the Triple Gang Light Switch Faceplate 30.

FIG. 172 depicts a back view of the Triple Gang Light Switch Faceplate 30.

Figure 173:
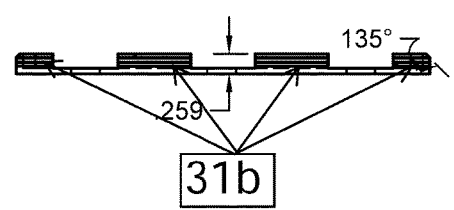

FIG. 173 depicts a top view of the Triple Gang Blank Faceplate 31.

Figure 174:
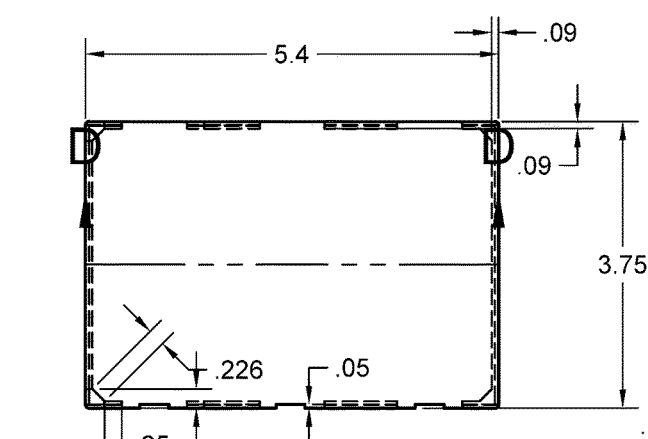

FIG. 174 depicts a front view of the Triple Gang Blank Faceplate 31.

Figure 175:
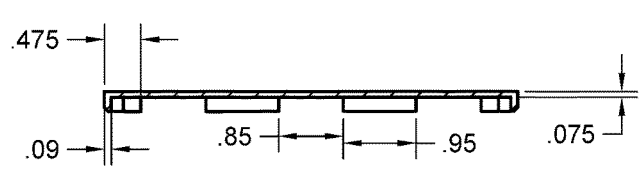

FIG. 175 depicts a cross-sectional view of the Triple Gang Blank Faceplate 31.

Figure 176:
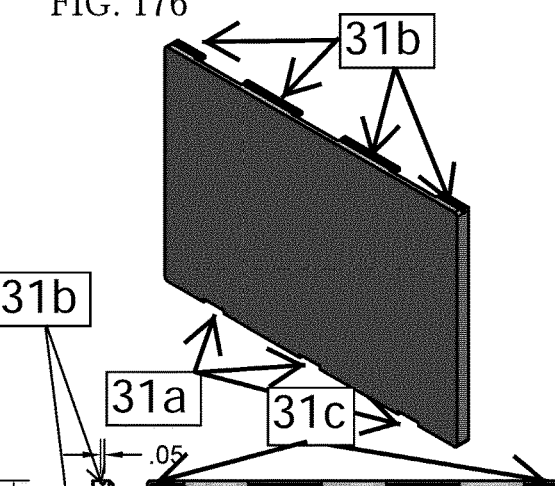

FIG. 176 depicts an isometric view of the Triple Gang Blank Faceplate 31.

Figures 177, 178:
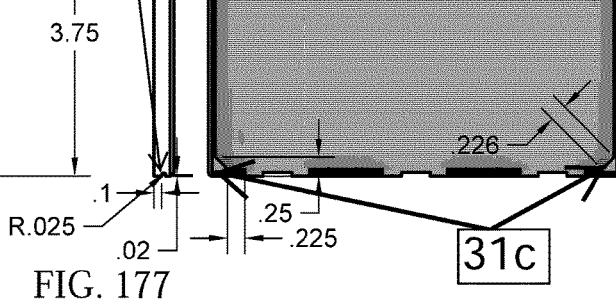

FIG. 177 depicts a right side view of the Triple Gang Blank Faceplate 31.

FIG. 178 depicts a back view of the Triple Gang Blank Faceplate 31.

Figure 179:
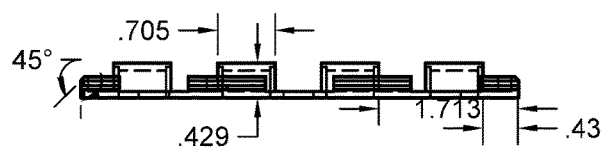

FIG. 179 depicts a top view of the Triple Gang Eight Connector Faceplate 32.

Figures 180, 183:
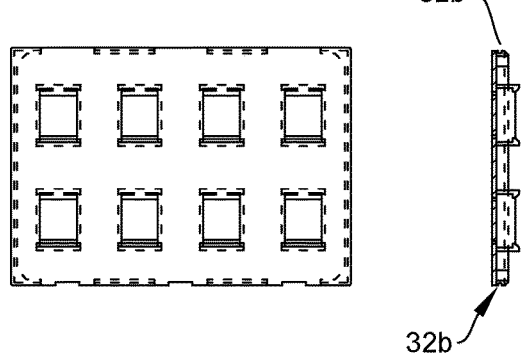

FIG. 180 depicts a front view of the Triple Gang Eight Connector Faceplate 32.

Figure 181:

FIG. 181 depicts a cross-sectional view of the Triple Gang Eight Connector Faceplate 32.

Figure 182:
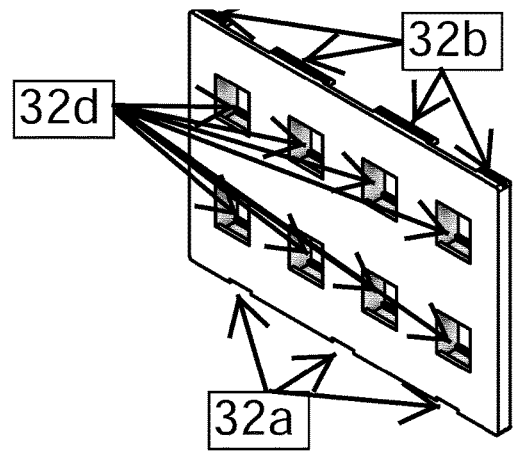

FIG. 182 depicts an isometric view of the Triple Gang Eight Connector Faceplate 32.

FIG. 183 depicts a right side view of the Triple Gang Eight Connector Faceplate 32.

Figure 184:
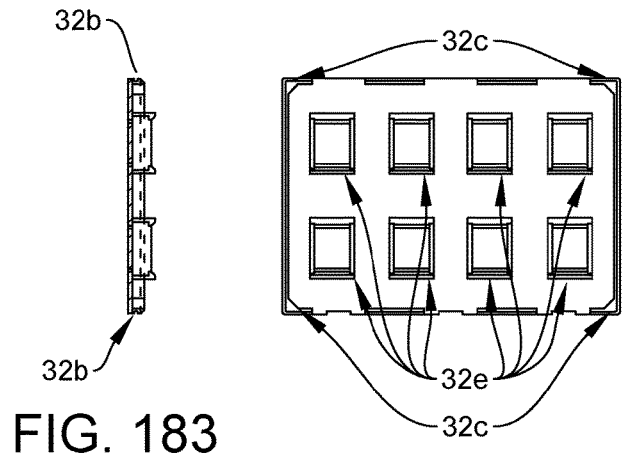

FIG. 184 depicts a back view of the Triple Gang Eight Connector Faceplate 32.

Figure 185:

FIG. 185 depicts a top view of the Triple Gang Ten Connector Faceplate 33.

Figure 186:
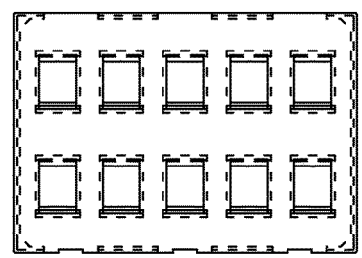

FIG. 186 depicts a front view of the Triple Gang Ten Connector Faceplate 33.

Figure 187:
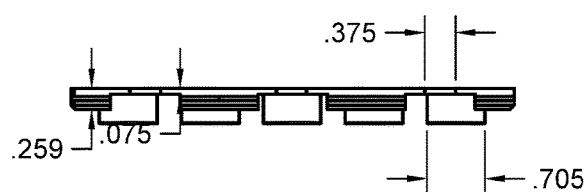

FIG. 187 depicts a cross-sectional view of the Triple Gang Ten Connector Faceplate 33.

Figure 188:
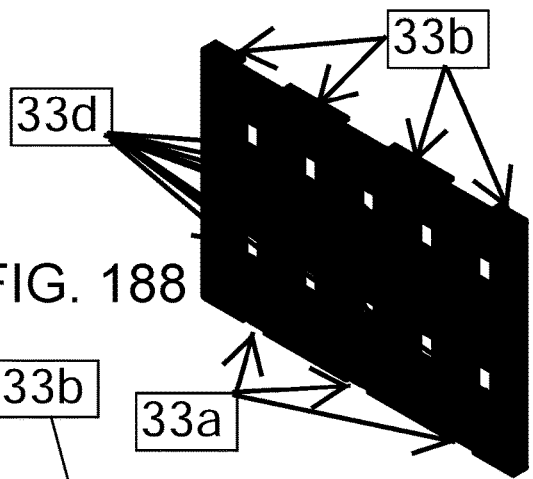

FIG. 188 depicts an isometric view of the Triple Gang Ten Connector Faceplate 33.

Figures 189, 190:
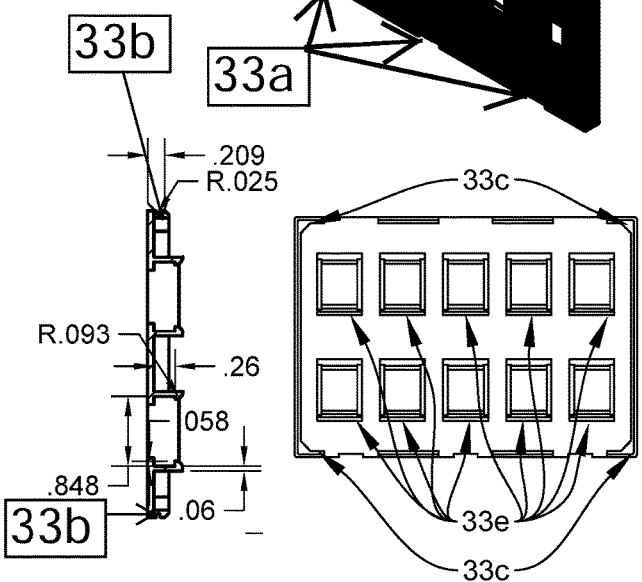

FIG. 189 depicts a right side view of the Triple Gang Ten Connector Faceplate 33.

FIG. 190 depicts a back view of the Triple Gang Ten Connector Faceplate 33.

Figure 191:
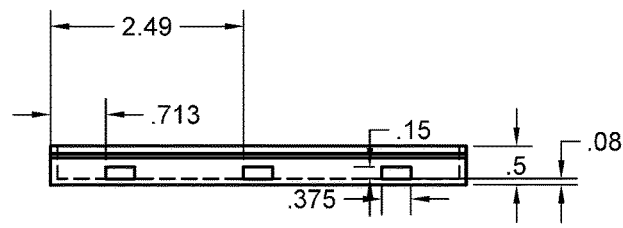

FIG. 191 depicts a top view of the Triple Gang Mud Plug 34.

Figure 192:
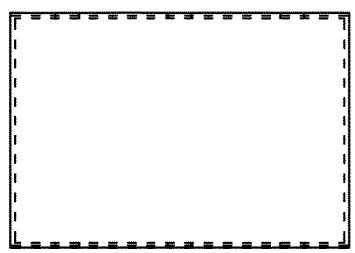

FIG. 192 depicts a front view of the Triple Gang Mud Plug 34.

Figure 193:

FIG. 193 depicts a cross-sectional view of the Triple Gang Mud Plug 34.

Figure 194:
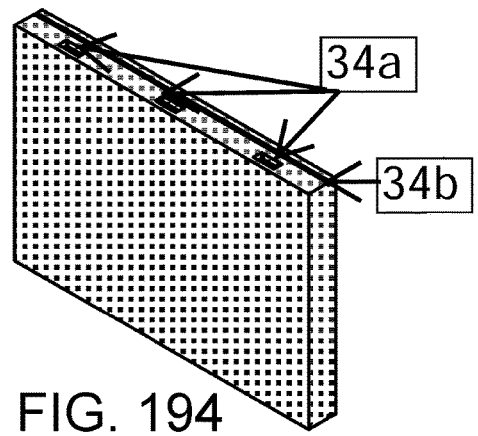

FIG. 194 depicts an isometric view of the Triple Gang Mud Plug 34.

Figure 195:
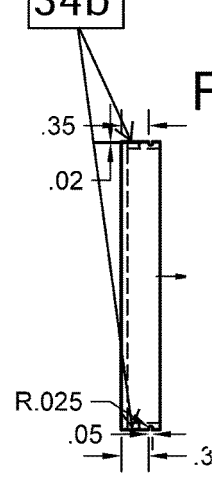

FIG. 195 depicts a right side view of the Triple Gang Mud Plug 34.

Figure 196:
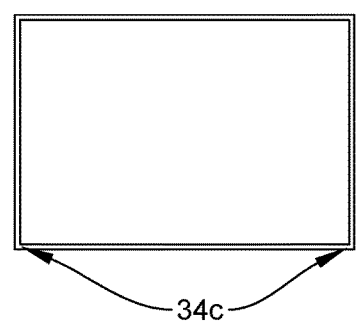

FIG. 196 depicts a back view of the Triple Gang Mud Plug 34.

Figure 197:
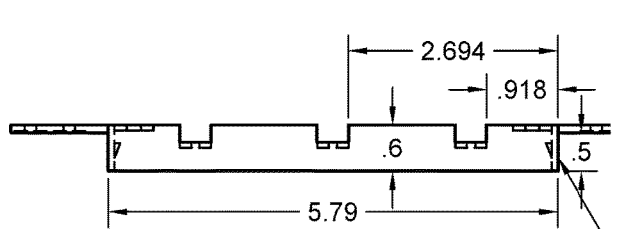

FIG. 197 depicts a top view of the Triple Gang Metal Adapter 35.

Figure 198:
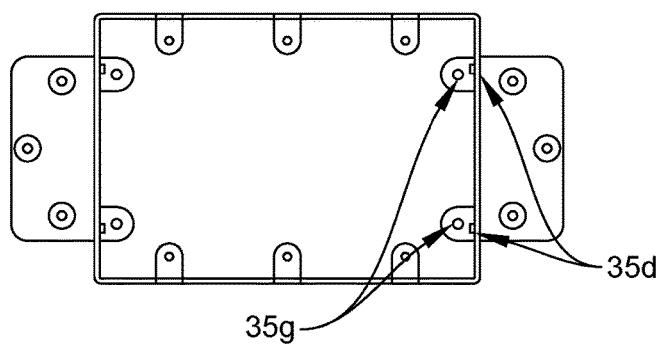

FIG. 198 depicts a front view of the Triple Gang Metal Adapter 35.

Figure 199:
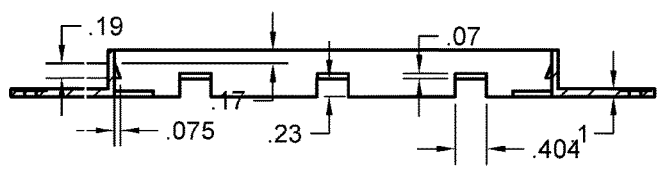

FIG. 199 depicts a cross-sectional view of the Triple Gang Metal Adapter 35.

Figure 200:
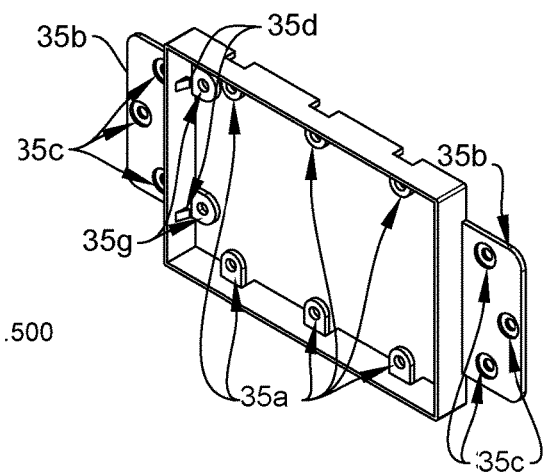

FIG. 200 depicts an isometric view of the Triple Gang Metal Adapter 35.

Figure 201:
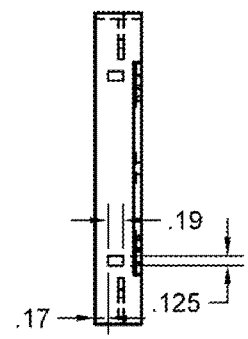

FIG. 201 depicts a right side view of the Triple Gang Metal Adapter 35.

Figure 202:
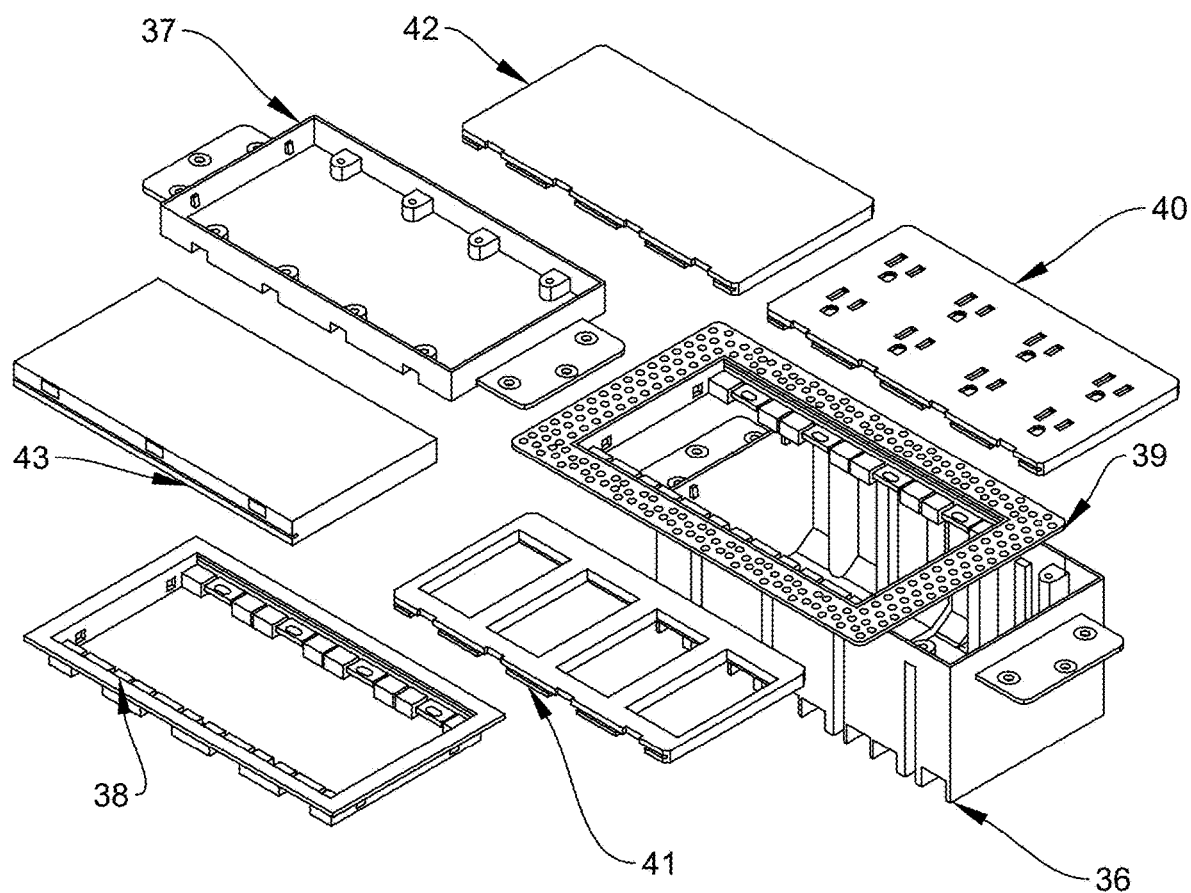

FIG. 202 depicts a Quadruple Gang Back Box 36, Quadruple Gang Half Box 37, Quadruple Gang Trim Ring 38, Quadruple Gang Mud Ring 39, Quadruple Gang Electrical Outlet Faceplate 40, Quadruple Gang Light Switch Faceplate 41, Quadruple Gang Blank Faceplate 42, and Quadruple Gang Mud Plug 43.

Figure 203:
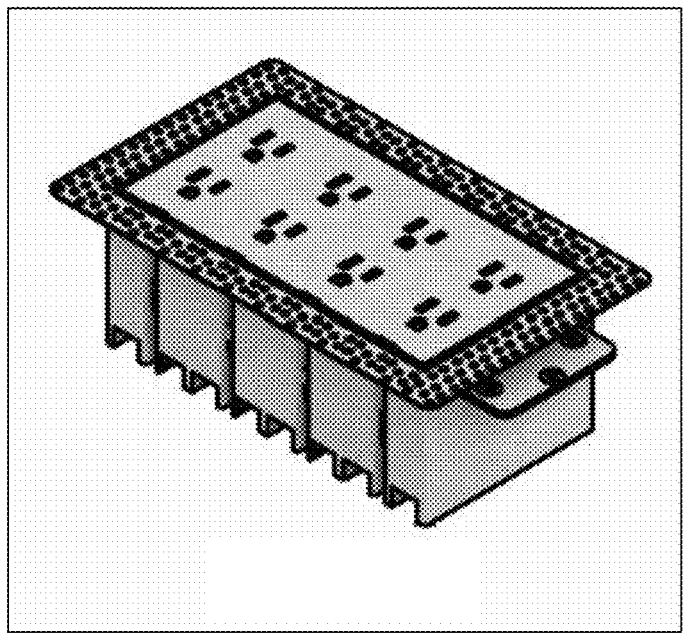

FIG. 203 depicts an isometric assembly view of the assembled Quadruple Gang Back Box, Quadruple Gang Ring, and Quadruple Gang Electrical Outlet Faceplate.

FIG. 204 depicts a top view of the Quadruple Gang Back Box 36.

FIG. 205 depicts a front view of the Quadruple Gang Back Box 36.

FIG. 206 depicts a cross-sectional view of the Quadruple Gang Back Box 36.

FIG. 207 depicts an isometric view of the Quadruple Gang Back Box 36.

FIG. 208 depicts a right side view of the Quadruple Gang Back Box 36.

FIG. 209 depicts a top view of the Triple Gang Half Box 37.

FIG. 210 depicts a front view of the Triple Gang Half Box 37.

FIG. 211 depicts a cross-sectional view of the Triple Gang Half Box 37.

FIG. 212 depicts an isometric view of the Triple Gang Half Box 37.

FIG. 213 depicts a right side view of the Triple Gang Half Box 37.

FIG. 214 depicts a top view of the Quadruple Gang Trim Ring 38.

FIG. 215 depicts a front view of the Quadruple Gang Trim Ring 38.

FIG. 216 depicts a cross-sectional view of the Quadruple Gang Trim Ring 38.

FIG. 217 depicts an isometric view of the Quadruple Gang Trim Ring 38.

FIG. 218 depicts a right side view of the Quadruple Gang Trim Ring 38.

FIG. 219 depicts a top view of the Quadruple Gang Mud Ring 39.

FIG. 220 depicts a front view of the Quadruple Gang Mud Ring 39.

FIG. 221 depicts a cross-sectional view of the Quadruple Gang Mud Ring 39.

FIG. 222 depicts an isometric view of the Quadruple Gang Mud Ring 39.

FIG. 223 depicts a right side view of the Quadruple Gang Mud Ring 39.

Figure 224:
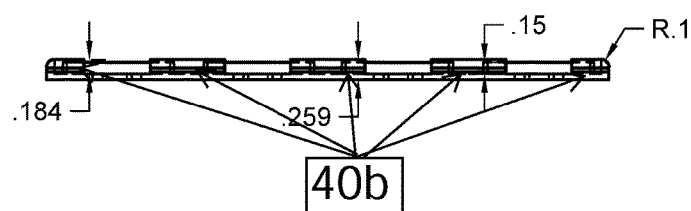

FIG. 224 depicts a top view of the Quadruple Gang Electrical Outlet Faceplate 40.

Figure 225:
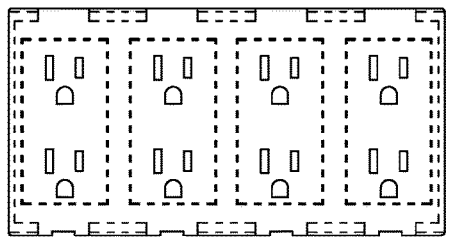

FIG. 225 depicts a front view of the Quadruple Gang Electrical Outlet Faceplate 40.

Figure 226:
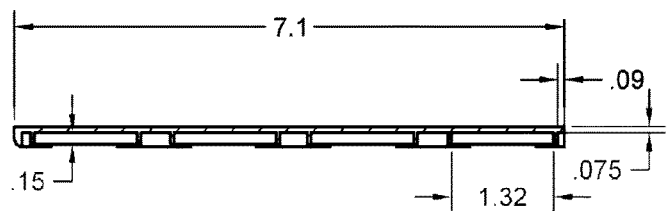

FIG. 226 depicts a cross-sectional view of the Quadruple Gang Electrical Outlet Faceplate 40.

Figure 227:
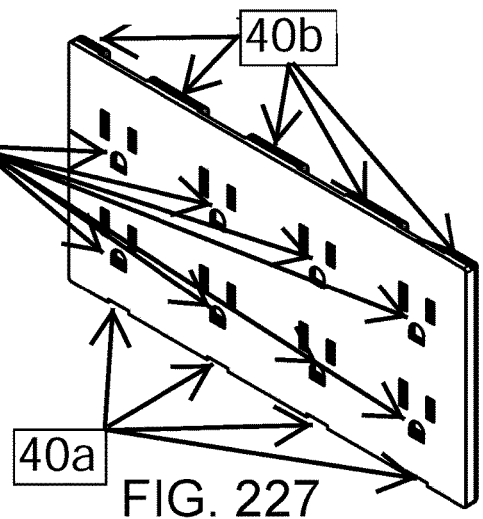

FIG. 227 depicts an isometric view of the Quadruple Gang Electrical Outlet Faceplate 40.

Figures 228, 229:
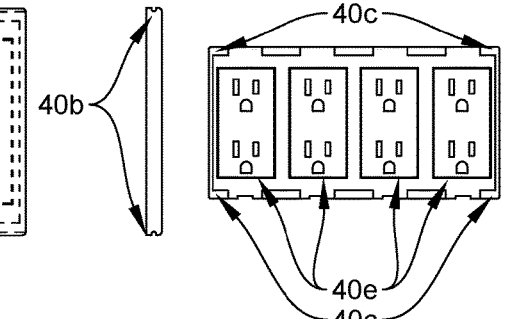

FIG. 228 depicts a right side view of the Quadruple Gang Electrical Outlet Faceplate 40.

FIG. 229 depicts a back view of the Quadruple Gang Electrical Outlet Faceplate 40.

Figures 230, 233:
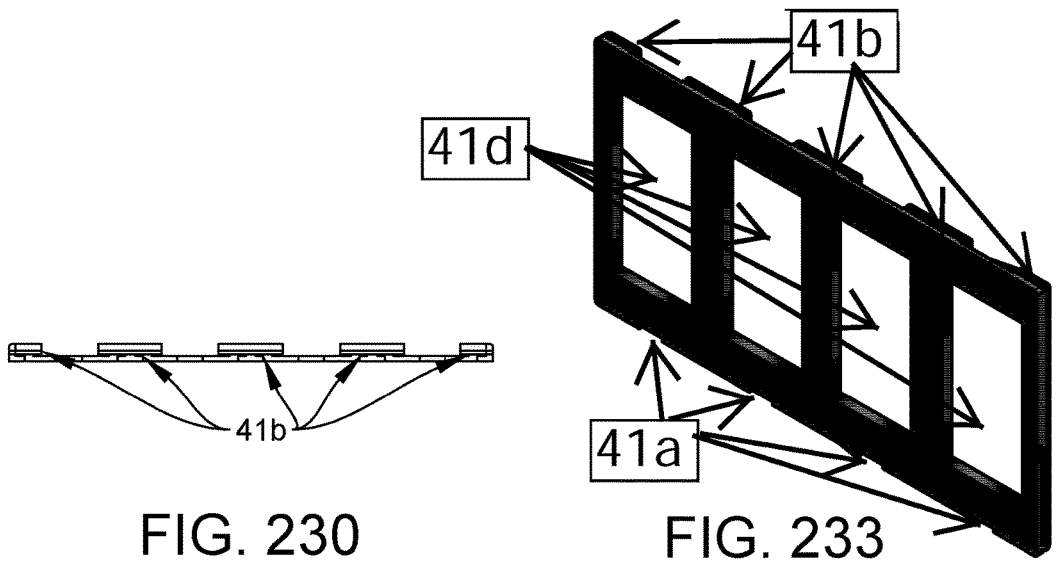

FIG. 230 depicts a top view of the Quadruple Gang Light Switch Faceplate 41.

Figures 231, 234, 235:
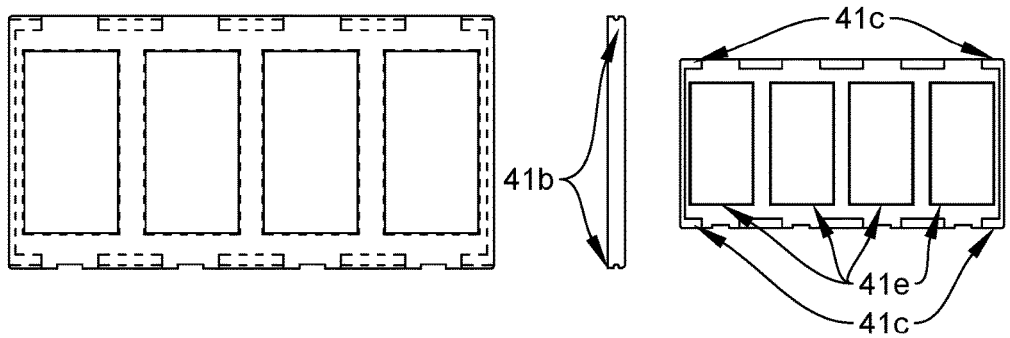

FIG. 231 depicts a front view of the Quadruple Gang Light Switch Faceplate 41.

Figure 232:
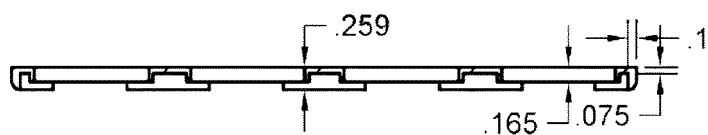

FIG. 232 depicts a cross-sectional view of the Quadruple Gang Light Switch Faceplate 41.

FIG. 233 depicts an isometric view of the Quadruple Gang Light Switch Faceplate 41.

FIG. 234 depicts a right side view of the Quadruple Gang Light Switch Faceplate 41.

FIG. 235 depicts a back view of the Quadruple Gang Light Switch Faceplate 41.

Figure 236:
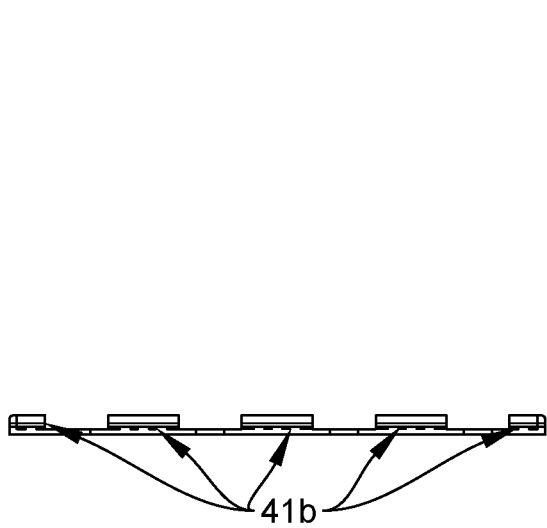

FIG. 236 depicts a top view of the Quadruple Gang Blank Faceplate 42.

Figure 237:
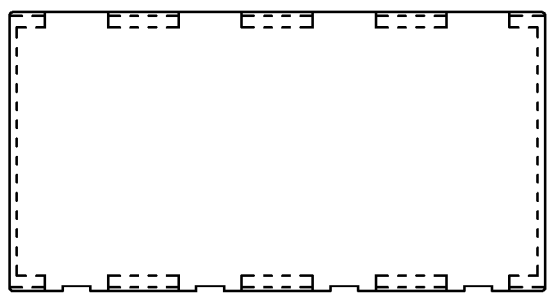

FIG. 237 depicts a front view of the Quadruple Gang Blank Faceplate 42.

Figure 238:
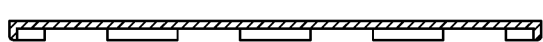

FIG. 238 depicts a cross-sectional view of the Quadruple Gang Blank Faceplate 42.

Figure 239:
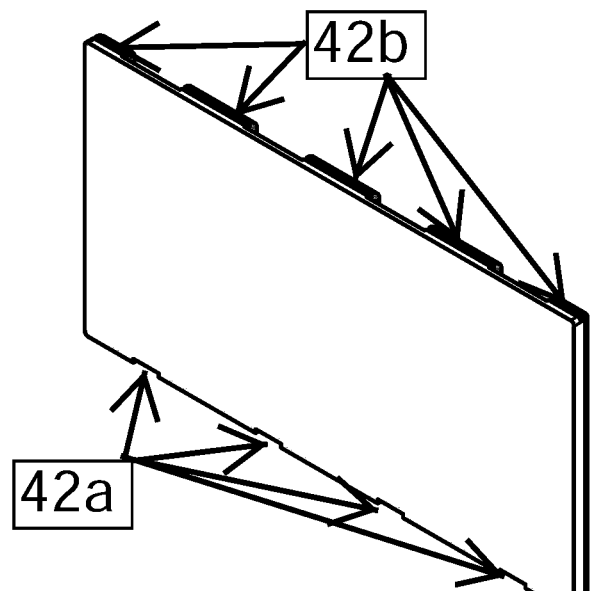

FIG. 239 depicts an isometric view of the Quadruple Gang Blank Faceplate 42.

Figure 240:
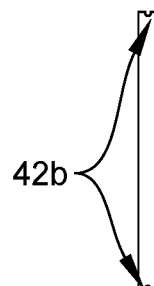

FIG. 240 depicts a right side view of the Quadruple Gang Blank Faceplate 42.

Figure 241:
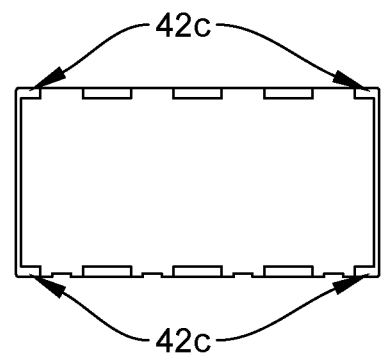

FIG. 241 depicts a back view of the Quadruple Gang Blank Faceplate 42.

Figure 242:
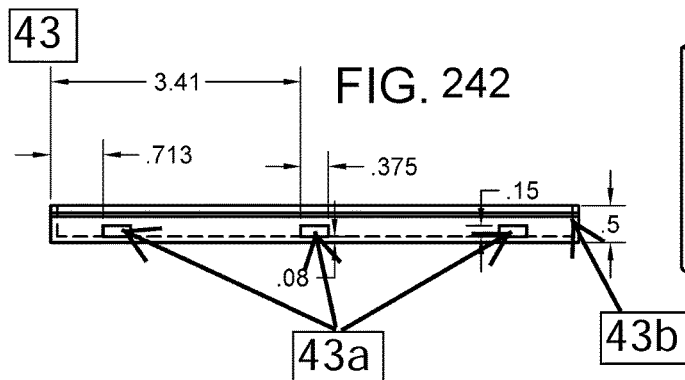

FIG. 242 depicts a top view of the Quadruple Gang Mud Plug 43.

Figure 243:
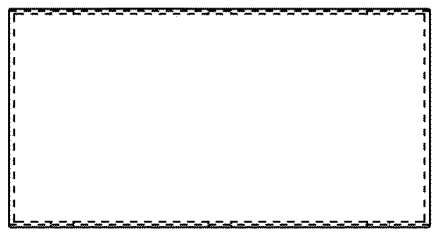

FIG. 243 depicts a front view of the Quadruple Gang Mud Plug 43.

Figure 244:
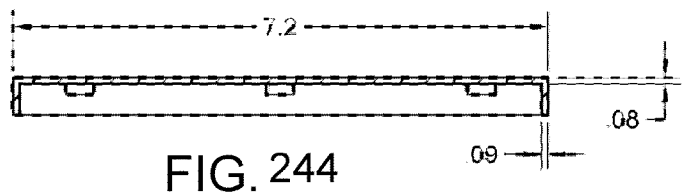

FIG. 244 depicts a cross-sectional view of the Quadruple Gang Mud Plug 43.

Figure 245:
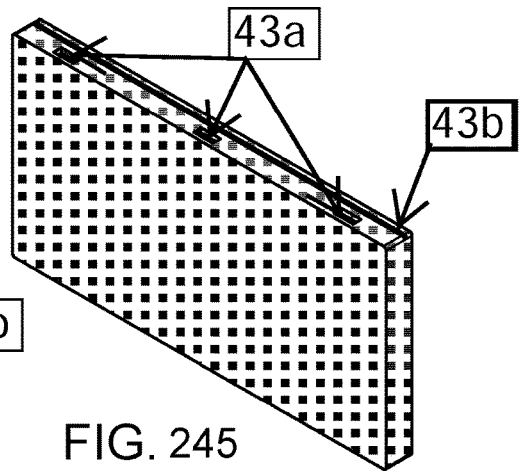

FIG. 245 depicts an isometric view of the Quadruple Gang Mud Plug 43.

Figure 246:
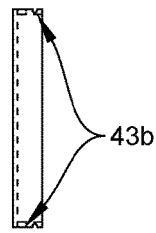

FIG. 246 depicts a right side view of the Quadruple Gang Mud Plug 43.

Figure 247:
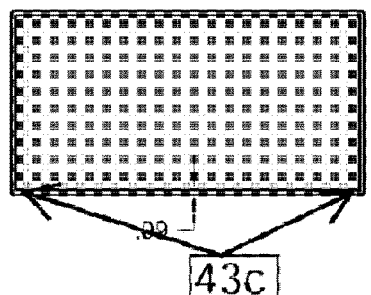

FIG. 247 depicts a back view of the Quadruple Gang Mud Plug 43.

FIG. 248 depicts a top view of the Quadruple Gang Metal Adapter 44.

FIG. 249 depicts a front view of the Quadruple Gang Metal Adapter 44.

FIG. 250 depicts a cross-sectional view of the Quadruple Gang Metal Adapter 44.

FIG. 251 depicts an isometric view of the Quadruple Gang Metal Adapter 44.

FIG. 252 depicts a right side view of the Quadruple Gang Metal Adapter 44.

Figure 253:
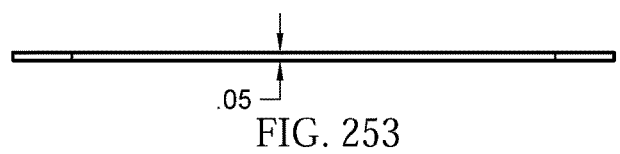

FIG. 253 depicts a bottom view of the Box Divider 45.

Figure 254:
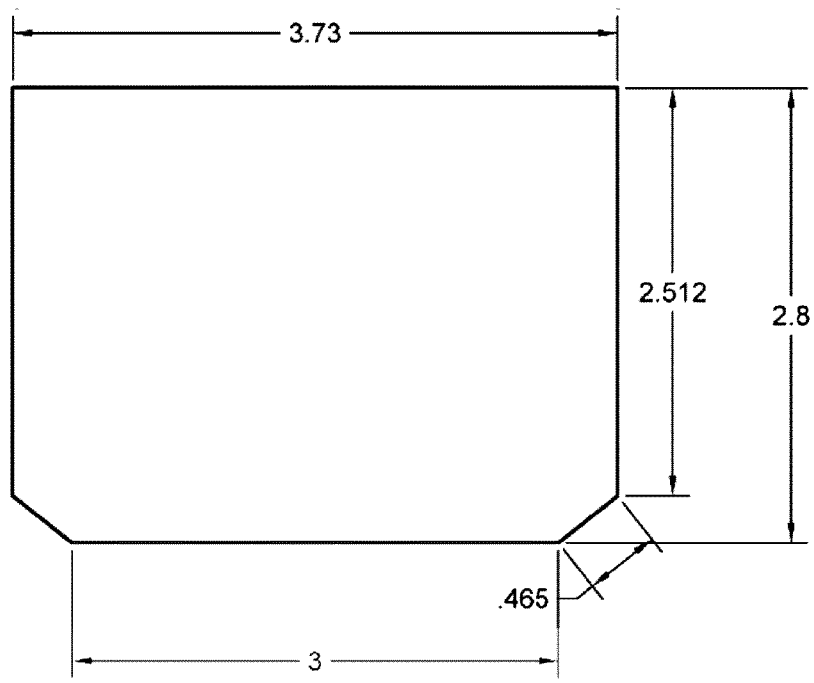

FIG. 254 depicts a front view of the Box Divider 45.

Figure 255:

FIG. 255 depicts an isometric view of the Box Divider 45

Figure 256:
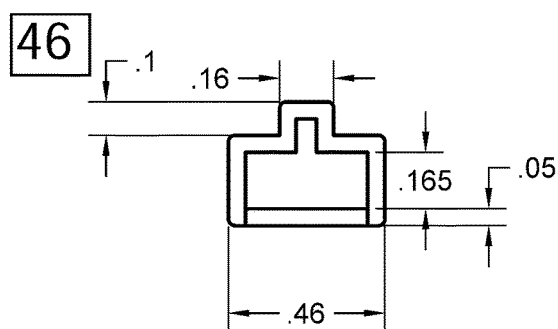

FIG. 256 depicts a top view of the RJ45 Paint Plug 46.

Figure 257:
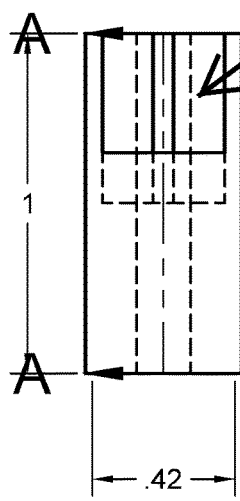

FIG. 257 depicts a front view of the RJ45 Paint Plug 46.

Figure 258:
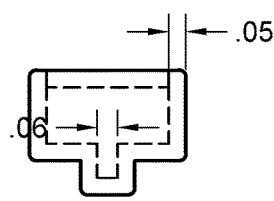

FIG. 258 depicts a cross-sectional view of the RJ45 Paint Plug 46.

Figure 259:
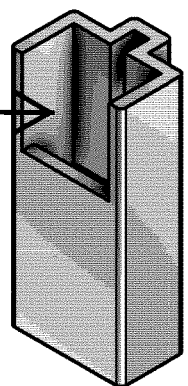

FIG. 259 depicts an isometric view of the RJ45 Paint Plug 46.

Figure 260:
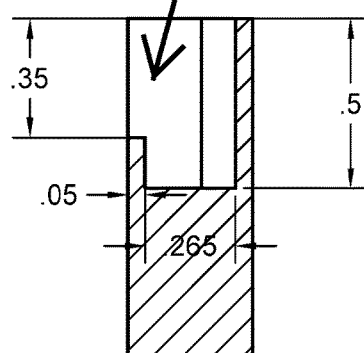

FIG. 260 depicts a right sidecross-sectional view of the RJ45 Paint Plug 46

Figure 261:
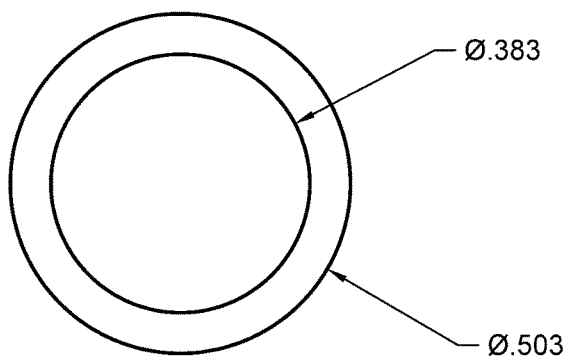

FIG. 261 depicts a top view of the Cable Paint Plug 47.

Figure 262:
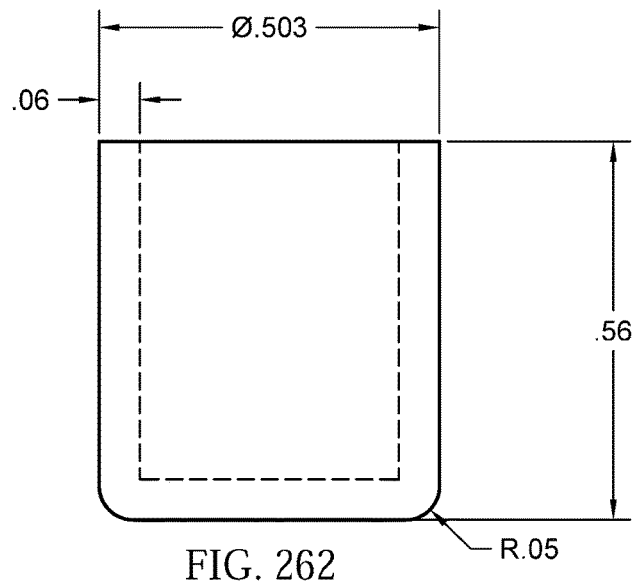

FIG. 262 depicts a front view of the Cable Paint Plug 47.

Figure 263:
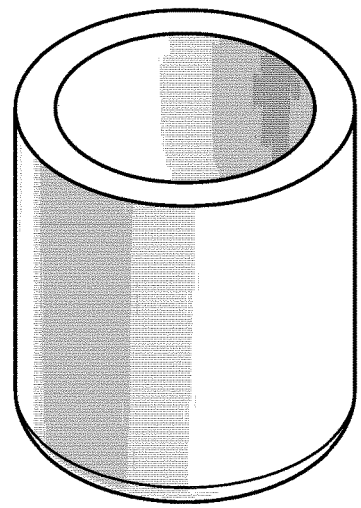

FIG. 263 depicts an isometric view of the Cable Paint Plug 47.

Figure 264:
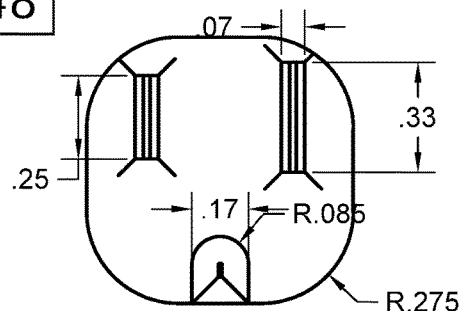

FIG. 264 depicts a top view of the Electrical Outlet Paint Plug 48.

Figure 265:
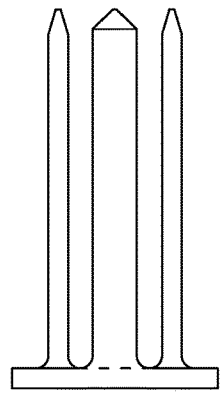

FIG. 265 depicts a front view of the Electrical Outlet Paint Plug 48.

Figure 266:
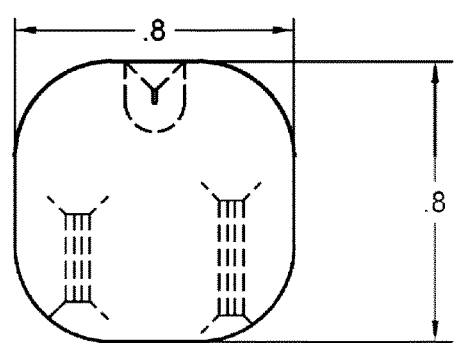

FIG. 266 depicts a cross-sectional view of the Electrical Outlet Paint Plug 48.

Figure 267:

FIG. 267 depicts an isometric view of the Electrical Outlet Paint Plug 48.

Figure 268:
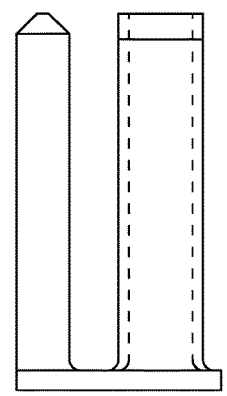

FIG. 268 depicts a right side view of the Electrical Outlet Paint Plug 48.

Figure 269:
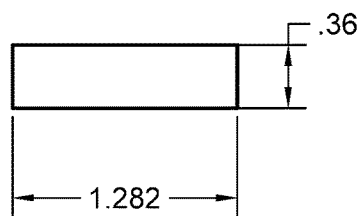

FIG. 269 depicts a top view of the Light Switch Paint Plug 49.

Figure 270:
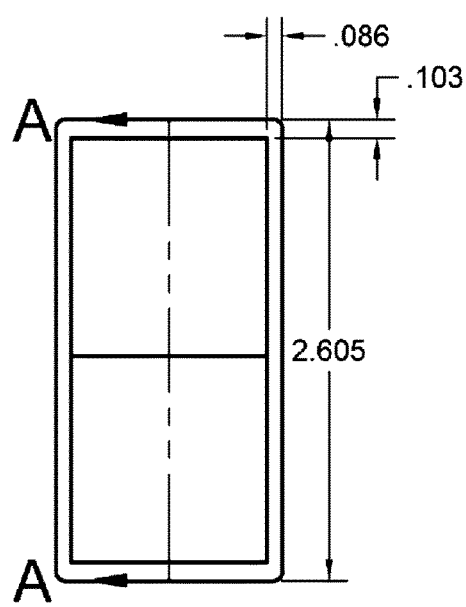

FIG. 270 depicts a front view of the Light Switch Paint Plug 49.

Figure 271:
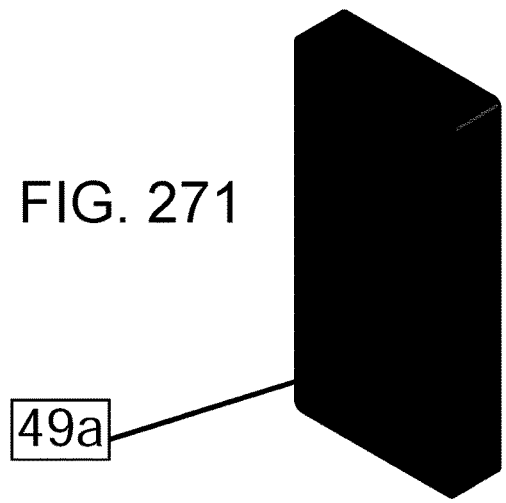

FIG. 271 depicts an isometric view of the Light Switch Paint Plug 49.

Figure 272:
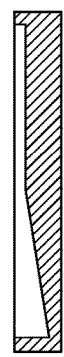

FIG. 272 depicts a right side view of the Light Switch Paint Plug 49.

FIG. 273 depicts an isometric view of a Single Gang Back Box.

FIG. 274 depicts a front view of the Single Gang Back Box of FIG. 273.

FIG. 275 depicts a cross-sectional view of the Single Gang Back Box of FIG. 273.

FIG. 276 depicts a bottom view of the Single Gang Back Box of FIG. 273.

FIG. 277 depicts a right side view of the Single Gang Back Box of FIG. 273.

Figure 278:
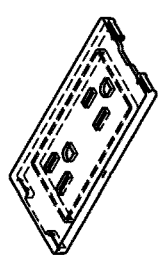

FIG. 278 depicts an isometric view of a Single Gang Electrical Outlet Faceplate.

Figure 279:
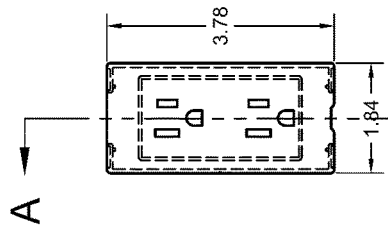

FIG. 279 depicts a front view of the Single Gang Electrical Outlet Faceplate of FIG. 278.

Figure 280:

FIG. 280 depicts a cross-sectional view of the Single Gang Electrical Outlet Faceplate of FIG. 278.

Figure 281:
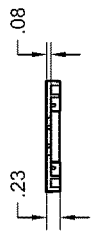

FIG. 281 depicts a bottom view of the Single Gang Electrical Outlet Faceplate of FIG. 278.

Figure 282:

FIG. 282 depicts a right side view of the Single Gang Electrical Outlet Faceplate of FIG. 278.

FIG. 283 depicts an isometric view of a Single Gang Mud Ring.

FIG. 284 depicts a front view of the Single Gang Mud Ring of FIG. 283.

FIG. 285 depicts a cross-sectional view of the Single Gang Mud Ring of FIG. 283.

FIG. 286 depicts a bottom view of the Single Gang Mud Ring of FIG. 283.

FIG. 287 depicts a right side view of the Single Gang Mud Ring of FIG. 283.

Figure 288:
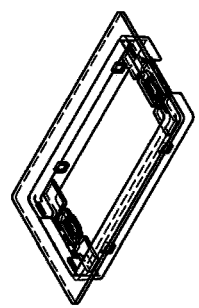

FIG. 288 depicts an isometric view of a Single Gang Trim Ring.

Figure 289:
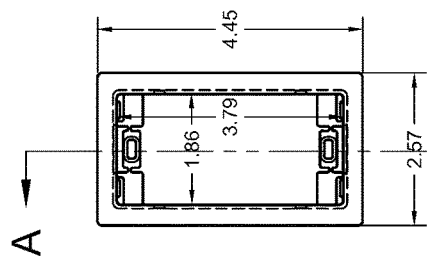

FIG. 289 depicts a front view of the Single Gang Trim Ring of FIG. 288.

Figure 290:
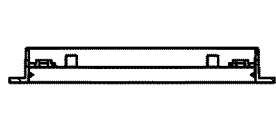

FIG. 290 depicts a cross-sectional view of the Single Gang Trim Ring of FIG. 288.

Figure 291:
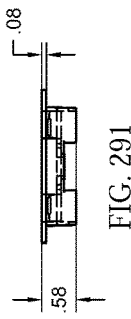

FIG. 291 depicts a bottom view of the Single Gang Trim Ring of FIG. 288.

Figure 292:
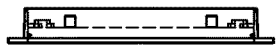

FIG. 292 depicts a right side view of the Single Gang Trim Ring of FIG. 288.

Elements and acts in the figures are illustrated for simplicity and have not necessarily been rendered according to any particular sequence or embodiment, and their simplicity should not use to limit the scope of the invention.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the objects described above or the specific examples that are described below.

Figure 1:
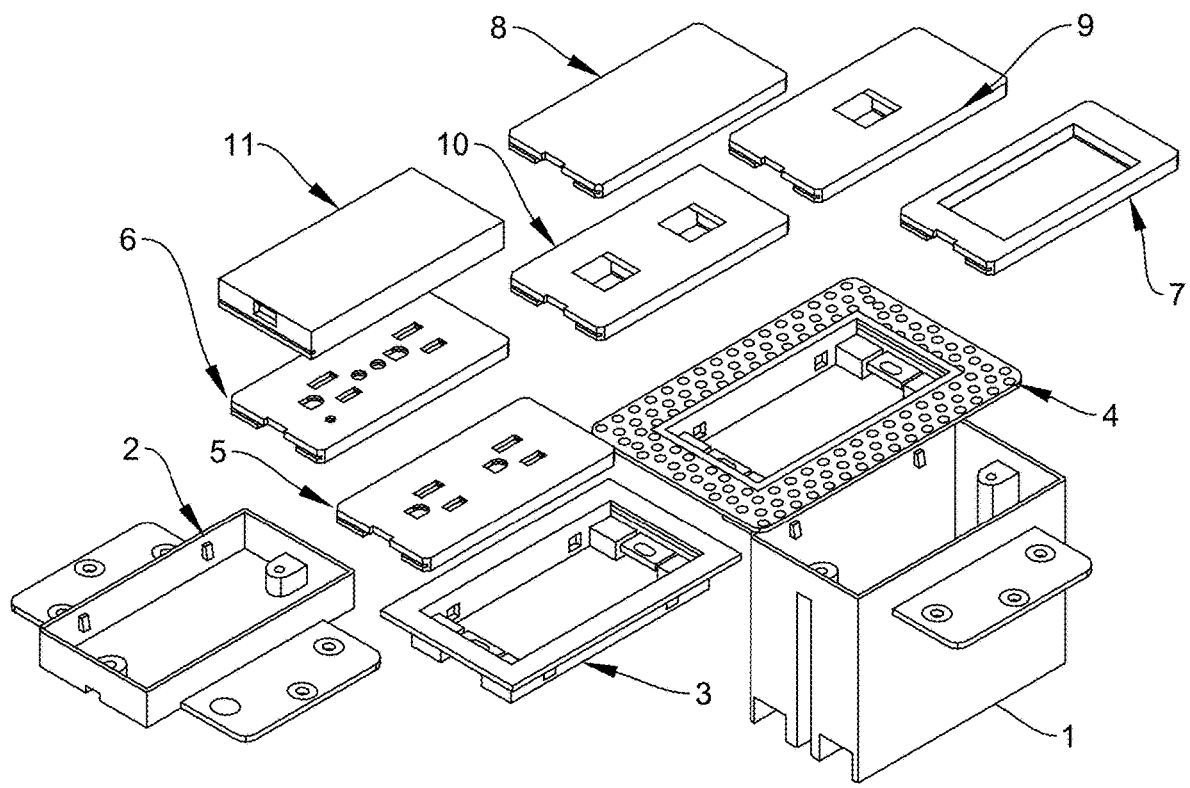
FIG. 1 depicts a Single Gang Back Box 1, Single Gang Half Box 2, Single Gang Trim Ring 3, Single Gang Mud Ring 4, Single Gang Electrical Outlet Faceplate 5, Single Gang GFCI Outlet Faceplate 6, Single Gang Light Switch Faceplate 7, Single Gang Blank Faceplate 8, Single Gang One Connector Faceplate 9, Single Gang Two Connector Faceplate 10, and Single Gang Mud Plug 11.
Figure 2:
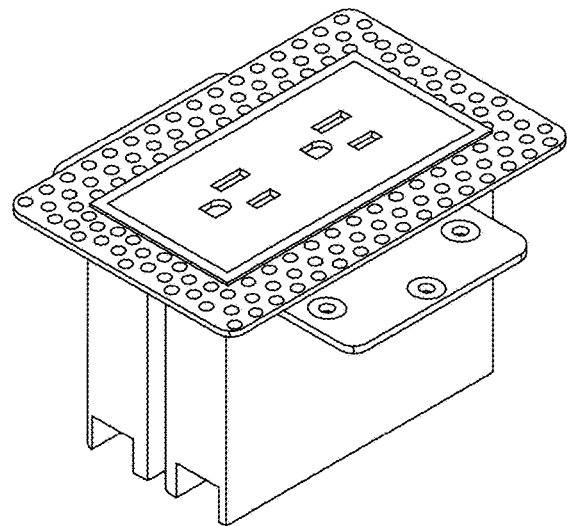
FIG. 2 depicts an isometric assembly view of the assembled Single Gang Back Box 1, Mud Ring 4, and Electrical Outlet Faceplate 5.
Figure 18:
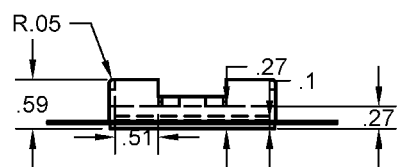
FIG. 18 depicts a top view of the Single Gang Mud Ring 4.
Figure 19:
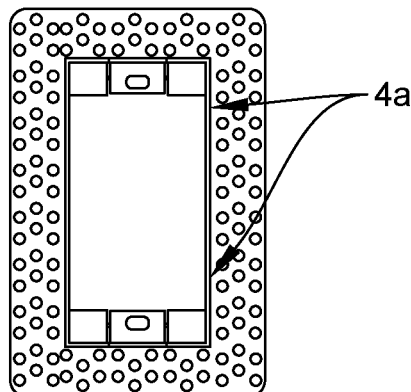
FIG. 19 depicts a front view of the Single Gang Mud Ring 4.
Figure 20:
FIG. 20 depicts a cross-sectional view of the Single Gang Mud Ring 4.
Figure 21:
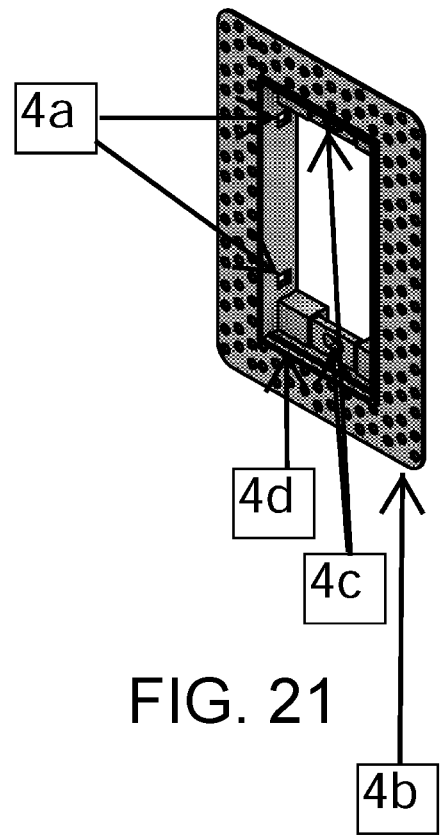
FIG. 21 depicts an isometric view of the Single Gang Mud Ring 4.
Figure 22:
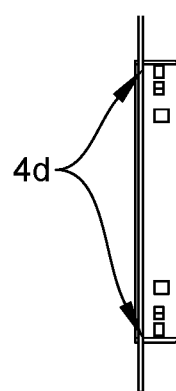
FIG. 22 depicts a right side view of the Single Gang Mud Ring 4.
Figure 23:
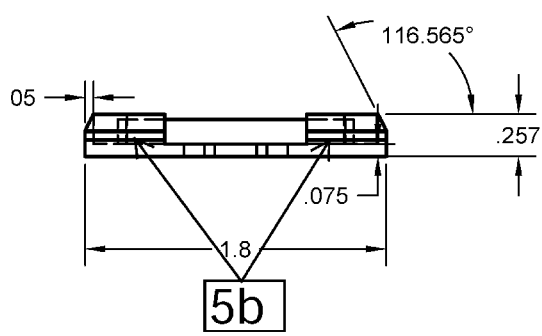
FIG. 23 depicts a top view of the Single Gang Electrical Outlet Faceplate 5.
Figure 26:
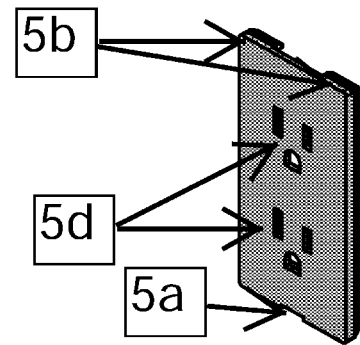
FIG. 26 depicts an isometric view of the Single Gang Electrical Outlet Faceplate 5.
Figure 24:
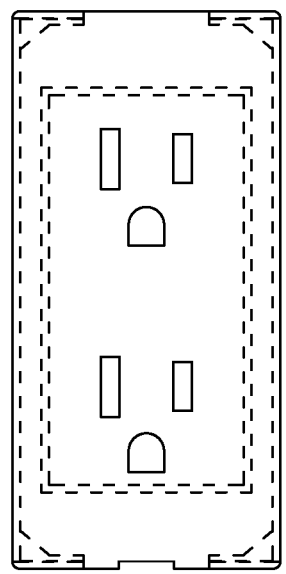
FIG. 24 depicts a front view of the Single Gang Electrical Outlet Faceplate 5.
Figure 27:
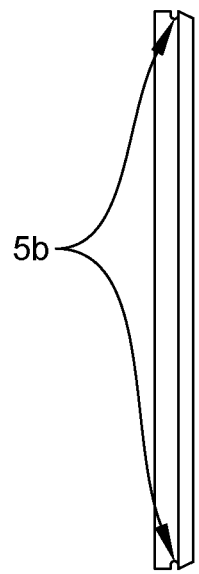
FIG. 27 depicts a right side view of the Single Gang Electrical Outlet Faceplate 5.
Figure 28:
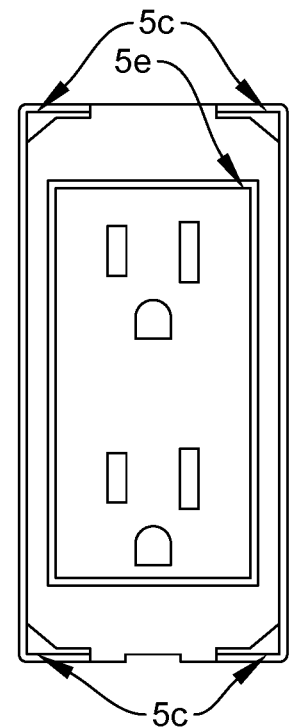
FIG. 28 depicts a back view of the Single Gang Electrical Outlet Faceplate 5.
Figure 25:
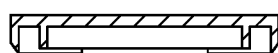
FIG. 25 depicts a cross-sectional view of the Single Gang Electrical Outlet Faceplate 5.
Figure 29:
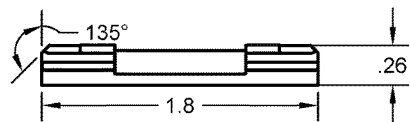
FIG. 29 depicts a top view of the Single Gang GFCI Outlet Faceplate 6.
Figure 30:
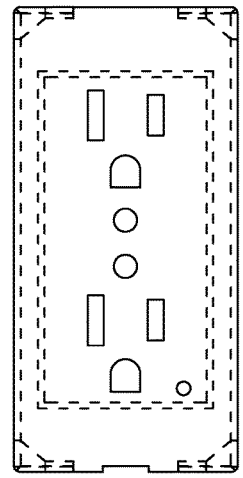
FIG. 30 depicts a front view of the Single Gang GFCI Outlet Faceplate 6.
Figures 33, 34:
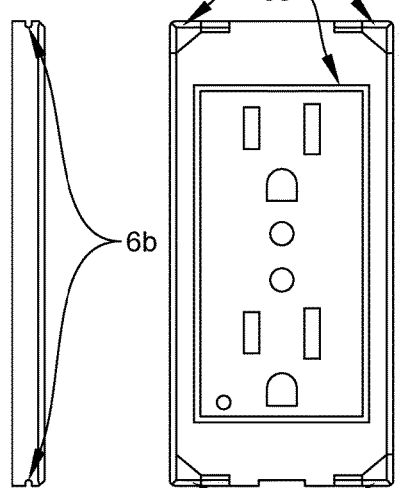
FIG. 33 depicts a right side view of the Single Gang GFCI Outlet Faceplate 6.
FIG. 34 depicts a back view of the Single Gang GFCI Outlet Faceplate 6.
Figure 32:
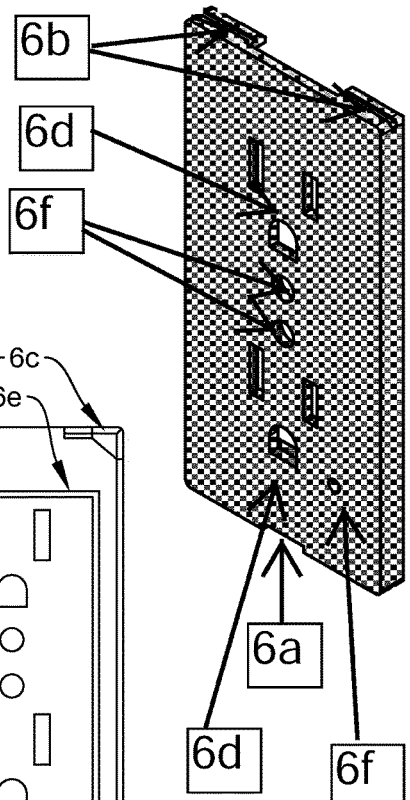
FIG. 32 depicts an isometric view of the Single Gang GFCI Outlet Faceplate 6.
Figure 31:
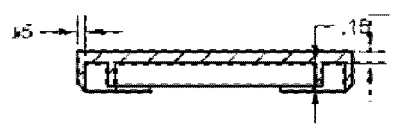
FIG. 31 depicts a cross-sectional view of the Single Gang GFCI Outlet Faceplate 6.
Figure 35:
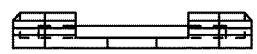
FIG. 35 depicts a top view of the Single Gang Light Switch Faceplate 7.
Figure 36:
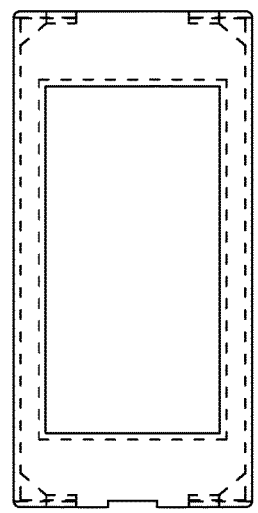
FIG. 36 depicts a front view of the Single Gang Light Switch Faceplate 7.
Figure 39:
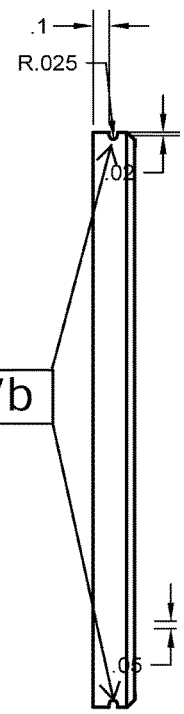
FIG. 39 depicts a right side view of the Single Gang Light Switch Faceplate 7.
Figure 38:
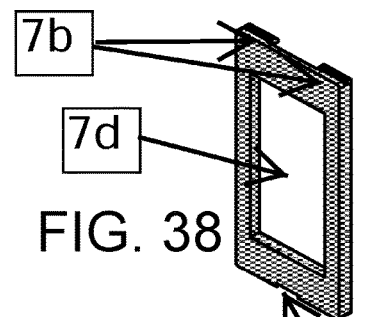
FIG. 38 depicts an isometric view of the Single Gang Light Switch Faceplate 7.
Figure 40:
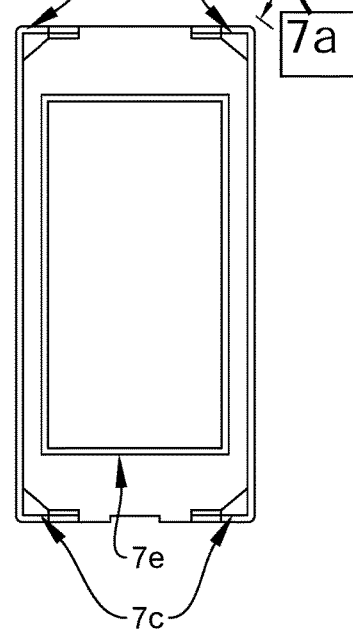
FIG. 40 depicts a back view of the Single Gang Light Switch Faceplate 7.
Figure 37:
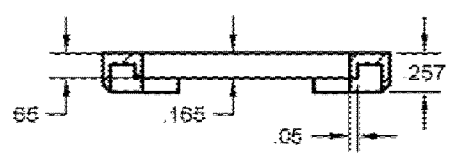
FIG. 37 depicts a cross-sectional view of the Single Gang Light Switch Faceplate 7.
Figure 65:
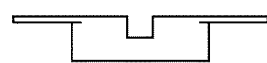
FIG. 65 depicts a top view of the Single Gang Metal Adapter 12.
Figure 66:
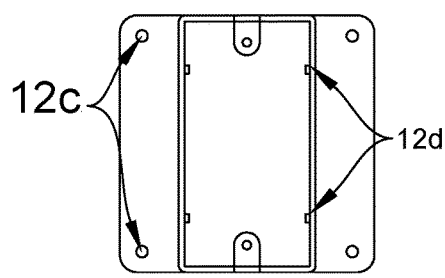
FIG. 66 depicts a front view of the Single Gang Metal Adapter 12.
Figure 68:
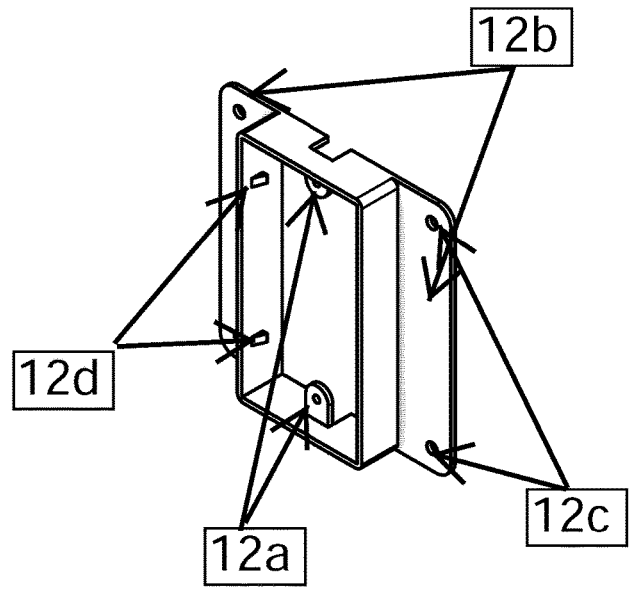
FIG. 68 depicts an isometric view of the Single Gang Metal Adapter 12.
Figure 67:
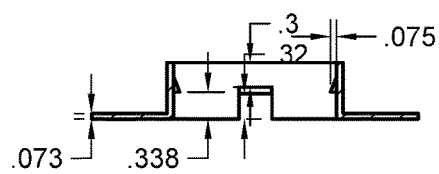
FIG. 67 depicts a cross-sectional view of the Single Gang Metal Adapter 12.
Figure 69:
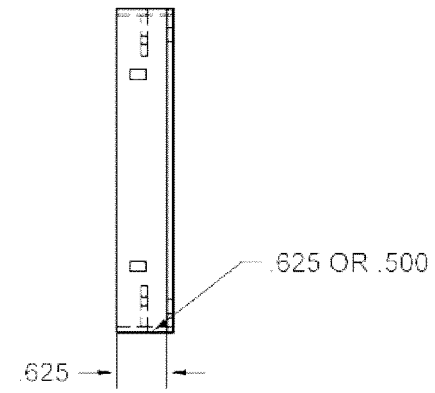
FIG. 69 depicts a right side view of the Single Gang Metal Adapter 12.
Figure 70:
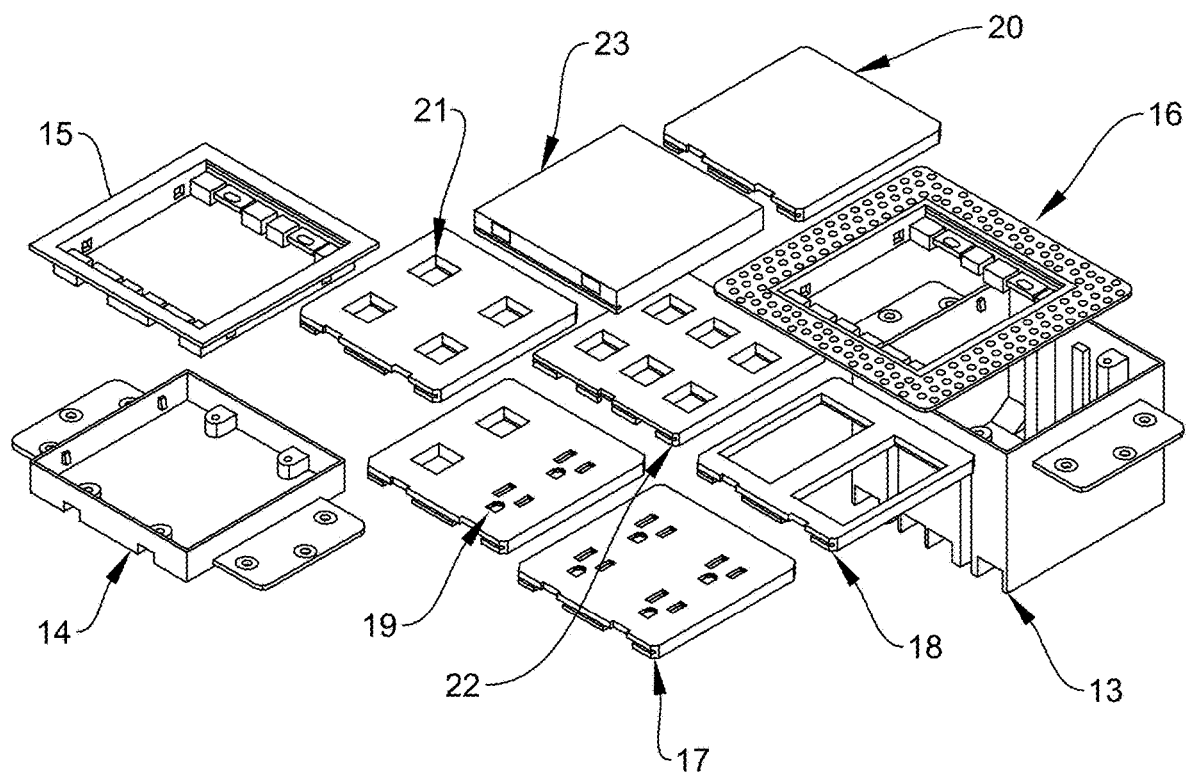
FIG. 70 depicts a Double Gang Back Box 13, Double Gang Half Box 14, Double Gang Trim Ring 15, Double Gang Mud Ring 16, Double Gang Electrical Outlet Faceplate 17, Double Gang Light Switch Faceplate 18, Double Gang Outlet/Two Connector Faceplate 19, Double Gang Blank Faceplate 20, Double Gang Four Connector Faceplate 21, Double Gang Six Connector Faceplate 22, and Double Gang Mud Plug 23.
Figure 71:
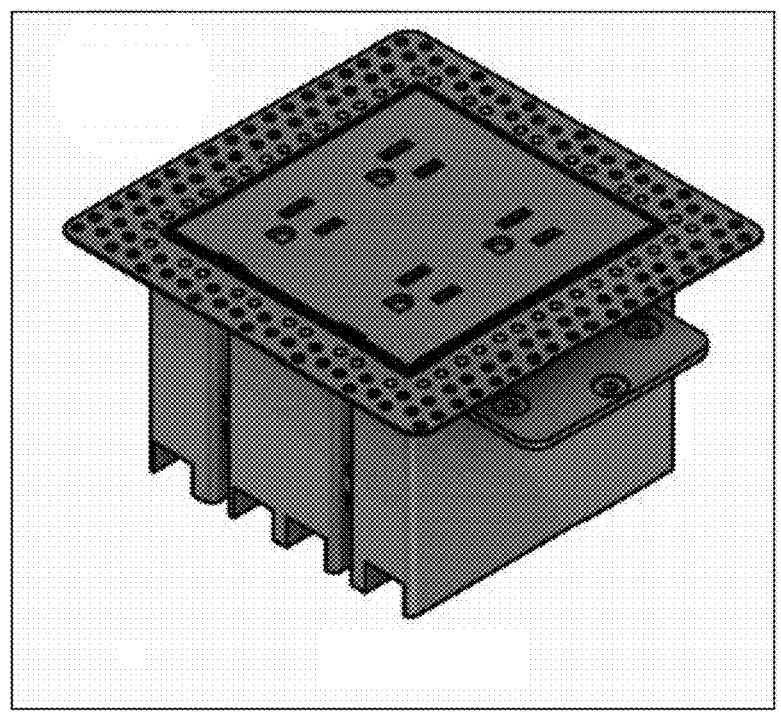
FIG. 71 depicts an isometric assembly view of the assembled Double Gang Back Box, Double Gang Mud Ring, and Double Gang Electrical Outlet Faceplate.
Figure 72:
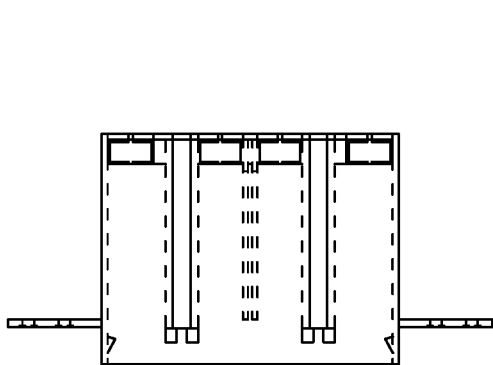
FIG. 72 depicts a top view of the Double Gang Back Box 13.
Figure 75:
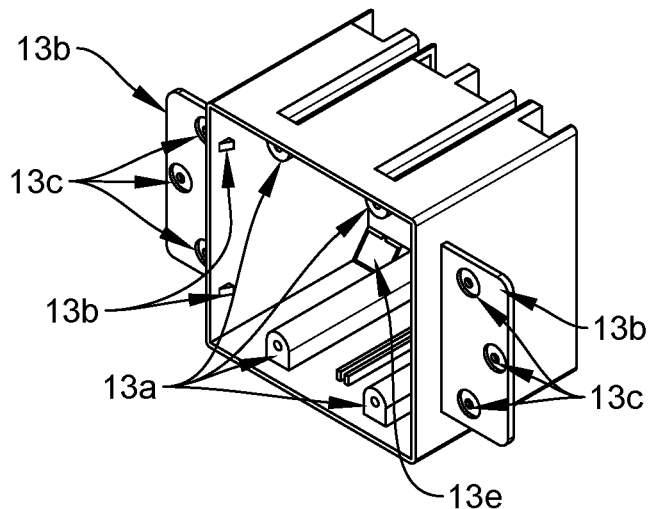
FIG. 75 depicts an isometric view of the Double Gang Back Box 13.
Figure 73:
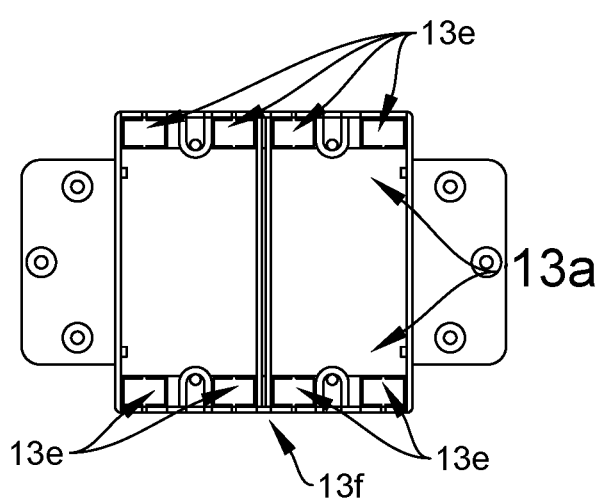
FIG. 73 depicts a front view of the Double Gang Back Box 13.
Figure 76:
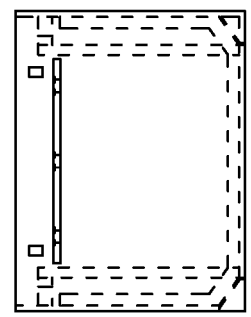
FIG. 76 depicts a right side view of the Double Gang Back Box 13.
Figure 74:
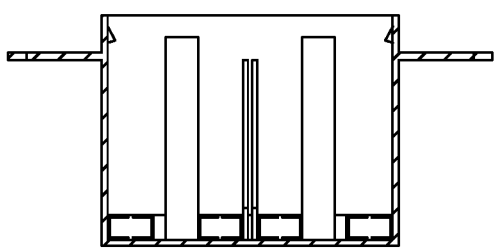
FIG. 74 depicts a cross-sectional view of the Double Gang Back Box 13.
Figure 77:
FIG. 77 depicts a top view of the Double Gang Half Box 14.
Figure 80:
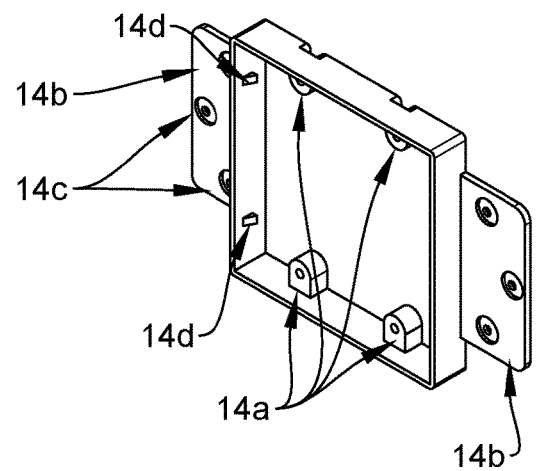
FIG. 80 depicts an isometric view of the Double Gang Half Box 14.
Figure 78:
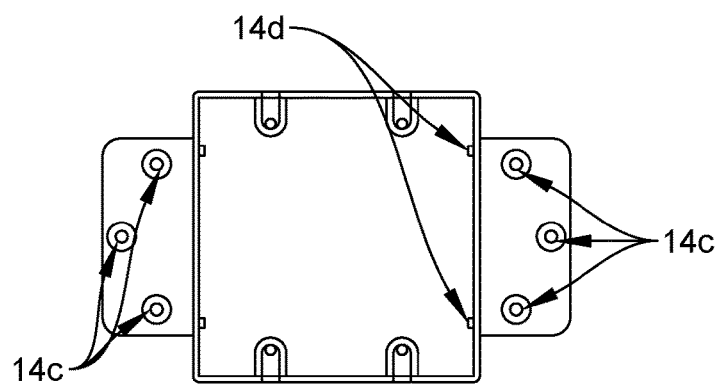
FIG. 78 depicts a front view of the Double Gang Half Box 14.
Figure 79:
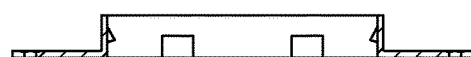
FIG. 79 depicts a cross-sectional view of the Double Gang Half Box 14.
Figure 81:
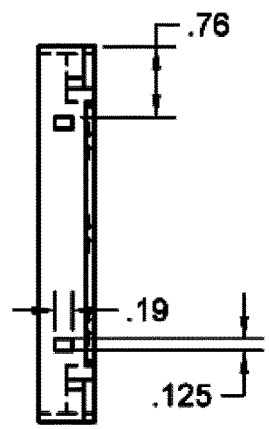
FIG. 81 depicts a right side view of the Double Gang Half Box 14.
Figure 82:
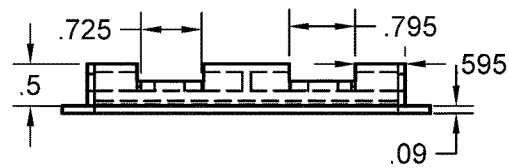
FIG. 82 depicts a top view of the Double Gang Trim Ring 15.
Figure 85:
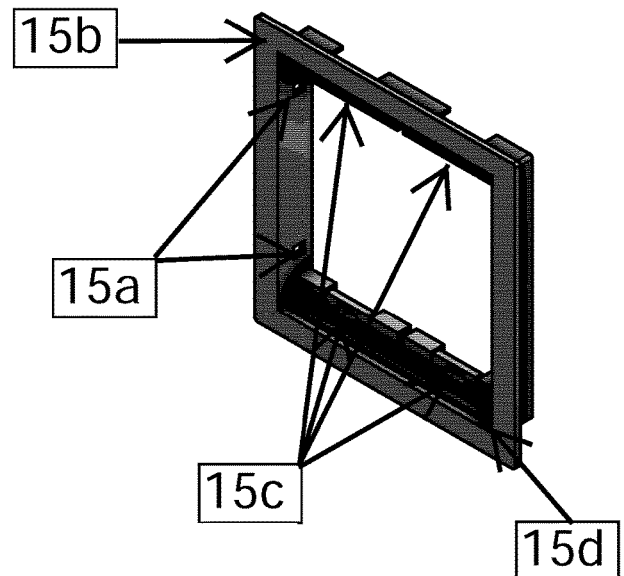
FIG. 85 depicts an isometric view of the Double Gang Trim Ring 15.
Figure 83:
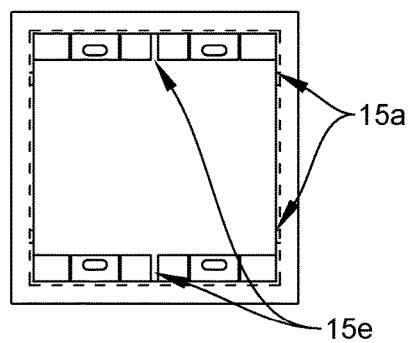
FIG. 83 depicts a front view of the Double Gang Trim Ring 15.
Figure 86:
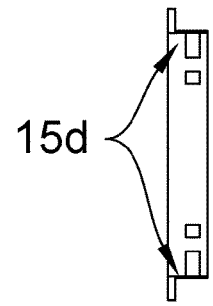
FIG. 86 depicts a right side view of the Double Gang Trim Ring 15.
Figure 84:
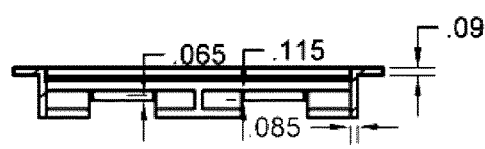
FIG. 84 depicts a cross-sectional view of the Double Gang Trim Ring 15.
Figure 87:
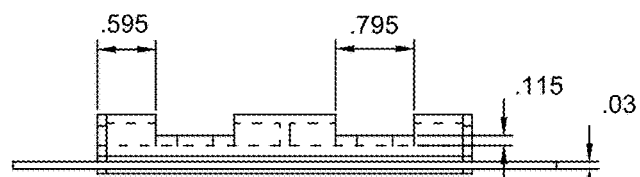
FIG. 87 depicts a top view of the Double Gang Mud Ring 16.
Figure 90:
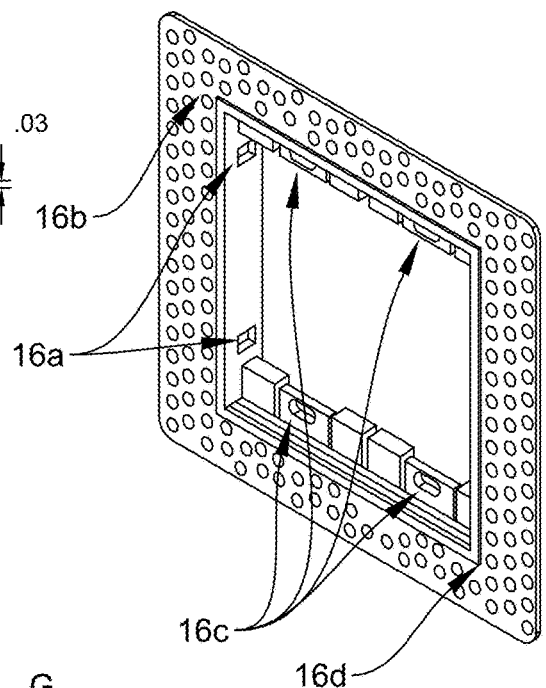
FIG. 90 depicts an isometric view of the Double Gang Mud Ring 16.
Figure 88:
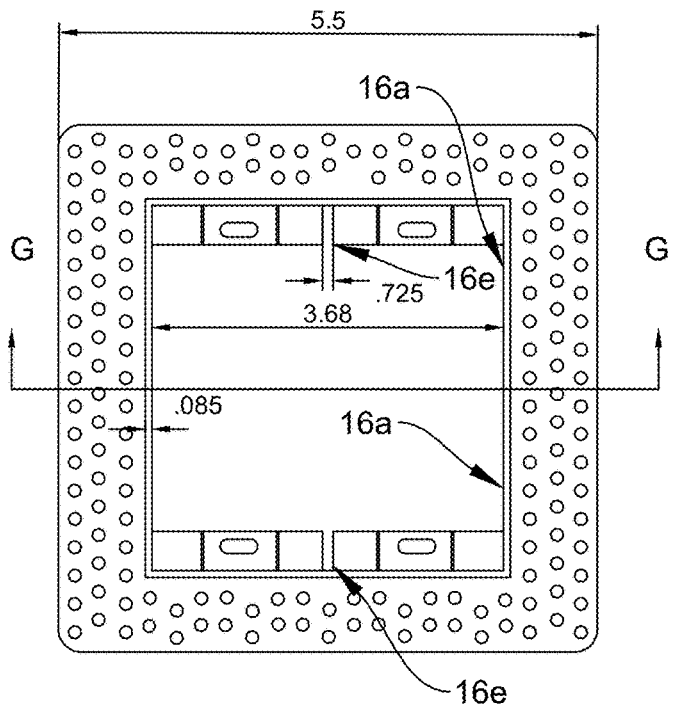
FIG. 88 depicts a front view of the Double Gang Mud Ring 16.
Figure 89:
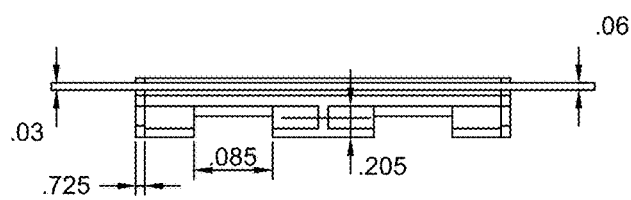
FIG. 89 depicts a cross-sectional view of the Double Gang Mud Ring 16.
Figure 91:
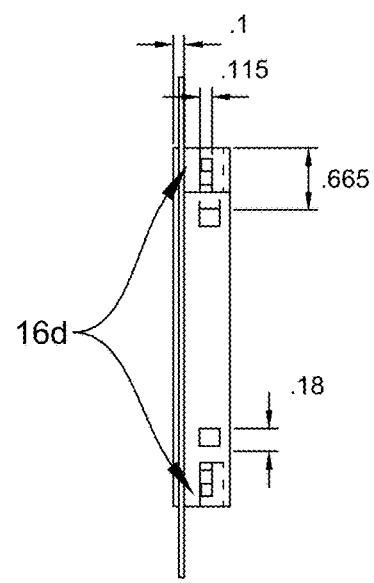
FIG. 91 depicts a right side view of the Double Gang Mud Ring 16.
Figure 98:
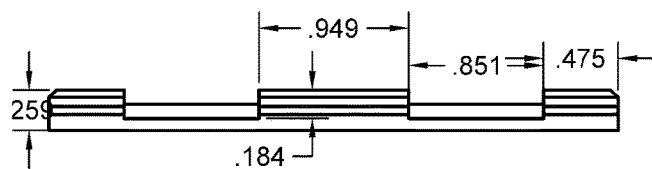
FIG. 98 depicts a top view of the Double Gang Light Switch Faceplate 18.
Figure 101:
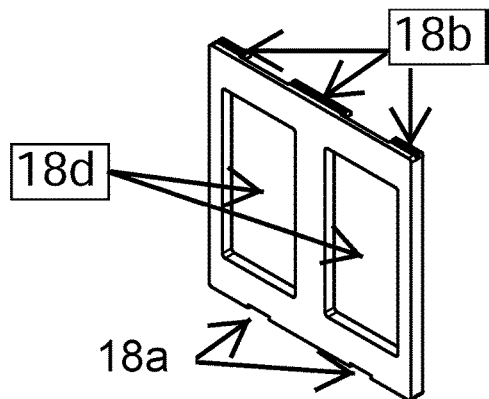
FIG. 101 depicts an isometric view of the Double Gang Light Switch Faceplate 18.
Figure 99:
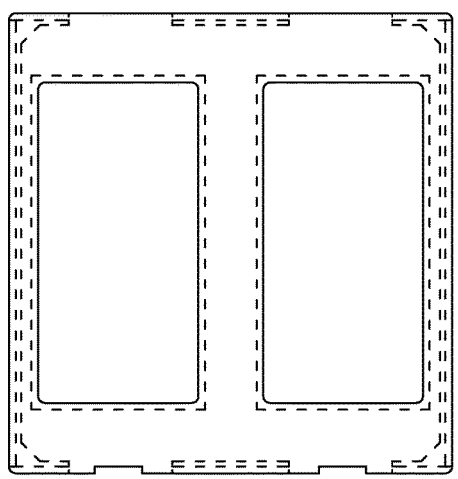
FIG. 99 depicts a front view of the Double Gang Light Switch Faceplate 18.
Figure 102:
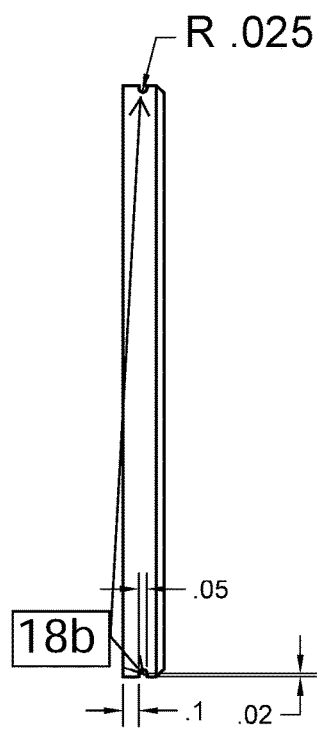
FIG. 102 depicts a right side view of the Double Gang Light Switch Faceplate 18.
Figure 103:
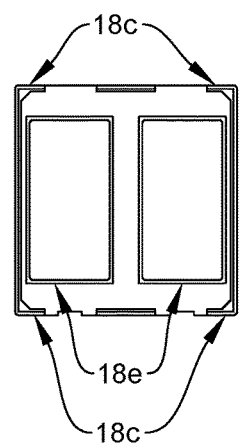
FIG. 103 depicts a back view of the Double Gang Light Switch Faceplate 18.
Figure 100:
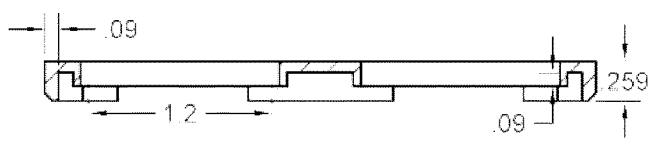
FIG. 100 depicts a cross-sectional view of the Double Gang Light Switch Faceplate 18.
Figure 104:
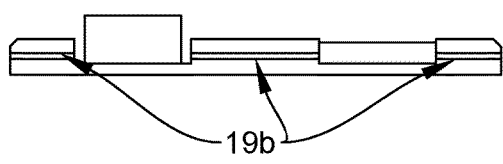
FIG. 104 depicts a top view of the Double Gang Outlet/Two Connector Faceplate 19.
Figure 107:
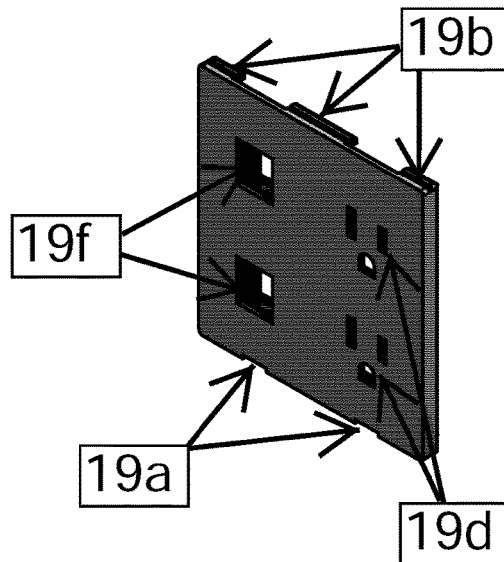
FIG. 107 depicts an isometric view of the Double Gang Outlet/Two Connector Faceplate 19.
Figure 105:
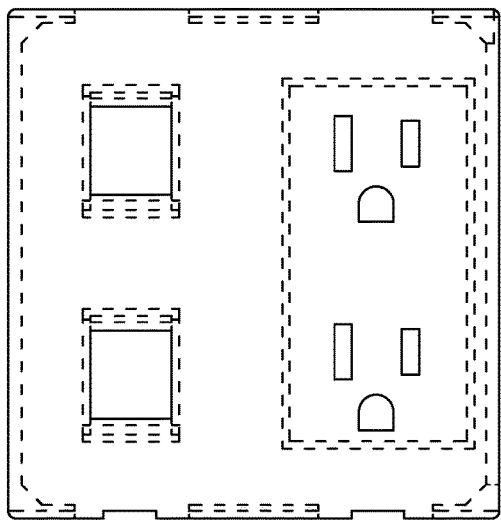
FIG. 105 depicts a front view of the Double Gang Outlet/Two Connector Faceplate 19.
Figure 108:
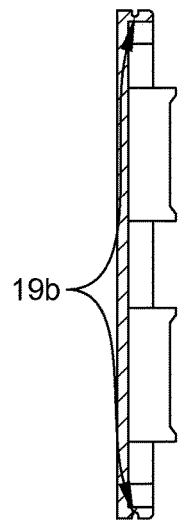
FIG. 108 depicts a right side view of the Double Gang Outlet/Two Connector Faceplate 19.
Figure 106:
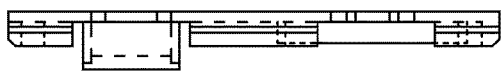
FIG. 106 depicts a cross-sectional view of the Double Gang Outlet/Two Connector Faceplate 19.
Figure 109:
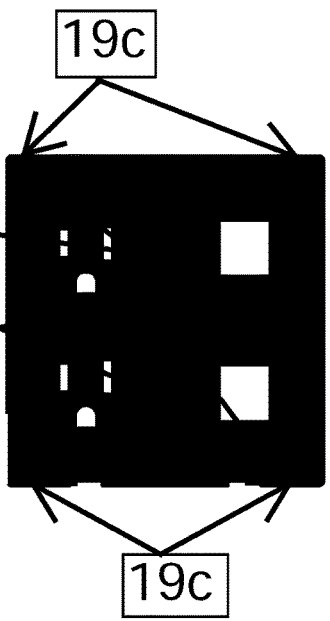
FIG. 109 depicts a back view of the Double Gang Outlet/Two Connector Faceplate 19.
Figure 110:
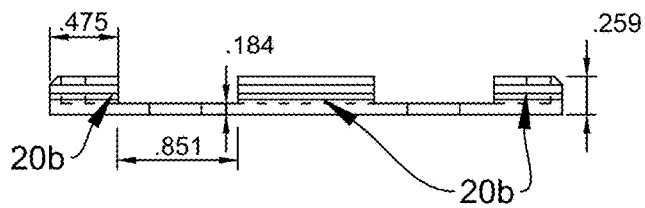
FIG. 110 depicts a top view of the Double Gang Blank Faceplate 20.
Figure 111:
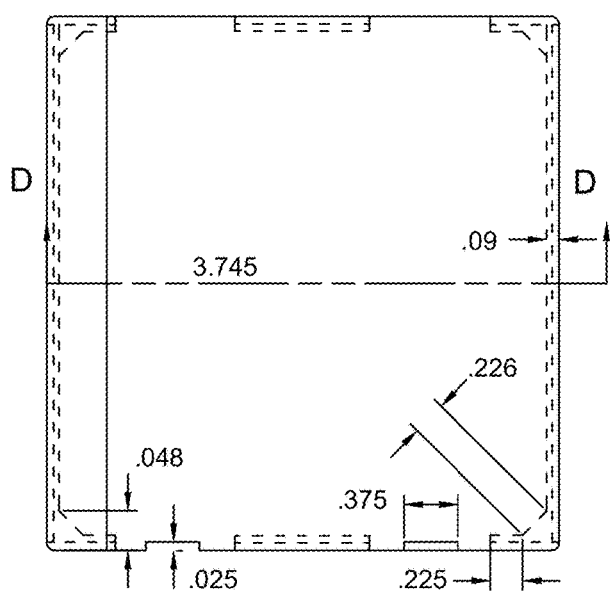
FIG. 111 depicts a front view of the Double Gang Blank Faceplate 20.
Figure 114:
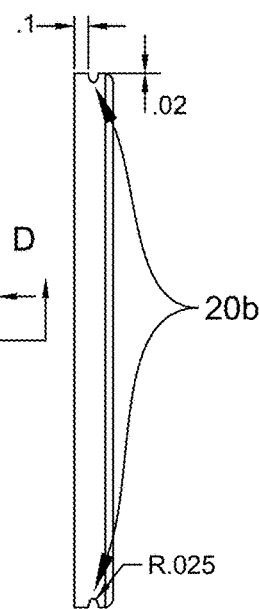
FIG. 114 depicts a right side view of the Double Gang Blank Faceplate 20.
Figure 113:
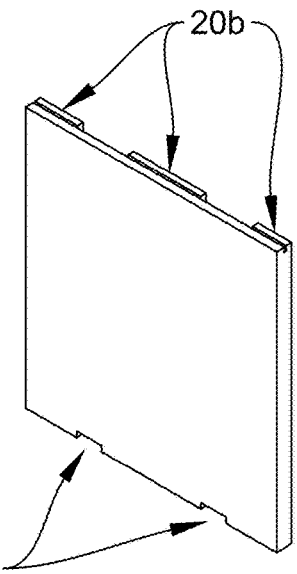
FIG. 113 depicts an isometric view of the Double Gang Blank Faceplate 20.
Figure 112:
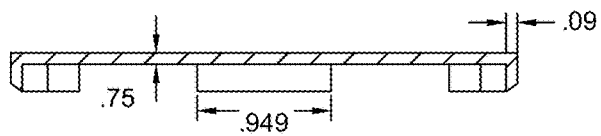
FIG. 112 depicts a cross-sectional view of the Double Gang Blank Faceplate 20.
Figure 115:
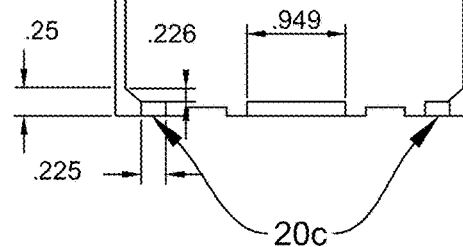
FIG. 115 depicts a back view of the Double Gang Blank Faceplate 20.

The figures show parts for several forms of the inventive flush mounting system, including the following: a single gang configuration sized for mounting a single light switch or single set of electrical outlets (FIGS. 1-69), a double gang configuration sized for mounting a two light switches or two sets of electrical outlets (FIGS. 70-138), a triple gang configuration sized for mounting three lights switches or three sets of electrical outlets (FIGS. 139-201), and a quadruple gang configuration sized for mounting four lights switches or four sets of electrical outlets (FIGS. 202-252). Although the dimensions of the parts vary for each configuration, the parts, the interactions between the parts, and the installation processes for the systems are similar across the four forms listed above, and they may be grouped together in some portions of the description below. Also, as is common, a single junction box can include a combination of light switches and electrical outlets (for example, one light switch one electrical outlet with two inputs can be used in conjunction with the "double" configuration) with small adjustments to the faceplates and mud rings described below. Of course, the principles applied herein can also be expanded beyond the quadruple gang arrangement to five or more gangs, or the parts can be scaled down to a size that is smaller than the single gang configuration depicted herein. In addition, the invention is not limited to standard light switches and electrical outlets, and the "flush mounting" system described herein applies to other electrical, electronic, or wiring systems with wall-mounted connections that would benefit from being mounted flush within the drywall, such as, USB, Ethernet, phone, or cable connections, home security keypads, or thermostats. Exemplary faceplates for some of these systems and combinations of these systems are described below and depicted in the figures, but the invention is not intended to be limited to the depicted faceplates or combinations.

In drywall applications, each of the described configurations uses some form of a Back Box, Mud Ring, and Faceplate to enable the system to be "flush mounted" to the wall. In applications involving a hard surface that is not drywall (such as an outlet that is accessed through wood, granite, or other materials), a Trim Ring is used in place of a Mud Ring. The system also includes Metal Adapters for connecting to a standard "4 square" metal electrical junction box in commercial applications or other applications involving such boxes. The Metal Adapter enables the standard 4 square electrical junction box (as opposed to the specialized Back Boxes described herein) to be used with the specialized Mud Rings, Trim Rings, Faceplates, and other tools of the present invention.

In addition, various tools and "temporary" devices (such as Paint Plugs and Mud Plugs) are described below for use during the installation and painting processes in order to achieve a clean finish and look for the fully installed products.

The Back Boxes, Mud rings, Trim Rings, Faceplates, Mud Pugs, and Paint Plugs are typically made from UL-approved plastic such as ABS plastic with a minimum 2 hour burn rate. In the alternative, any or all of the parts can be made from steel. Plastic is less expensive to manufacture, but steel may be preferred or even required in some contexts. For example, steel back boxes are usually required in commercial buildings. The Metal Adapters are steel so that they can be used with 4 square commercial electrical junction boxes in compliance with local codes.

In the paragraphs that follow, the various individual components are described, followed by a brief walkthrough of the installation process.

Back Boxes.

Detailed views of examples of Back Boxes are shown in FIGS. 3-12, 72-81, 141-150, and 204-213. The various forms of Back Boxes described herein (Part Nos. 1, 2, 13, 14, 25, 26, 36, 37) are designed to be building code-compliant. An important difference between these boxes and existing boxes is that the boxes described herein specifically couple with the Mud Rings and faceplates of the inventive system to form a "clamp" around drywall prior to mudding.

In some forms, the back box has a "closed" back (referred to herein as a "Back Box") (Part Nos. 1, 13, 25, 36), while in other forms, the back is open (referred to herein as a "Half Back Box") (Part Nos. 2, 14, 26, 37). As stated above, building codes may require the closed back of the full box in certain applications.

Both the Back Boxes and the Half Back Boxes include two "ears" (1b, 2b, 13b, 14b, 25b, 26b, 36b, 37b) on the sides of boxes. The ears are located on the box such that they sit flat in contact with the back side of drywall or other wall surface of a finished wall, once installed. The distance from the front portion of the Back Box to the front side of the ears corresponds to the thickness of the drywall or other material being installed to form the wall. For example, for ½" drywall, that distance is ½", and for ⅝" drywall, that distance is ⅝".

The ears shown in the figures also include holes (1c, 2c, 13c, 14c, 25c, 26c, 36c, 37c) for securing and mounting the Back Box or Half Back Box with nails or screws onto studs or other mounting structures behind a finished wall before the drywall or other wall surface is installed. Of course, the Back Boxes can also be installed in an already completed building if the surrounding drywall is removed for installation of the box and then subsequently replaced.

As another alternative, an installer can choose not to use the ear holes, and to instead glue the front surface of the ears to the back of the drywall or other surface to secure the Back Boxes. This also eliminates the need for attachment to a stud.

The Back Boxes shown in the figures may also include inner mounting structures for mounting the electrical or other equipment to the box. In the examples shown in the figures, the Back Boxes and Half Back Boxes include top and bottom mounting structures (1a, 2a, 13a, 14a, 25a, 26a, 36a, 37a) with screw holes. The mounting structures depicted are designed for mounting standard electrical outlets and standard light switches to the back boxes (for example, see the Leviton, "Catalogue, Section B Decora Devices," at Pages 12-19). In applications involving other equipment, the back box may include different mounting structures specific to the equipment being mounted. The Single Gang Back Box (1) and Single Gang Half Back Box (2) each include one set of top and bottom mounting structures (1a and 2a). The Double Gang Back Box (13) and Double Gang Half Back Box (14) each include two sets of top and bottom mounting structures (13a and 14a). The Triple Gang Back Box (25) and Triple Gang Half Back Box (26) include three sets of top and bottom mounting structures (25a and 26a). The Quadruple Gang Back Box (36) and Quadruple Gang Half Back Box (37) include four sets of top and bottom mounting structures (36a and 37a).

In addition, the sides of the Back Boxes may also include protruding tabs (1d, 2d, 13d, 14d, 25d, 26d, 36d, 37d) for snapping the Mud Rings into place after drywall is installed. The Mud Rings include holes (4a, 16a, 28a, and 39a) that mate with the tabs and lock the Mud Rings into place. This is a simple and effective system for locking the Mud Rings into place. Other methods of coupling the Back Boxes and Mud Rings can also be used the important point is that the Back Box must provide an effective mechanism for coupling with the Mud Rings after drywall installation, such that the Mud Ring and Back Box ears "clamp" around the drywall.

In another form, the Back Boxes may include knockout tabs for wiring (1e, 13e, 25e, 36e) so that electrical wiring can be inserted into the Back Box. The wiring must be adequate for the devices that will be installed within or otherwise coupled through the cover plate to the Back Box. Some or all of the knockout tabs can be removed in order for electrical wiring to be inserted.

For the Double Gang, Triple Gang, and Quadruple Gang Back Boxes (Part Nos. 13, 25, 36), it may be desirable include low voltage electrical components and high voltage electrical components within the same box assembly. For example, in the Double Gang Back Box, the job may call for an electrical outlet mounted on one set of mounting structures 13a, and low voltage USB ports on the other set of mounting structures 13a. The Faceplate 19 (depicted in FIGS. 104-109) shows an exemplary face plate for use with this combination of electrical devices.

However, in order to combine low voltage and high voltage equipment within the same Back Box, the low voltage and high voltage portions need to reside in separate "compartments" within the Back Box. To address this problem, the exemplary Double Gang, Triple Gang, and Quadruple Gang Back Boxes (Part Nos. 13, 25, 36) shown in the figures each include built-in divider channels (13f, 25f, 36f) on the top and bottom of the inside of the back box. In one form, the Triple and Quadruple Gang Back Boxes each include multiple sets of divider channels to provide options to create multiple separate compartments for equipment within the box.

The Box Divider (Part 45, depicted in FIGS. 253-255) slides into the divider channels to effectively create separate compartments on each side of the divider within the Back Box. With this configuration, low voltage equipment can me mounted within the Back Box on one side of the divider, and high voltage equipment on the other.

Mud Rings.

Detailed views of several examples of Mud Rings are shown in FIGS. 18-22, 87-91, 156-160, and 219-223. The Mud Rings (Part Nos. 4, 16, 28, and 39) are designed to couple with the back boxes after the drywall or other wall structure is installed. Specifically, after the back box is secured and drywall is installed, the Mud Ring is inserted into the back box and snapped into place.

In one form, the Mud Rings depicted in the figures can include rectangular holes (4a, 16a, 28a, and 39a) for mating with the tabs (1d, 2d, 13d, 14d, 25d, 26d, 36d, 37d) of the back boxes. The back box and Mud Rings are manufactured with the holes and tabs located such that, when a Mud Ring is snapped into place, the Mud Ring is secured to the back box with the back of the outer surface of the Mud Ring in contact with the installed drywall. For example, for standard ⅝" drywall, the distance between the ears of the Back Box and the back of the outer surface of the Mud Ring should be approximately ⅝" when the Mud Ring is snapped into place, so that the drywall is fitted between the two parts, and the Mud Ring and back box ears form a "clamp" around the drywall. Likewise, for example, for ½" drywall, the distance between the ears of the Back Box and the back of the outer surface of the Mud Ring should be approximately ½".

The outer surface of the Mud Ring (4b, 16b, 28b, and 39b), which initially remains exposed after it is coupled to the drywall, includes holes or other slits in its face, as shown by way of example in the figures. The holes/slits are important for securing the Mud Ring during the "mudding" process of finishing the wall. The round holes depicted in the figures are merely exemplary, and the holes/slits can be square, oblong, oval, triangular, or any other form suitable to provide mud adhesion. The holes/slits can also be more dense, less dense, larger, or smaller than those depicted in the figures, as long as mud properly adheres through the holes/slits while still covering the Mud Ring.

After the Mud Ring is coupled (or snapped) to the back box, mud is applied to the drywall and over the outer surface (4b, 16b, 28b, and 39b) of the Mud Ring. The applied mud covers the drywall, covers the Mud Ring, and also fills in the holes or slits of the Mud Ring with mud. As a result, the Mud Ring is effectively "locked" into place and also concealed by the applied mud. Typically 2-3 layers of mud (resulting in a ⅛" thick layer of mud on the wall) are applied before the Mud Ring is adequately concealed without showing cracking or other visible defects on the outer surface of the wall. It is contemplated the shape and density of the holes or slits can be varied depending on the application and type of mud and wall that are employed.

The Mud Rings depicted in the figures also include top and bottom "lips" (4d, 16d, 28d, and 39d). The Faceplates and Mud Plugs include corresponding grooves (5b, 6b, 7b, 8b, 9b, 10b, 11b, 17b, 18b, 19b, 20b, 21b, 22b, 23b, 29b, 30b, 31b, 32b, 33b, 34b, 40b, 41b, 42b, 43b) designed to mate with the lips when the Faceplates or Mud Plugs are installed in the Mud Rings, thereby locking the Faceplates or Mud Plugs into place. In some forms, the lips could be placed on the sides of the Mud Rings with corresponding grooves also being placed on the sides of the Faceplates and Mud Plugs for mating and locking those items into place.

As yet another feature, the Mud Rings shown in the figures may also have removable, tabbed "break away" pieces (4c, 16c, 28c, and 39c) that are easily removed in some applications. The breakaway pieces add convenience for both the manufacturers and purchasers of the system because they enable the same Mud Ring to be used for both electrical outlets and light switches. In alternate forms, a Mud Ring can be manufactured specifically to fit the dimensions of a light switch (for example, with the tabbed break away pieces being permanent and not removable), or the Mud Ring can be manufactured specifically to fit the dimensions of an electrical outlet (i.e., with no tabbed piece at all on the Mud Ring).

In the forms of the Mud Ring with the tabbed break away piece, when the Mud Ring is installed for pairing with a lights switch, the tabbed break away pieces are kept on the Mud Ring. The tabbed break away pieces are located on the Mud Ring such that the light switch will sit in front of the tabbed pieces, and the screws that secure the light switch to the box will fit through the holes of the tabbed pieces (4c, 16c, 28c, and 39c) and then into the mounting structures of the Back Box (1a, 2a, 13a, 14a, 25a, 26a, 36a, 37a).

With an electrical outlet, the outlet is thicker and will sit "deeper" in the back box. Thus, when a "tabbed" form of the Mud Ring is used with an electrical outlet, the tabbed break away piece is "snapped off" (can be completed using fingers) and removed to accommodate the size of the electrical outlet before the electric outlet is installed within the back box. With this arrangement, screws (or other appropriate fasteners) are used to secure the electrical outlet to the mounting structures of the Back Box (1a, 2a, 13a, 14a, 25a, 26a, 36a, 37a), with no need to fit them through any part of the Mud Ring.

Mud Plugs.

Detailed views of some representative examples of the Mud Plugs are shown in FIGS. 59-64, 128-133, 191-196, and 242-247. The Mud Plugs (Part Nos. 11, 23, 34, and 43) are temporarily-installed devices for protecting the inside of the Mud Ring and the back box (and anything else contained within the box) during mudding.

After the drywall is installed and the Mud Ring is attached to the back box (but before mudding), the Mud Plug is snapped within the Mud Ring. With the Mud Plug installed, the mud, plaster, or other finishing material can be installed over the Mud Ring without the need for the installer to be concerned with the mud or other finishing dripping or leaking onto the inside of the Mud Ring or Back box. In other words, the inside of the Mud Ring and Back Box remain clean and free from debris so that a Faceplate can later be seated in the Mud Ring correctly after mudding is complete. The Mud Plugs may include grooves (11b, 23b, 34b, and 43b) at the top and bottom to fit around the lips (4d, 16d, 28d, and 39d) of Mud Ring and lock the Mud Plug into place within the Mud Ring, similar to how the Faceplates lock into the Mud Ring. The Mud Plugs also include one or more holes (11a, 23a, 34a, and 43a) so that the mud plugs can be "popped off" with a screwdriver or similar device and removed after the mudding and finishing process is complete. After a Mud Plug is removed, it can be reused with different Mud Ring during mudding, or it can be discarded.

Although the Mud Plugs are a useful and convenient tool during the mudding process to keep the inside of the Mud Ring and Back Box clean, they are not a required piece of the flush mounting system. With care, and at a slower pace, the wall finisher can complete the mudding process without them.

Importantly, in one form of the invention, the Mud Plugs are installed after the electrical equipment is mounted to the Back Box and wired. For example, an installer can mount the Back Box to the stud, insert the wiring into the back box, and then mount an electrical outlet within the Back Box. The electrical work within the box is now complete. With the electrical work complete, a drywaller can then install drywall and install the Mud Ring within the Back Box, followed by a Mud Plug within the Mud Ring. With this configuration, the drywall and Mud Ring can be mudded over with the electrical outlet already installed but safely protected behind the Mud Plug.

Faceplates.

Detailed views of several exemplary faceplates are shown in FIGS. 23-58, 92-127, 161-190, and 224-241. After the mudding process is complete (and any Mud Plugs are removed), the electrical equipment such as the outlet or light switched is installed within the back box (either before or after mudding), and a Faceplate covers that equipment to provide the "finished" look. The Faceplates (Part Nos. 5, 6, 7, 8, 9, 10, 17, 18, 19, 20, 21, 22, 29, 30, 31, 32, 33, 40, 41, and 42) are designed to couple with the Mud Ring and to sit flush or flat with the finished wall when installed. Exemplary forms of Faceplates are provided in the figures, but those examples are not intended to be limiting with respect to the type of devices that can be installed within the electrical box.

The Faceplates may include a top and/or bottom groove (5b, 6b, 7b, 8b, 9b, 10b, 17b, 18b, 19b, 20b, 21b, 22b, 29b, 30b, 31b, 32b, 33b, 40b, 41b, and 42b) that mates with the lip (4d, 16d, 28d, and 39d) of a Mud Ring to snap the Faceplate into place. A user simply pushes the Faceplate against the lip until the two parts snap together. An installed Faceplate sits snugly against the shoulders inside of the Mud Ring. One or more small notches (5a, 6a, 7a, 8a, 9a, 10a, 17a, 18a, 19a, 20a, 21a, 22a, 29a, 30a, 31a, 32a, 33a, 40a, 41a, and 42a) are located on the bottom of the Faceplate for a screwdriver or other device to "pop off" the plate off for service.

In the form of the invention shown in the figures, the backs of the Faceplates are not flat. Instead, each face plate may include a raised outer support ridge (5c, 6c, 7c, 8c, 9c, 10c, 17c, 18c, 19c, 20c, 21c, 22c, 29c, 30c, 31c, 32c, 33c, 40c, 41c, and 42c) that presses against the Mud Ring when the faceplate is snapped into place and helps strengthen the Faceplate (for example, if a device is plugged into an outlet Faceplate, the extra support helps prevent breaking or bending of the Faceplate). The raised support ridge may includes extra material at each of the four corners of the Faceplate for further supporting the face plate against the Mud Ring.

As shown in the Figures, the Faceplates are generally designed to correspond to and cooperate with the electrical equipment or other items in the box behind the wall. For example, Electrical Outlet Faceplates (Part Nos. 5, 17, 29, and 40, in FIGS. 23-28, 92-97, 161-166, and 224-229) are designed to be installed in front of a standard decora electrical outlets (for example, see the Leviton, "Catalogue, Section B Decora Devices," at Page 12). These Electrical Outlet Face Plates include raised support edges (5e, 17e, 29e, and 40e) on the back of the plate that fit snugly around the outer edge of a standard decora outlet, when the face plate is installed. This raised edge keeps the electrical outlet behind the plate in place, keeps the prong openings (5d, 17d, 29d, and 40d) of the Electrical Outlet Face Plate aligned with the receivers of the decora outlet, and prevents slipping from occurring when devices are actually plugged into the outlet. The prong openings (5d, 17d, 29d, and 40d) are sufficient for the prongs of an electrical plug to fit through the faceplate and into the decora outlet itself.

For example, with GFCI outlets (for example, see the Leviton, "Catalogue, Section B—Decora Devices," at Pages 14-15), the GFCI Outlet Faceplate (Part No. 6, depicted in FIGS. 29-34) includes the prong openings (5d) and raised support edges (6e) for the decora outlet, and additionally includes additional access holes for the GFCI switch/LED indicator (6f). Although a single gang GFCI Outlet Faceplate is depicted, any of the outlet face plates can be modified to accommodate GFCI simply by adding the access holes for the GFCI switch/LED indicator.

Still further, the Light Switch Faceplates (Part Nos. 7, 18, 30, and 41) are designed to fit over and around standard decora light switches (for example, see the Leviton, "Catalogue, Section B Decora Devices," at Page 19). The Light Switch Faceplates include light switch holes (7d, 18d, 30d, and 41d) to accommodate a standard light switch and enable operation of the switch to the on/off positions. The backs of the Light Switch Faceplates have raised support edges (7e, 18e, 30e, and 41e) that further support a switch and hold the Faceplate in place around it.

In another form, Connector Faceplates (Part Nos. 9, 10, 21, 22, 32, and 33 depicted in FIGS. 47-58, 116-127, and 179-190) are used mostly in conjunction with low voltage equipment. They include connector access points (9d, 10d, 21d, 22d, 32d, and 33d) through the plate and snap-in connector parts (9e, 10e, 21e, 22e, 32e, and 33e) for snapping the low voltage equipment into the Connector Faceplates. Coax Connectors, USB connectors, RJ11, and RJ45 connectors are all configured to be snapped into the Connector Faceplates. The connectors are either mounted to a piece of plastic or are molded into a piece of plastic known as a "keystone connector" that is designed to snap into one of the snap-in connector parts and access points (for examples of keystone jacks/connectors for various low voltage products, see Structured Cable Products, "Datacom Accessories Catalog"). Each access point includes one item, and a builder can "mix and match" the items that are fitted within a single Connector Faceplate.

The Double Gang Outlet/Two Connector Faceplate (Part No. 19, depicted in FIGS. 104-109) includes the combination of electrical outlet prong openings (19d) and raised support edges (19e) and connector access points (19f) and snap-in keystone connector parts (19g). With this arrangement, an electrical outlet can be installed on one side of the box, and low-voltage connector equipment (for example coax plus USB) can be installed on the other. With this arrangement, as discussed above, the Box Divider (45) is inserted into the divider channels (13f) of the Double Gang Back Box (13) to separate low voltage from high voltage before the Double Gang Outlet/Two Connector Faceplate (19) is installed.

Of course, the Double Gang Outlet/Two Connector Faceplate is just one example of a "combination" type of faceplate for covering different devices within the same junction box. For example, a double gang faceplate can have components for an outlet on one side and components for a light switch on the other. A triple gang face plate can have two sets of light switch components and one set of outlet components, etc.

In addition, the Mud Rings and Faceplates may be designed such that two Single Gang Faceplates can be used in place of one Double Gang Faceplate, Three Single Gang Faceplates (or One Double Gang Plus One Single Gang Faceplate) can be used in place of one Triple Gang Faceplate, and Four Single Gang Faceplates can be used in place of One Quadruple Gang Faceplate, etc. For example, if a builder wanted to include an electrical outlet on one side and a light switch on the other side of the Double Gang Back Box (13), he can choose to install a Single Gang Electrical Outlet Faceplate (5) and a Single Gang Light Switch Faceplate (7) into the Double Gang Mud Ring (16).

The Blank Faceplates (Part Nos. 8, 20, 31, and 42, depicted in FIGS. 41-46, 110-115, 173-178, and 236-241) include the notches (8a, 20a, 31a, and 42a), grooves (8b, 20b, 31b, and 42b), and raised outer support ridges (8c, 20c, 31c, and 42c) like other face plates, but they are "blank" on the front, without holes or other access points to any electrical equipment. The Blank Faceplates can be used to conceal wire junctions and unwanted devices behind them that do not need daily user access. Most building codes require access to all wire junctions. With the Blank Faceplates, access is still made possible, but the junctions can be ostensibly hidden because the plate is flush mounted (as described herein) and painted to match the wall.

Another benefit of the Blank Faceplates is that they are "customizable." For example, if a builder wants to install a device with an irregular shape or that is not otherwise compatible with one of the existing faceplates, the builder can buy a Blank Faceplate and modify it by drilling holes and other access points into the front of the Blank Faceplate to suit his needs prior to installation.

Metal Adapters.

Detailed views of examples of the Metal Adapters are shown in FIGS. 65-69, 134-138, 197-201, and 248-252. The Metal Adapters (Part Nos. 12, 24, 35, and 44) are used for flush mounting with a standard metal electrical junction boxes. Metal junction boxes are typically required by code in most commercial applications, but they can also be used in residential applications as well.

With the Metal Adapters, standard metal electrical junction boxes are used to house the electrical equipment instead of the specialized Back Boxes described herein. Once a Metal Adapter and electrical junction box are coupled, the Mud Rings, Trim Rings, Faceplates, and other tools described herein can be installed and used for that electrical junction.

In addition to being machined from metal, each Metal Adapter includes a mounting system for mounting it to a metal electrical junction box.

In the example of the Single Gang Metal Adapter (12), each ear (12b) includes two screw holes (12c), with one at each corner of the adapter. The four screw holes line up with the four screws located within a standard "4 square" metal junction box, and screws are inserted through them and into the junction box to lock the Single Gang Metal Adapter into place. See, e.g., Hubbell "Raco Steel Boxes, Covers and Accessories," at page A6 for examples of 4 square metal boxes.

The Double Gang Metal Adapter (24), Triple Gang Metal Adapter (35), and Quadruple Gang Metal Adapter (44) each may include four tabs (24g, 35g, and 44g) with screw holes, with one tab at each corner of the inside of the adapter. The four screw holes of the tabs (24g, 35g, and 44g) line up with the four screws located within a 4 square metal junction box, and screws are inserted through them and into the junction box to lock the Metal Adapter into place. The screw holes of the tabs (24g) in the Double Gang Metal Adapter (24) line up to fit and attach with the same standard 4 square box that the Single Gang Metal Adapter (12) fits with. The screw holes of the tabs (35g) in the Triple Gang Metal Adapter (35) align with the screw holes in a larger triple gang metal box. See, e.g., Hubbell "Raco Steel Boxes, Covers and Accessories," at pages A53-A54 for example of a triple gang metal box. While four screw holes are shown in many of the examples, the inventions may use any number of screw holes sufficient to accomplish the mounting the Adaptors and boxes. The screw holes of the tabs (44g) in the Quadruple Gang Metal Adapter (44) align with the screw holes in an even larger Quadruple gang metal box. See, e.g., Hubbell "Raco Steel Boxes, Covers and Accessories," at pages A53-A54 for example of a quadruple gang metal box. The Double, Triple, and Quadruple Gang Metal Adapters include ears (24b, 35b, and 44b) that rest against the back of installed drywall (and with installed Mud Rings, form a clamp around it), and optional screw holes (24c, 35c, and 44c) for mounting the adapters to a wall stud.

Like the Back Boxes, the Metal Adapters include top and bottom mounting structures (12a, 24a, 35a, and 44a) with screw holes. The mounting structures depicted are designed for mounting standard electrical outlets and standard light switches to the Metal Adapters (for example, see the Leviton, "Catalogue, Section B Decora Devices," at Pages 12-19). In applications involving other equipment, the Metal Adapter may include different mounting structures specific to the equipment being mounted. The Single Gang Metal Adapter (12) includes one set of top and bottom mounting structures (12a). The Double Gang Metal Adapter (24) includes 2 sets of top and bottom mounting structures (24a). The Triple Gang Metal Adapter (35) includes 3 sets of top and bottom mounting structures (35a). The Quadruple Gang Metal Adapter (44) includes 4 sets of top and bottom mounting structures (44a).

Also like the back Boxes, the sides of the Metal Adapters include protruding tabs (12d, 24d, 35d, and 44d) for snapping the Mud Rings into place after drywall is installed. The Mud Rings include holes (4a, 16a, 28a, and 39a) that mate with the tabs and lock the Mud Rings into place within the Metal Adapters. This is a simple and effective system for locking the Mud Rings into place. Other methods of coupling the Metal Adapters and Mud Rings can also be used the important point is that the Metal Adapter must provide an effective mechanism for coupling with the Mud Rings after drywall installation, such that the Mud Ring and Metal Adapter ears "clamp" around the drywall.

Paint Plugs.

The inventions include use of Paint Plugs (Part Nos. 46-49, examples depicted on in FIGS. 256-272) typically after mudding but before painting of the walls/Faceplates. One of the main purposes of the flush mount systems and methods described herein is to blend the electrical component access points in with the wall much as possible. Thus, in addition to sitting flush with the wall, the Faceplates can be painted over (and are made from material that will adhere to paint) with the same color as the wall such that the faceplate and the wall blend seamlessly together.

An installer of the system has the option to paint the Faceplates and allow them to dry before installing the Faceplates into the Mud Rings. The Mud Rings can also be painted and dried prior to installation, so that any visible portion of the Mud Ring matches the wall.

As a simpler solution, an installer may prefer to paint the walls and the Faceplates at the same time. This also eliminates the need for extra work by the painter, or extra coordination between the electrician and/or drywall installer, and the painter (the painter comes in to do his job with the electrical outlets and all of the covers fully installed). In this scenario, the Mud Rings, electrical devices, and Face Plates are installed and mudding is finished prior to painting any of the items.

One problem with painting the walls and faceplates at the same time is that the inside of the electrical outlets or other devices should not be painted. With the outlets and other devices exposed, it is difficult and time-consuming to paint around them while still covering the entire faceplate and surrounding areas.

The Paint Plugs (Part Nos. 46, 47, 48, 49) solve this problem by protecting the installed electrical devices while leaving the remainder of the Faceplates exposed for painting. For example, the RJ45 Paint Plug (46) snaps into an RJ45 socket installed in a Faceplate through the front of the Faceplate, and includes a cut-out (46a) to prevent damage to any contacts. With the RJ45 Paint Plug in place, the painter can simply paint around it when painting the Faceplate, to cover the Faceplate without impacting the socket. After paint dries, the RJ45 Paint Plus is removed by simply pulling it out of the socket.

Similarly, the Cable Paint Plug (47) fits over an installed cable jack during painting, and the Light Switch Paint Plug 49 fits over an installed light switch during painting. The Light Switch Paint Plug includes a groove (49a) for accommodating the protruding side of the switch.

The Electrical Outlet Paint Plug (48) works similarly to the other Paint Plugs but also solves an additional problem specific to electrical outlets. When painting an Electrical Outlet Faceplate, it is necessary to plug all three of the prong sockets in the outlet, but it is also desirable to paint the entire area between the prong sockets. To address this problem, the Electrical Outlet Paint Plug includes extended prongs (48a) that fit inside of the electrical outlet. When the Electrical Outlet Paint Plug is inserted, a gap remains between the Electrical Outlet Faceplate and the top of the Paint Plug (48b). Because of the gap, a painter can paint the area of the Faceplate that the socket of the electrical outlet, without any paint dripping into the socket.

In addition to protection during painting, the Paint Plugs can also be installed to protect installed electrical components behind the plate from construction debris, dust, etc. during the course of normal construction.

After painting or the construction job is complete, any of the Paint Plugs can be kept and reused for another job, or simply thrown out after use. In addition, the Paint Plug concept can also be applied to other installed electrical items beyond those shown in the figures to protect those electrical items during painting/construction, and may also be employed any time the installer desires to prevent mud, paint or other finishing materials from entering the sockets, outlets, etc. in the plates.

Trim Rings.

Detailed views of several forms of Trim Rings are shown in FIGS. 13-17, 82-86, 151-155, and 214-218. Like the Mud Rights, the Trim Rings (Part Nos. 3, 15, 27, and 38) are designed to couple with the Back Boxes after the wall structure is installed. Specifically, after the Back Box is secured to a wall, a Trim Ring inserted into the Back Box and snapped into place.

One difference between the Trim Rings and the Mud Rings is that the Trim Rings are designed for non-drywall applications and/or hard surface applications that do not involve mudding. For example, electrical outlets are often installed in a wooden kitchen island or inside of a backsplash in a kitchen. In those instances, the outer surface of the wall is a hard surface, and not a surface that is mudded over, such as drywall. With no opportunity for coverage by mud, the Mud Ring would be visible on the outer surface of the wood, backsplash, or other hard surface when snapped into place. Furthermore, in hard surface applications, a stud may be unavailable for mounting the Back Box.

Accordingly, in one form of the invention involving electrical components installed behind a hard surface, a hole can be cut into the hard surface that is just large enough for the front of a Back Box to be pushed through, with the ears of the Back Box resting on the back of the hard surface. In this arrangement, to avoid the need for mounting the Back Box to a stud, glue can be applied to the ears of the Back Box and/or the back of the hard surface, such that the Back Box is glued into place to the back of the hard surface.

With the Back Box glued into place, a Trim Ring is snapped into place by pushing it into a Back Box and mating the rectangular holes (3a, 15a, 27a, and 38a) with the tabs (1d, 2d, 13d, 14d, 25d, 26d, 36d, 37d) of the Back Box. When a Trim Ring is snapped into place, the Trim Ring is secured to the Back Box with the back of the outer surface of the Trim Ring in contact with the wall surface. For example, for a ⅝" board, the distance between the ears of the Back box and the back of the outer surface of the Trim Ring should be approximately ⅝" when the Trim Ring is snapped into place, so that the wall is fitted between the two parts, and the Trim Ring and Back box ears form a "clamp" around the wall.

The outer surface of the Trim Ring (3b, 15b, 27b, and 38b), unlike the Mud Rings, does not include holes or mud adhesion and should be thin. The Trim Rings depicted in the figures also include top and bottom "lips" (3d, 15d, 27d, and 38d). The Faceplates include corresponding grooves (5b, 6b, 7b, 8b, 9b, 10b, 17b, 18b, 19b, 20b, 21b, 22b, 29b, 30b, 31b, 32b, 33b, 40b, 41b, 42b) designed to mate with the lips when the Faceplates are installed in the Trim Rings, thereby locking the Faceplates into place.

The Trim Rings shown in the figures, like the Mud Rings, may also have removable "break-away" pieces (3c, 15c, 27c, and 38c) that can be removed depending on the application. The break-away pieces add convenience for both the manufacturers and purchasers of the system because they enable the same Trim Ring to be used for both electrical outlets and light switches. In alternate forms, a Trim Ring can be manufactured specifically to fit the dimensions of a light switch (for example, with the tabbed pieces being permanent and not removable), or the Trim Ring can be manufactured specifically to fit the dimensions of an electrical outlet (i.e., with no tabbed piece at all on the Trim Ring).

In the forms of the Trim Ring with the tabbed piece, when the Trim Ring is installed for pairing with a lights switch, the tabbed pieces are kept on the Trim Ring. The tabbed pieces are located on the Trim Ring such that the light switch will sit in front of the tabbed pieces, and the screws that secure the light switch to the box will fit through the holes of the tabbed pieces (3c, 15c, 27c, and 38c) and then into the mounting structures of the back box (1a, 2a, 13a, 14a, 25a, 26a, 36a, 37a).

With an electrical outlet, the outlet is thicker and will sit "deeper" in the back box. Thus, when a "tabbed" form of the Trim Ring is used with an electrical outlet, the tabbed piece is "snapped off" and removed to accommodate the size of the electrical outlet before the electric outlet is installed within the back box. With this arrangement, screws are used to secure the electrical outlet to the mounting structures of the back box (1a, 2a, 13a, 14a, 25a, 26a, 36a, 37a), with no need to fit them to any part of the Trim Ring.

Installation Process.

A brief description of an exemplary installation processes for the various systems and methods is provided below. Several of the steps are optional or dependent on user preferences, and the processes described below are not the only methods for installing the system. Many variations are possible based on the specific form of the system employed and application, along with user preferences.

In the exemplary process, first, a Back Box (Part Nos. 1, 2, 13, 14, 25, 26, 36, 37) is installed within the wall area. Typically, it is mounted to a wall stud with nails or screws through one set of the holes (1c, 2c, 13c, 14c, 25c, 26c, 36c, 37c) on one of the ears (1b, 2b, 13b, 14b, 25b, 26b, 36b, 37b). It is typically not necessary for both ears to be mounted to the stud or framing. If it is a "full" Back Box (and not a Half Back Box), one or more of the knockout tabs for wiring (1e, 13e, 25e, 36e) are removed to enable electrical wiring to be inserted within the box. If a standard metal box is used instead of the Back Boxes, at this stage, it is a Metal Adapter (12, 24, 35, and 44) that is installed. The steps that follow below are generally the same, once the Metal Adapter is screwed into place onto the standard metal box.

Optionally, the electrical devices can be installed and wired at this stage of the construction process. For example, an electrical outlet can be installed right away, even before the drywall is installed, by mounting it to the top and bottom mounting structures (1a, 2a, 13a, 14a, 25a, 26a, 36a, 37a).

The next step is to install the sheets of drywall that will form the walls. The drywall can be installed through typical drywall methods of fitting and joining pieces of drywall together. The piece of the drywall that will be fit over the Back Box should have a rectangular hole cut into it that will fit around the back box. The back of that drywall piece will also sits against the front of the ears (1b, 2b, 13b, 14b, 25b, 26b, 36b, 37b) of the back box.

Next, with the drywall installed, an appropriate Mud Ring (4, 16, 28, and 39) is paired with the installed Back Box. The Mud Ring holes (4a, 16a, 28a, and 39a) mate with the tabs (1d, 2d, 13d, 14d, 25d, 26d, 36d, 37d) of the Back Box, and the back of the front Mud Ring surface (4b, 16b, 28b, and 39b) touches the front of the drywall, such that the drywall is now clamped between the Mud Ring surface and Back Box ears.

If the electrical components have not been installed yet, they can now be installed. For example, if a light switch is being installed in the mud ring, screws are used to secure the light switch to the Back Box through the tabbed pieces (4c, 16c, 28c, and 39c) and then into the mounting structures of the Back Box (1a, 2a, 13a, 14a, 25a, 26a, 36a, 37a).

Optionally, after the Mud Ring is installed, an appropriately sized mud plug (11, 23, 34, and 43) is inserted into the mud ring. The mud plug is simply pushed into place until the grooves (11b, 23b, 34b, and 43b) at the top and bottom snap into place with the lips (4d, 16d, 28d, and 39d) of the Mud Ring and lock the Mud Plug into place within the Mud Ring. Inserting the Mud Plug is especially useful and important if electrical equipment has already been installed, in order to protect that equipment during mudding.

With the Mud Ring (and optionally Mud Plug) installed, it is now time to mud over the drywall and mud ring. Typically, several layers of mud are applied, to result in approximately ⅛" in total of mud. The drying time for the layers of mud may vary. For example, the texture of the first few layers of mud is less important, and it may be useful to use "quick-drying" mud for these initial layers for efficiency. Typically, the last layer is a more "high-quality" mud that might take 24-48 hours to dry. Each layer of applied mud should completely cover the mud ring, until the surface of the mud ring (4b, 16b, 28b, and 39b) is no longer visible.

With the drywall mudding complete and dry, if a Mud Plug was inserted for mudding, it can now be removed. A screwdriver or similar device is inserted into one of the holes (11a, 23a, 34a, and 43a) of the Mud Plug to pop off the mud plug. After a Mud Plug is removed, it can be reused with different Mud Ring during mudding, or it can be discarded.

At this point, with the mudding complete, any electrical devices should be wired and mounted within the Back Box, if they have not been already. They should be installed before the Face Plates.

An appropriate Faceplate (for the electrical components installed behind it) is pushed into place to cause the groove (5b, 6b, 7b, 8b, 9b, 10b, 17b, 18b, 19b, 20b, 21b, 22b, 29b, 30b, 31b, 32b, 33b, 40b, 41b, and 42b) of the Faceplate to mate with the lip (4d, 16d, 28d, and 39d) of the Mud Ring to snap the Faceplate into place. A user simply pushes the Faceplate against the lip until the two parts snap together. In the case of a keystone connector for low voltage equipment, the keystone connector is actually snapped into place on the Faceplate before the Faceplate snaps into the Mud Ring.

Optionally, with the Faceplate now installed, an appropriate Paint Plug (46, 47, 48, 49) is plugged into the Faceplate to protect it during painting.

Next, the wall and FacePlate are painted, typically with 2-3 layers of paint.

Once painting is removed, the Paint Plug can be removed and discarded (or saved for the next job).

In addition to the description provided above, Applicant provides herewith Appendixes A, B, and C, which are incorporated by reference herein in their entirety. Appendix A includes photographs of 3-D printed versions of several of the components. The parts can also be manufactured via plastic injection molding, machining, or other processes. Those processes are more precise than 3-D printing and result in fewer imperfections. The 3-D printed versions of the parts are merely illustrative. Appendix B includes several forms of the Mud Rings described above as FIGS. 1-28. Appendix C includes several forms of assembled Back Boxes, Mud Rings, and Faceplates described above as FIGS. 1-70.

What is claimed is:

1. An electrical device mounting system, comprising:
   a) a back box including:
      (1) a front opening;
      (2) a left side ear protruding from a left outer surface of the back box and a right side ear protruding from a right outer surface of the back box, wherein each of the ears comprises a protrusion with a front surface that is parallel to the front opening;
      (3) an electrical component mount on an inside portion of the back box;
      (4) at least two protrusions on the inside portion of the back box; and
   b) a trim ring including at least two holes to receive the at least two protrusions, arranged to snap the trim ring into the back box and thereby secure the trim ring and back box around a wall portion, wherein the back box and the trim ring are configured to be coupled and installed with (i) a back surface of the trim ring in contact with a front side of the wall portion and (ii) the front surface of the left side ear and the front surface of the right side ear in contact with a back side of the wall portion, thereby clamping the trim ring and back box around the wall portion.

2. The electrical device mounting system of claim 1, further comprising a faceplate including:
   (1) a first groove that mates with a first lip on a top inside portion of the trim ring and a second groove that mates with a second lip on a bottom inside portion of the trim ring to secure the faceplate within the trim ring;
   (2) at least one opening on the faceplate allowing access to an electrical component mounted on the electrical component mount; and
   (3) a raised portion on the back side of the faceplate that fits around the front of the electrical component.

3. The electrical device mounting system of claim 2, wherein the faceplate includes a support ridge that snaps into the trim ring to secure the faceplate directly to the trim ring.

4. The electrical device mounting system of claim 2, wherein the faceplate includes a faceplate removal notch on its front surface.

5. The electrical device mounting system of claim 1, further comprising a second electrical component mount on the inside portion of the back box.

6. The electrical device mounting system of claim 1, wherein the electrical component mount is for an electrical outlet.

7. The electrical device mounting system of claim 1, wherein the back box includes an electrical wire opening.

8. The electrical device mounting system of claim 1, wherein the front opening provides access to the electrical component mount.

9. A trim ring comprising:
   a) at least two holes arranged to mate with at least two protrusions on a back box for an electrical component and thereby snap the trim ring into the back box and clamp the trim ring and back box around a wall portion;
   b) a first lip on a top inside portion of the trim ring and a second lip on a bottom inside portion of the trim ring, wherein the first lip and snaps into a first groove on a faceplate and a second lip snaps into a second groove on the faceplate to secure the faceplate to the trim ring.

10. The trim ring of claim 9, further comprising two removable break away tabs that are configured to be removed if the electrical component is an electrical outlet.

11. A method of mounting an electrical device access point flush with a wall, comprising:

(1) placing a back box behind a wall portion, wherein (i) the wall portion includes an opening for the front portion of the back box, (ii) a back side of the wall portion rests against a left side ear front surface protruding from a left outer surface of the back box and a right side ear front surface protruding from a right outer surface of the back box, and (iii) each of the ears comprises a protrusion and the left side ear front surface and the right side ear front surface are parallel to the opening;

(2) snapping a trim ring into the back box to cause a back side of the trim ring to be in contact with a front side of the wall portion, thereby clamping the trim ring and back box around the wall portion.

12. The method of claim 11 further comprising (3) installing a faceplate into the trim ring that is generally flush with the wall surface.

13. The method of claim 12, further comprising:

(4) installing a paint plug in the faceplate that plugs a hole in the faceplate while leaving a front surface of the faceplate exposed; and (5) painting over the wall surface and the faceplate.

14. The method of claim 11 further comprising installing an electrical device after step 1 and before step 2.

15. The method of claim 11, wherein the trim ring is snapped into the back box using protrusions on the back box that mate with holes on the trim ring.

16. The method of claim 11 further comprising gluing the back side of the wall portion to the left side ear front surface and the right side ear front surface before step 2.

\* \* \* \* \*